(12) United States Patent
Gantz et al.

(10) Patent No.: US 11,986,042 B2
(45) Date of Patent: May 21, 2024

(54) STRUCTURALLY-COLORED ARTICLES AND METHODS FOR MAKING AND USING STRUCTURALLY-COLORED ARTICLES

(71) Applicant: NIKE, Inc., Beaverton, OR (US)

(72) Inventors: Jeremy Gantz, Lake Oswego, OR (US); Yuanmin Wang, Beaverton, OR (US)

(73) Assignee: NIKE, INC., Beaverton, OR (US)

( * ) Notice: Subject to any disclaimer, the term of this patent is extended or adjusted under 35 U.S.C. 154(b) by 0 days.

(21) Appl. No.: 17/074,153

(22) Filed: Oct. 19, 2020

(65) Prior Publication Data

US 2021/0112909 A1    Apr. 22, 2021

Related U.S. Application Data

(60) Provisional application No. 62/923,787, filed on Oct. 21, 2019.

(51) Int. Cl.
| | |
|---|---|
| *B32B 3/30* | (2006.01) |
| *A43B 1/00* | (2006.01) |
| *B32B 15/14* | (2006.01) |

(52) U.S. Cl.
CPC .............. *A43B 1/0027* (2013.01); *B32B 3/30* (2013.01); *B32B 15/14* (2013.01); *B32B 2307/402* (2013.01); *B32B 2307/416* (2013.01); *B32B 2437/02* (2013.01)

(58) Field of Classification Search
CPC ..... B32B 3/30; B32B 15/14; B32B 2307/402; B32B 2307/416; B32B 2437/02
See application file for complete search history.

(56) References Cited

U.S. PATENT DOCUMENTS

| | | | |
|---|---|---|---|
| 2,345,533 A | 3/1944 | Graves |
| 2,394,533 A | 2/1946 | Colbert |
| 2,607,130 A | 8/1952 | Pearson |
| 2,712,190 A | 7/1955 | Sobel |
| 2,929,803 A | 3/1960 | Henry et al. |

(Continued)

FOREIGN PATENT DOCUMENTS

| | | |
|---|---|---|
| AU | 2007200128 A1 | 8/2007 |
| BR | PI0503224 A | 1/2007 |

(Continued)

OTHER PUBLICATIONS

International Search Report and Written Opinion for PCT/US2021/034781 dated Sep. 24, 2021.

(Continued)

*Primary Examiner* — Elizabeth E Mulvaney
(74) *Attorney, Agent, or Firm* — THOMAS | HORSTEMEYER, LLP

(57) ABSTRACT

As described above, one or more aspects of the present disclosure provide articles having structural achromatic color, and methods of making articles having structural achromatic color. The present disclosure provides for articles that exhibit structural color upon exposure to white light (e.g., sunlight, artificial light, or a combination) that shifts based on the angle of observation and/or incident light. At least one shift in the structural color is between an achromatic structural color and a chromatic structural color. The shift occurs at different angles of observation and/or angle of incident light.

20 Claims, 13 Drawing Sheets

(56) References Cited

U.S. PATENT DOCUMENTS

| | | |
|---|---|---|
| 3,011,383 A | 12/1961 | Sylvester |
| 3,060,513 A | 10/1962 | Klink |
| 3,338,730 A | 8/1967 | Slade et al. |
| 3,376,403 A | 4/1968 | Driga |
| 3,574,958 A | 4/1971 | Martuch |
| 3,698,930 A | 10/1972 | Fleurquin et al. |
| 3,822,488 A | 7/1974 | Johnson |
| 4,231,369 A | 11/1980 | Sorensen et al. |
| 4,300,294 A | 11/1981 | Riecken |
| 4,523,005 A | 6/1985 | Szycher |
| 4,533,592 A | 8/1985 | Bingham |
| 4,705,356 A | 11/1987 | Berning et al. |
| 5,009,486 A | 4/1991 | Dobrowolski et al. |
| 5,269,995 A | 12/1993 | Ramanathan et al. |
| 5,334,690 A | 8/1994 | Schafheutle et al. |
| 5,346,934 A | 9/1994 | Chriss |
| 5,500,067 A | 3/1996 | Jenkner |
| 5,572,817 A | 11/1996 | Chien |
| 5,628,128 A | 5/1997 | Miller et al. |
| 5,671,495 A | 9/1997 | Chen |
| 5,713,141 A | 2/1998 | Mitchell et al. |
| 5,722,322 A | 3/1998 | Watanabe |
| 5,778,793 A | 7/1998 | Mello et al. |
| 5,813,148 A | 9/1998 | Guerra |
| 5,815,950 A | 10/1998 | Wang |
| 5,825,548 A | 10/1998 | Bornhorst et al. |
| 5,930,921 A | 8/1999 | Sorofman et al. |
| 5,952,065 A | 9/1999 | Mitchell et al. |
| 5,969,076 A | 10/1999 | Lai et al. |
| 5,979,078 A | 11/1999 | McLaughlin |
| 6,013,340 A | 1/2000 | Bonk et al. |
| 6,082,025 A | 7/2000 | Bonk et al. |
| 6,127,026 A | 10/2000 | Bonk et al. |
| 6,129,784 A | 10/2000 | Ikuta et al. |
| 6,147,726 A | 11/2000 | Kubota et al. |
| 6,157,489 A | 12/2000 | Bradley, Jr. et al. |
| 6,164,777 A | 12/2000 | Li et al. |
| 6,203,868 B1 | 3/2001 | Bonk et al. |
| 6,321,465 B1 | 11/2001 | Bonk et al. |
| 6,376,075 B1 | 4/2002 | Tacke-Willemsen et al. |
| 6,402,879 B1 | 6/2002 | Tawney et al. |
| 6,551,531 B1 | 4/2003 | Ford et al. |
| 6,666,983 B2 | 12/2003 | Marietti et al. |
| 6,749,936 B2 | 6/2004 | Argoitia et al. |
| 6,761,959 B1 | 7/2004 | Bonkowski et al. |
| 6,897,281 B2 | 5/2005 | Lubnin et al. |
| 6,922,906 B2 | 8/2005 | Choi et al. |
| 6,922,916 B1 | 8/2005 | Potter et al. |
| 7,006,294 B2 | 2/2006 | Steenblik et al. |
| 7,405,879 B2 | 7/2008 | Wild et al. |
| 7,476,705 B2 | 1/2009 | Pajerski |
| 7,800,814 B2 | 9/2010 | Nishimura et al. |
| 7,848,008 B2 | 12/2010 | Nishimura et al. |
| 7,903,339 B2 | 3/2011 | Banerjee et al. |
| 7,955,695 B2 | 6/2011 | Argoitia |
| 8,264,637 B2 | 9/2012 | Cho et al. |
| 8,322,636 B2 | 12/2012 | Wu et al. |
| 8,339,597 B2 | 12/2012 | Dal Negro et al. |
| 8,408,470 B2 | 4/2013 | Komatsu et al. |
| 8,486,494 B2 | 7/2013 | Fukazawa et al. |
| 8,558,137 B2 | 10/2013 | Yuasa et al. |
| 8,685,185 B2 | 4/2014 | Guo et al. |
| 8,889,234 B2 | 11/2014 | Kwon et al. |
| 9,102,195 B2 | 8/2015 | Raksha et al. |
| 9,134,468 B2 | 9/2015 | Noizet et al. |
| 9,185,947 B2 | 11/2015 | Spencer et al. |
| 9,220,951 B1 | 12/2015 | Comeau |
| 9,279,771 B2 | 3/2016 | Aizenberg et al. |
| 9,420,848 B2 | 8/2016 | Campos, II et al. |
| 9,453,943 B2 | 9/2016 | Miyake et al. |
| 9,527,340 B2 | 12/2016 | Szumski et al. |
| 9,557,457 B2 | 1/2017 | Gocho et al. |
| 9,931,804 B2 | 4/2018 | Le et al. |
| 10,048,411 B2 | 8/2018 | Parker |
| 10,555,580 B2 | 2/2020 | Peyton |
| 10,649,113 B2 | 5/2020 | Bee et al. |
| 10,779,617 B2 | 9/2020 | Iovu |
| 10,928,553 B2 | 2/2021 | Bee et al. |
| 11,129,444 B1 | 9/2021 | Kovel |
| 11,241,062 B1 | 2/2022 | Bee et al. |
| 11,254,095 B2 | 2/2022 | Hart et al. |
| 11,412,817 B2 | 8/2022 | Kovel |
| 2001/0028921 A1 | 10/2001 | Shaw et al. |
| 2001/0042321 A1 | 11/2001 | Tawney et al. |
| 2001/0053454 A1 | 12/2001 | Higashi |
| 2002/0015836 A1 | 2/2002 | Jonza et al. |
| 2002/0028311 A1 | 3/2002 | Coppens et al. |
| 2002/0150629 A1 | 10/2002 | Nishimura et al. |
| 2002/0183133 A1 | 12/2002 | Sano |
| 2002/0191234 A1 | 12/2002 | Ishimoto |
| 2003/0074808 A1 | 4/2003 | Weaver |
| 2003/0086030 A1 | 5/2003 | Taniguchi |
| 2004/0006889 A1 | 1/2004 | Chen |
| 2004/0112252 A1 | 6/2004 | Zimmerman |
| 2004/0135921 A1 | 7/2004 | Murata et al. |
| 2004/0142185 A1 | 7/2004 | Takushima |
| 2004/0169928 A1 | 9/2004 | Nilsen et al. |
| 2004/0172855 A1 | 9/2004 | Aslanides |
| 2004/0173855 A1 | 9/2004 | Masuoka et al. |
| 2004/0265587 A1 | 12/2004 | Koyanagi et al. |
| 2005/0016026 A1 | 1/2005 | Long |
| 2005/0031816 A1 | 2/2005 | Chang et al. |
| 2005/0056954 A1 | 3/2005 | Devlin et al. |
| 2005/0063067 A1 | 3/2005 | Phillips et al. |
| 2005/0207007 A1 | 9/2005 | Shimoda et al. |
| 2005/0207138 A1 | 9/2005 | Cheung |
| 2005/0211114 A1 | 9/2005 | Fahrenbach et al. |
| 2005/0260369 A1 | 11/2005 | Graf |
| 2005/0268497 A1 | 12/2005 | Alfaro et al. |
| 2005/0274041 A1 | 12/2005 | Collett et al. |
| 2006/0023327 A1 | 2/2006 | Coombs et al. |
| 2006/0048413 A1 | 3/2006 | Sokolowski et al. |
| 2006/0090373 A1 | 5/2006 | Savoie et al. |
| 2006/0101671 A1 | 5/2006 | Berend et al. |
| 2006/0101673 A1 | 5/2006 | Robinson et al. |
| 2006/0112599 A1 | 6/2006 | Braynock et al. |
| 2006/0128823 A1 | 6/2006 | Tsuchimura |
| 2006/0143951 A1 | 7/2006 | Yang et al. |
| 2006/0198121 A1 | 9/2006 | Thorpe et al. |
| 2006/0263553 A1 | 11/2006 | Yamada et al. |
| 2006/0270553 A1 | 11/2006 | Mori |
| 2007/0008439 A1 | 1/2007 | Nakayama et al. |
| 2007/0058260 A1 | 3/2007 | Steenblik et al. |
| 2007/0076069 A1 | 4/2007 | Edwards |
| 2008/0040951 A1 | 2/2008 | Kates |
| 2008/0066347 A1 | 3/2008 | Suzuki |
| 2008/0248281 A1 | 10/2008 | Nakaguma et al. |
| 2008/0274359 A1 | 11/2008 | Parker |
| 2008/0316628 A1 | 12/2008 | Nakajima et al. |
| 2009/0080076 A1 | 3/2009 | Fujikura et al. |
| 2009/0174944 A1 | 7/2009 | Yuasa et al. |
| 2009/0301649 A1 | 12/2009 | Augsberg et al. |
| 2010/0024597 A1 | 2/2010 | Dover et al. |
| 2010/0104810 A1 | 4/2010 | Fukazawa et al. |
| 2010/0152065 A1 | 6/2010 | Nishimura et al. |
| 2010/0177380 A1 | 7/2010 | Nagahama et al. |
| 2010/0199406 A1 | 8/2010 | Dua et al. |
| 2010/0199520 A1 | 8/2010 | Dua et al. |
| 2010/0215976 A1 | 8/2010 | Suwa et al. |
| 2010/0222442 A1 | 9/2010 | Prissok et al. |
| 2010/0245978 A1 | 9/2010 | Baumberg et al. |
| 2010/0254007 A1 | 10/2010 | Toda |
| 2010/0266946 A1 | 10/2010 | Shirai et al. |
| 2010/0290109 A1 | 11/2010 | Kurt et al. |
| 2010/0291358 A1 | 11/2010 | Takahashi et al. |
| 2011/0026208 A1 | 2/2011 | Utsuro et al. |
| 2011/0033670 A1 | 2/2011 | Nishikawa et al. |
| 2011/0043911 A1 | 2/2011 | Kaneiwa et al. |
| 2011/0090564 A1 | 4/2011 | Utsuro et al. |
| 2011/0123754 A1 | 5/2011 | Shirai et al. |
| 2011/0170193 A1 | 7/2011 | Budd et al. |
| 2011/0171440 A1 | 7/2011 | Cheng et al. |
| 2011/0183111 A1 | 7/2011 | Yuasa et al. |
| 2011/0234953 A1 | 9/2011 | Amimori et al. |

(56) References Cited

U.S. PATENT DOCUMENTS

| | | |
|---|---|---|
| 2011/0234969 A1 | 9/2011 | Amimori et al. |
| 2011/0253288 A1 | 10/2011 | Xie et al. |
| 2011/0262675 A1 | 10/2011 | Inamiya et al. |
| 2011/0298207 A1 | 12/2011 | Despland et al. |
| 2011/0299150 A1 | 12/2011 | Steenblik et al. |
| 2012/0015118 A1 | 1/2012 | Zheludev et al. |
| 2012/0015145 A1 | 1/2012 | Depres |
| 2012/0019913 A1 | 1/2012 | Nishimoto et al. |
| 2012/0034291 A1 | 2/2012 | Amsden et al. |
| 2012/0121820 A1 | 5/2012 | Kaplan et al. |
| 2012/0133672 A1 | 5/2012 | Joo |
| 2012/0139230 A1 | 6/2012 | Whiteman et al. |
| 2012/0186102 A1 | 7/2012 | Lee et al. |
| 2012/0204443 A1 | 8/2012 | Vertuccio |
| 2012/0231489 A1 | 9/2012 | Lenhert |
| 2012/0236415 A1* | 9/2012 | Nagano ............... G02B 5/1842 359/567 |
| 2012/0249718 A1 | 10/2012 | Sohn et al. |
| 2012/0255201 A1 | 10/2012 | Little |
| 2012/0255452 A1 | 10/2012 | Bower et al. |
| 2012/0276332 A1 | 11/2012 | Conolly |
| 2012/0297642 A1 | 11/2012 | Schaefer et al. |
| 2012/0297643 A1 | 11/2012 | Shaffer et al. |
| 2013/0004721 A1 | 1/2013 | Hara et al. |
| 2013/0004722 A1 | 1/2013 | Hara et al. |
| 2013/0004731 A1 | 1/2013 | Hara et al. |
| 2013/0004754 A1 | 1/2013 | Hara et al. |
| 2013/0107368 A1 | 5/2013 | Delst et al. |
| 2013/0148221 A1 | 6/2013 | Banerjee et al. |
| 2013/0182300 A1 | 7/2013 | Muller et al. |
| 2013/0183487 A1 | 7/2013 | Henze et al. |
| 2013/0243693 A1 | 9/2013 | Omenetto et al. |
| 2013/0250229 A1 | 9/2013 | Kaneiwa et al. |
| 2013/0330710 A1 | 12/2013 | Omenetto et al. |
| 2014/0016177 A1 | 1/2014 | Aizenberg et al. |
| 2014/0020192 A1 | 1/2014 | Jones et al. |
| 2014/0050899 A1 | 2/2014 | Kukoff |
| 2014/0104686 A1 | 4/2014 | Yuasa et al. |
| 2014/0106139 A1 | 4/2014 | Abrams |
| 2014/0109442 A1 | 4/2014 | Thompson |
| 2014/0118360 A1 | 5/2014 | Ma et al. |
| 2014/0161974 A1 | 6/2014 | Erho et al. |
| 2014/0182169 A1 | 7/2014 | Mack |
| 2014/0250734 A1 | 9/2014 | Zheng |
| 2014/0254017 A1 | 9/2014 | Manoharan et al. |
| 2014/0310983 A1 | 10/2014 | Tamm et al. |
| 2015/0001840 A1 | 1/2015 | Parker |
| 2015/0035269 A1 | 2/2015 | Hooper et al. |
| 2015/0076808 A1 | 3/2015 | Kim et al. |
| 2015/0109657 A1 | 4/2015 | Baumberg et al. |
| 2015/0118124 A1 | 4/2015 | Khorasaninejad et al. |
| 2015/0146280 A1 | 5/2015 | Degott et al. |
| 2015/0192897 A1 | 7/2015 | Schilling et al. |
| 2015/0198749 A1 | 7/2015 | Ye et al. |
| 2015/0202834 A1 | 7/2015 | Free et al. |
| 2015/0212244 A1 | 7/2015 | Kim et al. |
| 2015/0250263 A1 | 9/2015 | Robinson, Jr. |
| 2015/0265003 A1 | 9/2015 | Lauria |
| 2015/0283743 A1 | 10/2015 | Park et al. |
| 2015/0309232 A1 | 10/2015 | Banerjee |
| 2015/0352883 A1 | 12/2015 | Schmid et al. |
| 2015/0352888 A1 | 12/2015 | Schmid et al. |
| 2016/0064696 A1 | 3/2016 | Collier et al. |
| 2016/0101601 A1 | 4/2016 | Abrams |
| 2016/0116645 A1 | 4/2016 | Parker |
| 2016/0128433 A1 | 5/2016 | Downing et al. |
| 2016/0131808 A1 | 5/2016 | Kristensen et al. |
| 2016/0146984 A1 | 5/2016 | Jiang et al. |
| 2016/0168386 A1 | 6/2016 | Aizenberg et al. |
| 2016/0176223 A1 | 6/2016 | Degott et al. |
| 2016/0178493 A1 | 6/2016 | Kawanaka et al. |
| 2016/0202394 A1 | 7/2016 | Clausen et al. |
| 2016/0202401 A1 | 7/2016 | Christiansen et al. |
| 2016/0209642 A1 | 7/2016 | Aizenberg et al. |
| 2016/0209678 A1 | 7/2016 | Nishimoto |
| 2016/0282527 A1 | 9/2016 | Saito et al. |
| 2016/0325310 A1 | 11/2016 | Schmid et al. |
| 2016/0327708 A1 | 11/2016 | Liles et al. |
| 2016/0331082 A1 | 11/2016 | Weidl |
| 2017/0020232 A1 | 1/2017 | Bello Decurnex |
| 2017/0023711 A1 | 1/2017 | Jiang et al. |
| 2017/0027273 A1 | 2/2017 | Colon |
| 2017/0081535 A1 | 3/2017 | Kohri et al. |
| 2017/0087691 A1 | 3/2017 | Yokoyama et al. |
| 2017/0090084 A1 | 3/2017 | Wilson et al. |
| 2017/0129200 A1 | 5/2017 | Adami et al. |
| 2017/0157653 A1 | 6/2017 | Parker |
| 2017/0226347 A1 | 8/2017 | Jin et al. |
| 2017/0248746 A1 | 8/2017 | Banerjee et al. |
| 2017/0347745 A1 | 12/2017 | Figur et al. |
| 2018/0252158 A1 | 9/2018 | Malkamaki et al. |
| 2018/0257360 A1 | 9/2018 | Liponkoski |
| 2018/0284330 A1 | 10/2018 | Parker |
| 2018/0357316 A1 | 12/2018 | Neuvonen et al. |
| 2018/0372929 A1 | 12/2018 | Parker |
| 2019/0098946 A1 | 4/2019 | Bee et al. |
| 2019/0098958 A1 | 4/2019 | Bee et al. |
| 2019/0099967 A1 | 4/2019 | Bee et al. |
| 2019/0099968 A1 | 4/2019 | Bee et al. |
| 2019/0099978 A1 | 4/2019 | Bee et al. |
| 2019/0099979 A1 | 4/2019 | Bee et al. |
| 2019/0113655 A1 | 4/2019 | Bee et al. |
| 2019/0113656 A1 | 4/2019 | Bee et al. |
| 2019/0163011 A1 | 5/2019 | Cao |
| 2019/0337321 A1 | 11/2019 | Yamada |
| 2019/0346603 A1 | 11/2019 | Sahara et al. |
| 2019/0365047 A1 | 12/2019 | Larson et al. |
| 2019/0387830 A1 | 12/2019 | Dua et al. |
| 2020/0018876 A1 | 1/2020 | Chen et al. |
| 2020/0040882 A1 | 2/2020 | Kalmari et al. |
| 2020/0088908 A1 | 3/2020 | Bee et al. |
| 2020/0113287 A1 | 4/2020 | Johnson et al. |
| 2020/0181550 A1 | 6/2020 | Kalmari et al. |
| 2020/0217986 A1 | 7/2020 | Bee et al. |
| 2020/0217987 A1 | 7/2020 | Bee et al. |
| 2020/0240667 A1 | 7/2020 | Lind |
| 2020/0269561 A1 | 8/2020 | Bee et al. |
| 2020/0275728 A1 | 9/2020 | Bee et al. |
| 2020/0290311 A1 | 9/2020 | Kim et al. |
| 2020/0305526 A1 | 10/2020 | Gantz et al. |
| 2020/0305527 A1 | 10/2020 | Gantz et al. |
| 2020/0308734 A1 | 10/2020 | Gantz et al. |
| 2020/0314185 A1 | 10/2020 | Makynen et al. |
| 2020/0371272 A1 | 11/2020 | Bee et al. |
| 2020/0407838 A1 | 12/2020 | Gantz et al. |
| 2021/0096289 A1 | 4/2021 | Guo et al. |
| 2021/0177096 A1 | 6/2021 | Park et al. |
| 2021/0186157 A1 | 6/2021 | Capone et al. |
| 2021/0215864 A1 | 7/2021 | Kawashita |
| 2021/0244131 A1 | 8/2021 | Capone et al. |
| 2021/0370714 A1 | 12/2021 | Gantz et al. |
| 2021/0373211 A1 | 12/2021 | Gantz et al. |
| 2021/0373214 A1 | 12/2021 | Gantz et al. |
| 2021/0382201 A1 | 12/2021 | Bee et al. |
| 2022/0039504 A1 | 2/2022 | Bee et al. |
| 2022/0039505 A1 | 2/2022 | Bee et al. |
| 2022/0039519 A1 | 2/2022 | Kovel et al. |
| 2022/0061450 A1 | 3/2022 | Bee et al. |
| 2022/0066079 A1 | 3/2022 | Trottier-Lapointe |
| 2022/0107443 A1 | 4/2022 | Bee et al. |

FOREIGN PATENT DOCUMENTS

| | | |
|---|---|---|
| CH | 702116 B1 | 5/2011 |
| CN | 1088511 A | 6/1994 |
| CN | 1324222 A | 11/2001 |
| CN | 1725045 A | 1/2006 |
| CN | 1799857 A | 7/2006 |
| CN | 101035685 A | 9/2007 |
| CN | 101356245 A | 1/2009 |
| CN | 101381903 A | 3/2009 |
| CN | 101396884 A | 4/2009 |
| CN | 101633786 A | 1/2010 |
| CN | 101666886 A | 3/2010 |

(56) References Cited

FOREIGN PATENT DOCUMENTS

| | | |
|---|---|---|
| CN | 101781860 A | 7/2010 |
| CN | 102548752 A | 7/2012 |
| CN | 102691202 A | 9/2012 |
| CN | 103173039 A | 6/2013 |
| CN | 103965699 A | 8/2014 |
| CN | 104334042 A | 2/2015 |
| CN | 104592971 A | 5/2015 |
| CN | 105050442 A | 11/2015 |
| CN | 105271796 A | 1/2016 |
| CN | 105862000 A | 8/2016 |
| CN | 106080001 A | 11/2016 |
| CN | 107111002 A | 8/2017 |
| CN | 206553403 U | 10/2017 |
| CN | 107407747 A | 11/2017 |
| CN | 109567305 A | 4/2019 |
| DE | 4307648 A1 | 9/1994 |
| DE | 20200346 U1 | 4/2002 |
| DE | 102010025159 A1 | 12/2011 |
| EP | 0109003 A1 | 5/1984 |
| EP | 335309 A1 | 10/1989 |
| EP | 0905530 A2 | 3/1999 |
| EP | 1047961 A1 | 11/2000 |
| EP | 1379900 A1 | 1/2004 |
| EP | 1560416 | 8/2005 |
| EP | 1624026 A1 | 2/2006 |
| EP | 1653256 A1 | 5/2006 |
| EP | 1923229 A1 | 5/2008 |
| EP | 2012148 A1 | 1/2009 |
| EP | 2077459 A1 | 7/2009 |
| EP | 2462908 A1 | 6/2012 |
| EP | 2508922 A1 | 10/2012 |
| EP | 2538247 A2 | 12/2012 |
| EP | 2642321 A1 | 9/2013 |
| EP | 3151042 A1 | 4/2017 |
| EP | 3244240 A1 | 11/2017 |
| EP | 3278150 A2 | 2/2018 |
| EP | 3290968 | 3/2018 |
| GB | 1358710 A | 7/1974 |
| GB | 2374818 A | 10/2002 |
| GB | 2481697 A | 1/2012 |
| GB | 2524840 A | 10/2015 |
| GB | 2525020 A1 | 10/2015 |
| JP | S601180 U | 1/1985 |
| JP | S63120642 A | 5/1988 |
| JP | 3057345 U | 5/1999 |
| JP | 2001516272 A | 9/2001 |
| JP | 2002524317 A | 8/2002 |
| JP | 2002530712 A | 9/2002 |
| JP | 2003131029 A | 5/2003 |
| JP | 2004004495 A | 1/2004 |
| JP | 2005153192 A | 6/2005 |
| JP | 2005174647 A | 6/2005 |
| JP | 2005226196 A | 8/2005 |
| JP | 2006508698 A | 3/2006 |
| JP | 2006288907 A | 10/2006 |
| JP | 2008515491 A | 5/2008 |
| JP | 2009205123 A | 9/2009 |
| JP | 2009211077 A | 9/2009 |
| JP | 2010111974 A | 5/2010 |
| JP | 2010201652 A | 9/2010 |
| JP | 2011085779 A | 4/2011 |
| JP | 2011104931 A | 6/2011 |
| JP | 2012159589 A | 8/2012 |
| JP | 2013029805 A | 2/2013 |
| JP | 2013041027 A | 2/2013 |
| JP | 2013080049 A | 5/2013 |
| JP | 2014189719 A | 10/2014 |
| JP | 2015069076 A | 4/2015 |
| JP | 2015101024 A | 6/2015 |
| JP | 5740937 B2 | 7/2015 |
| JP | 2015520044 A | 7/2015 |
| JP | 2015529136 A | 10/2015 |
| JP | 2016502470 A | 1/2016 |
| JP | 2017032409 A | 2/2017 |
| KR | 101472929 B1 | 12/2014 |
| TW | 200628089 A | 8/2006 |
| WO | 9701972 A1 | 1/1997 |
| WO | 2000031571 A1 | 6/2000 |
| WO | 03046039 A | 6/2003 |
| WO | 2003046039 | 6/2003 |
| WO | 03068525 A1 | 8/2003 |
| WO | 2007037393 A1 | 4/2007 |
| WO | 2007038097 A1 | 4/2007 |
| WO | 2007096914 A1 | 8/2007 |
| WO | 2008076339 A2 | 6/2008 |
| WO | 2009062341 A1 | 5/2009 |
| WO | 2010047322 A1 | 4/2010 |
| WO | 2010119248 A2 | 10/2010 |
| WO | 2011161482 A1 | 12/2011 |
| WO | 2012055105 A1 | 5/2012 |
| WO | 2013151547 A1 | 10/2013 |
| WO | 2014022049 A1 | 2/2014 |
| WO | 2014059424 A2 | 4/2014 |
| WO | 2014117673 A1 | 8/2014 |
| WO | 2014133514 A1 | 9/2014 |
| WO | 2015051367 A1 | 4/2015 |
| WO | 2015079652 A1 | 6/2015 |
| WO | 2015151479 A1 | 10/2015 |
| WO | 2015170120 A1 | 11/2015 |
| WO | 2015195123 | 12/2015 |
| WO | 2016015973 A1 | 2/2016 |
| WO | 2016092014 A1 | 6/2016 |
| WO | 2016103980 A1 | 6/2016 |
| WO | 2016140779 A1 | 9/2016 |
| WO | 2016156863 A2 | 10/2016 |
| WO | 2016164551 A1 | 10/2016 |
| WO | 2016191255 A1 | 12/2016 |
| WO | 2016193252 A1 | 12/2016 |
| WO | 2017006314 A1 | 1/2017 |
| WO | 2017032928 A1 | 3/2017 |
| WO | 2017041085 A1 | 3/2017 |
| WO | 2017115806 A1 | 7/2017 |
| WO | 2017151496 A1 | 9/2017 |
| WO | 2018130856 A1 | 7/2018 |
| WO | 2018160866 A1 | 9/2018 |
| WO | 2019038560 A | 2/2019 |
| WO | 2019038560 A1 | 2/2019 |
| WO | 2019067969 A1 | 4/2019 |
| WO | 2019086770 A1 | 5/2019 |
| WO | 2019117413 A1 | 6/2019 |
| WO | 2019224426 A1 | 11/2019 |
| WO | 2020013229 A1 | 1/2020 |
| WO | 2020030844 A1 | 2/2020 |
| WO | 3095657 | 10/2020 |
| WO | 2020197774 A1 | 10/2020 |

OTHER PUBLICATIONS

International Search Report and Written Opinion for PCT/US2021/034865 dated Oct. 5, 2021.
International Search Report and Written Opinion for PCT/US2021/034872 dated Oct. 5, 2021.
International Search Report and Written Opinion for PCT/US2021/034921 dated Oct. 7, 2021.
CreatexColorsCo: "How to Paint a Candy Fade" YouTube, Mar. 7, 2020 (Mar. 7, 2020), XP054982299, Retrieved from the Internet: URL:https://www.youtube.com/watch?v=q3UyGEkxEHk&ab channel=CreatexColorsCo [retrieved on Sep. 6, 2021] the whole document.
International Search Report and Written Opinion for PCT/US2021/034776 dated Nov. 17, 2021.
International Preliminary Report on Patentability for PCT/US2020/043271 dated Nov. 8, 2021.
Dwyer, Ross, "Stranger Things x Nike "Upside Down" Collection Release Date", SneakerNews.com Available Online at: https://sneakernews.com/2019/08/12/stranger-things-nike-upside-down-collection-release-date/, Aug. 12, 2019, 5 pages.
International Search Report and Written Opinion received for PCT Patent Application No. PCT/US2014/015275, dated Jun. 25, 2014, 11 pages.
Nike's New Air Force 1 "Reveal" Comes With DIY Tear-Away Uppers, hypebeast.com, Available online at: https://hypebeast.com/

(56) References Cited

OTHER PUBLICATIONS

2021/2/nike-air-force-1-low-reveal-fauna-brown-arctic-punch-pale-vanilla-dj9941-244-info, Feb. 8, 2021, 10 pages.
Northman, Tora, "Nike's Latest Air Force 1 Reveals Hidden Colors", hypebae.com, Available online at: https://hypebae.com/2020/4/nike-air-force-1-reveal-diy-peel-sneakers-hidden-colors, Apr. 25, 2020, 9 pages.
Ruiz, Derick, "The Nike Air Force 1 "Reveal" Drops This Week", www.modern-notoriety.com, Available online at: https://www.modern-notoriety.com/nike-wmns-air-force-1-air-max-98-lx-tear-away-release-date/, May 23, 2020, 20 pages.
The 'Stranger Things' x Nike "Upside Down" Pack, hypebeast.com, Available online at: https://hypebeast.com/2019/8/stranger-things-nike-upside-down-pack-tailwind-cortez-mid-blazer-sail-deep-royal-blue-release-info, Aug. 7, 2019, 12 pages.
Written Opinion of the International Preliminary Examining Authority received for PCT Patent Application No. PCT/US2020/055543, dated May 12, 2021, 7 pages.
International Search Report and Written Opinion for PCT/US2021/072456, dated Mar. 17, 2022.
Written Opinion of the International Preliminary Examining Authority for PCT/US2021/034776, dated Mar. 29, 2022.
Written Opinion of the International Preliminary Examining Authority for PCT/US2021/034876, dated Mar. 25, 2022.
Written Opinion of the International Preliminary Examining Authority for PCT/US2021/034897, dated Mar. 29, 2022.
International Search Report and Written Opinion for PCT/US2021/034876, dated Jan. 3, 2022.
International Search Report and Written Opinion for PCT/US2021/034880, dated Jan. 3, 2022.
International Search Report and Written Opinion for PCT/US2021/034888, dated Jan. 4, 2022.
International Search Report and Written Opinion for PCT/US2021/034891, dated Jan. 3, 2022.
International Search Report and Written Opinion for PCT/US2021/034897, dated Jan. 3, 2022.
International Search Report and Written Opinion for PCT application No. PCT/US2021/044890, dated Nov. 12, 2021.
International Search Report and Written Opinion for PCT application No. PCT/US2021/044891, dated Nov. 11, 2021 (SHB).
International Search Report and Written Opinion received for PCT Patent Application No. PCT/US2021/044893, dated Nov. 16, 2021 (SHB).
International Search Report and Written Opinion received for PCT Patent Application No. PCT/US2021/044894, dated Nov. 11, 2021.
Written Opinion for PCT/US2021/034872, dated Dec. 9, 2021.
Written Opinion of the International Preliminary Examining Authority for PCT/US2021/034865 dated Dec. 23, 2021.
Written Opinion of the International Preliminary Examining Authority for PCT/US2021/034880, dated Apr. 7, 2022.
Written Opinion of the International Preliminary Examining Authority for PCT/US2021/034888, dated Apr. 7, 2022.
Written Opinion of the International Preliminary Examining Authority for PCT/US2021/034891, dated Apr. 7, 2022.
International Preliminary Report on Patentability for PCT/US2021/034876, dated Aug. 12, 2022.
International Preliminary Report on Patentability for PCT/US2021/034865, dated Aug. 17, 2022.
International Preliminary Report on Patentability for PCT/US2021/034880, dated Aug. 17, 2022.
International Preliminary Report on Patentability for PCT/US2021/034888, dated Aug. 12, 2022.
International Preliminary Report on Patentability for PCT/US2021/034872, dated Aug. 17, 2022.
International Preliminary Report on Patentability for PCT/US2021/034891, dated Aug. 12, 2022.
International Preliminary Report on Patentability for PCT/US2021/034897, dated Aug. 12, 2022.
International Preliminary Report on Patentability for PCT/US2021/034781, dated Aug. 12, 2022.
International Preliminary Report on Patentability for PCT/US2021/034921, dated Aug. 17, 2022.
International Preliminary Report on Patentability for PCT/US2021/044894 dated Jul. 6, 2022 (SHB).
International Preliminary Report on Patentability for PCT/US2021/044893 dated Jun. 17, 2022 (SHB).
International Preliminary Report on Patentability for PCT/US2021/044890 dated Jul. 6, 2022 (SHB).
International Preliminary Report on Patentability for PCT/US2021/044891 dated Jul. 6, 2022 (SHB).
Masanori Iwata et al., Bio-Inspired Bright Structurally Colored Colloidal Amorphous Array Enhanced by Controlling Thickness and Black Background, Advanced Materials, Feb. 21, 2017, 1-8, 1605050, Germany.
International Search Report and Written Opinion for PCT/US2018/053478 dated Jun. 4, 2019.
International Search Report and Written Opinion for PCT/US2018/053516 dated May 31, 2019.
International Search Report and Written Opinion for PCT/US2018/053502 dated May 28, 2019.
International Search Report and Written Opinion for PCT/US2018/053488 dated Jun. 4, 2019.
International Search Report and Written Opinion for PCT/US2018/053529 dated Jan. 28, 2019.
International Preliminary Report on Patentability for PCT/US2018/053529 dated Dec. 18, 2019.
International Search Report and Written Opinion for PCT/US2018/053521 dated Jun. 3, 2019.
International Preliminary Report on Patentability for PCT/US2018/053521 dated Sep. 3, 2019.
International Search Report and Written Opinion for PCT/US2018/053467 dated Jun. 3, 2019.
International Preliminary Report on Patentability for PCT/US2018/053467 dated Dec. 17, 2019.
International Search Report and Written Opinion for PCT/US2018/053510 dated May 29, 2019.
International Preliminary Report on Patentability for PCT/US2018/053510 dated Dec. 20, 2019.
Texture—www.vocabulary.com, Jun. 2, 2020 (Year: 2020).
Color—www.dictionary.com, Jun. 2, 2020 (Year: 2020).
International Preliminary Report on Patentability for PCT/US2018/053478 dated Mar. 31, 2020.
International Preliminary Report on Patentability for PCT/US2018/053516 dated Mar. 31, 2020.
International Preliminary Report on Patentability for PCT/US2018/053502 dated Mar. 31, 2020.
International Preliminary Report on Patentability for PCT/US2018/053488 dated Mar. 31, 2020.
Written Opinion of the International Preliminary Examining Authority for PCT/US2018/053510 dated Sep. 24, 2019.
International Search Report and Written Opinion for PCT/US2020/022099 dated Jun. 22, 2020.
International Search Report and Written Opinion for PCT/US2020/022129 dated Jun. 8, 2020.
International Search Report and Written Opinion for PCT/US2020/022148 dated Jul. 15, 2020.
Iohara et al: "Structurally Colored Fibers", Chemical Fibers International, vol. 50, No. 1, Feb. 1, 2000 (Feb. 1, 2000), p. 38/39, XP000908694, ISSN: 0340-3343.
Written Opinion of the International Preliminary Examining Authority for PCTUS2020055543 dated May 12, 2021.
International Preliminary Report on Patentability for PCT/US2020/055543, dated Jan. 25, 2022.
Written Opinion of the International Preliminary Examining Authority for PCT/US2021/034781, dated Feb. 16, 2022.
International Preliminary Report on Patentability for PCT/US2020/056300, dated Feb. 17, 2022.
International Preliminary Report on Patentability for PCTUS2014015275 dated Mar. 23, 2015.
International Search Report and Written Opinion for PCT/US2020/043271 dated Oct. 30, 2020.
International Search Report and Written Opinion for PCT/US2020/043273 dated Oct. 8, 2020.

(56) References Cited

OTHER PUBLICATIONS

International Search Report and Written Opinion for PCT/US2020/044624 dated Oct. 30, 2020.
International Search Report and Written Opinion for PCT/US2020/044626 dated Oct. 30, 2020.
International Search Report and Written Opinion for PCT/US2020/044628 dated Oct. 30, 2020.
International Search Report and Written Opinion for PCT/US2020/055543 dated Feb. 5, 2021.
International Search Report and Written Opinion for PCT/US2020/056300 dated Feb. 16, 2021.
International Search Report for PCT/2020/022099 dated Jun. 22, 2020.
International Search Report for PCT/US2018/053467 dated Jun. 3, 2019.
International Search Report for PCT/US2018/053488 dated Jun. 4, 2019.
International Search Report for PCT/US2018/053502 dated Mar. 31, 2020.
International Search Report for PCT/US2018/053510 dated May 29, 2019.
International Search Report for PCT/US2018/053516 dated May 31, 2019.
International Search Report for PCT/US2018/053521 dated Jun. 3, 2019.
International Search Report for PCT/US2018/053529 dated Jan. 28, 2019.
International Search Report for PCT/US2020/022109 dated Jul. 13, 2020.
Written Opinion of the International Preliminary Examining Authority for PCT/2020/022099 dated Dec. 1, 2020.
Written Opinion of the International Preliminary Examining Authority for PCT/US2020/022109 dated Dec. 16, 2020.
Written Opinion of the International Preliminary Examining Authority for PCT/US2020/022129 dated Nov. 13, 2020.
Written Opinion of the International Preliminary Examining Authority for PCT/US2020/022148 dated Oct. 13, 2020.
Written Opinion of the International Preliminary Examining Authority for PCT/US2020/043271 dated Feb. 11, 2021.
Written Opinion of the International Preliminary Examining Report for PCTUS2018053529 dated Aug. 6, 2019.
Iohara Ket al: "Structurally Colored Fibers", Chemical Fibers International, vol. 50, No. 1, Feb. 1, 2000 (Feb. 1, 2000), p. 38/39, XP000908694, ISSN: 0340-3343.
TOPAS: Cycloolefin Copolymer (COC) Brochure. TOPAS Advanced Polymers. Retrieved online Jan. 11, 2021 from https://topas.com/sites/default/files/files/topas_product-brochure_english.pdf. Published 2008. (Year: 2008).
International Preliminary Report on Patentability for PCT/US2020/022148 dated Sep. 29, 2021.
"Need Shoes in Two Different Sizes? It's Not as Odd as You'd Think", GBH News, URL: https://www.wgbh.org/news/lifestyle/2018/09/13/need-shoes-in-two-different-sizes-its-not-as-odd-as-youd-think, Accessed Dec. 13, 2022, Published at least as of Sep. 13, 2018 (Year: 2018).
International Search Report and Written Opinion for PCT/US2022/071920, dated Oct. 20, 2022.
International Search Report and Written Opinion for PCT/US2022/071918, dated Sep. 21, 2022.
International Search Report and Written Opinion for PCT/US2022/071922, dated Aug. 31, 2022.
https://www.britannica.com/dictionary/iridescent (accessed online Mar. 22, 2023), 1 page.
Kinoshita, Colors Due to Different Coloration Mechanisms—Structural Colors—, Journal of the Imaging Society of Japan, 2011, vol. 50, Issue 6, pp. 543-555.
International Preliminary Report on Patentability for PCT/US2021/072456, mailed Jun. 8, 2023.
Written Opinion of the International Preliminary Examining Authority for PCT/US2022/071922, mailed Jun. 27, 2023.
Written Opinion of the International Preliminary Examining Authority for PCT/US2022/071918, mailed Jul. 3, 2023.
Written Opinion of the International Preliminary Examining Authority for PCT/US2022/071920 mailed Jul. 6, 2023.
Zheng et al., "Reflective low-sideband plasmonic structural colors", Optival Materials Express, vol. 6, No. 2, Jan. 7, 2016, pp. 381-387.
International Preliminary Report on Patentability for PCT/US2022/071920 mailed Feb. 19, 2024.
International Preliminary Report on Patentability for PCT/US2022/071918 mailed Feb. 19, 2024.
Albert H. Munsell, "A Color Notation", Geo. H. Ellis Co. Boston, Year 1905, 92 pages.
International Preliminary Report on Patentability for PCT/US2002/071922, mailed Apr. 4, 2024.

* cited by examiner

STRUCTURALLY-COLORED ARTICLES AND METHODS FOR MAKING AND USING STRUCTURALLY-COLORED ARTICLES

CROSS-REFERENCE TO RELATED APPLICATIONS

This application claims priority to, U.S. Patent Application entitled "STRUCTURALLY-COLORED ARTICLES AND METHODS FOR MAKING AND USING STRUCTURALLY-COLORED ARTICLES," filed on Oct. 21, 2019, and assigned application No. 62/923,787 which is incorporated herein by reference in their entireties.

BACKGROUND

Structural color is caused by the physical interaction of light with the micro- or nano-features of a surface and the bulk material as compared to color derived from the presence of dyes or pigments that absorb or reflect specific wavelengths of light based on the chemical properties of the dyes or pigments. Color from dyes and pigments can be problematic in a number of ways. For example, dyes and pigments and their associated chemistries for fabrication and incorporation into finished goods may not be environmentally friendly.

BRIEF DESCRIPTION OF THE DRAWINGS

Further embodiments of the present disclosure will be more readily appreciated upon review of the detailed description of its various embodiments, described below, when taken in conjunction with the accompanying drawings.

Figure 1A:
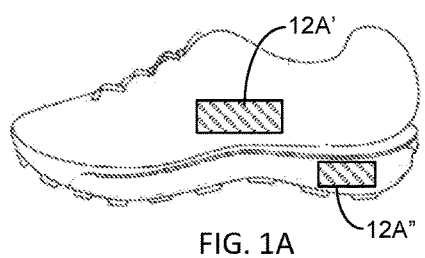
FIGS. 1A-1M shows various articles of footwear, apparel, athletic equipment, container, electronic equipment, and vision wear that include the primer layer in accordance with the present disclosure, while FIGS. 1N(a)-1Q(e) illustrate additional details regarding different types of footwear.
Figure 1B:
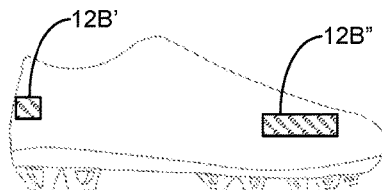
Figure 1C:
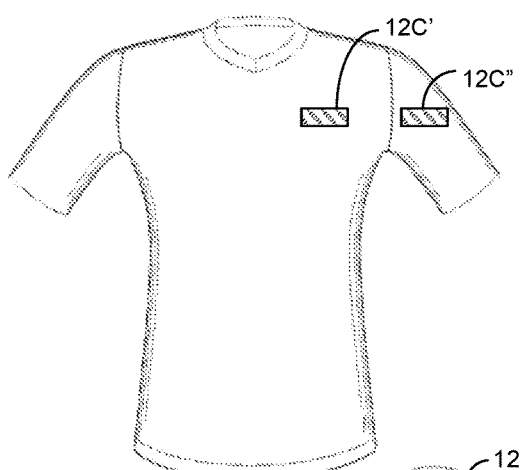
Figure 1D:
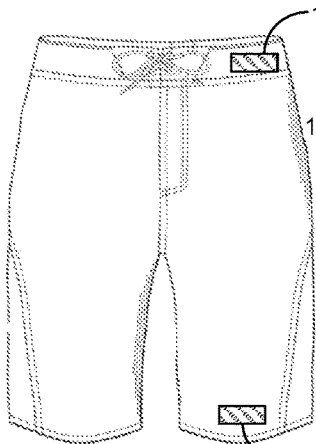
Figure 1E:
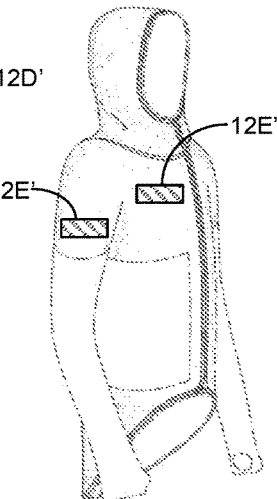
Figure 1F:
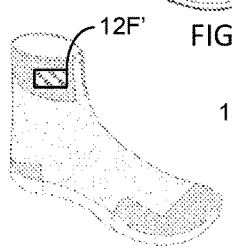
Figure 1G:
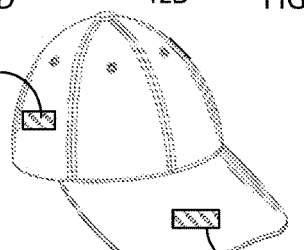
Figure 1H:
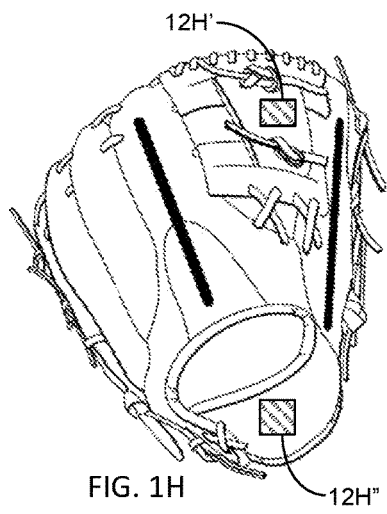
Figure 1I:
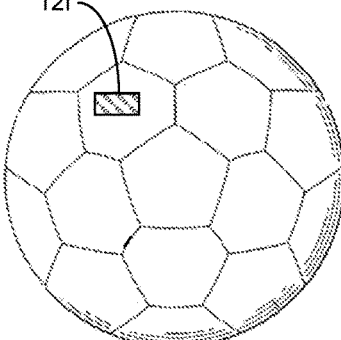
Figure 1J:
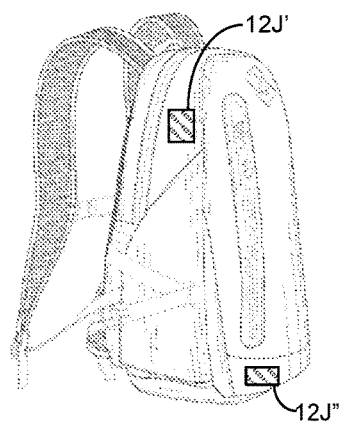
Figure 1K:
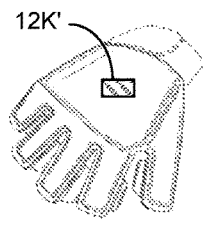
Figure 1L:
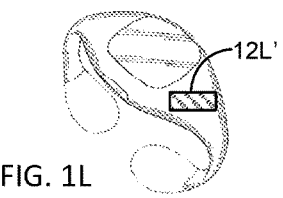
Figure 1M:
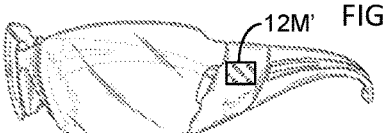

The drawings described herein are for illustration purposes only and are not intended to limit the scope of the present disclosure in any way.

DESCRIPTION

The present disclosure provides for articles that exhibit structural color upon exposure to white light (e.g., sunlight, artificial light, or a combination) that shifts based on the angle of observation and/or incident light. At least one shift in the structural color is between an achromatic structural color and a chromatic structural color. The shift occurs at different angles of observation and/or angle of incident light (e.g., about 10 or 15 degrees). The shift is not an iridescent shift in color and/or does not shift to an iridescent color. The structural color shift can be achieved using of an optical element. In this regard, the present disclosure provides for articles that exhibit a structural color shift between achromatic structural color and chromatic structural color (or vice versa) upon exposure to white light at different angles of observation and/or different angles of incident light, where the structural color is imparted by the optical element. The structural color (achromatic or chromatic color) is a visible color produced, at least in part, through optical effects (e.g., through scattering, refraction, reflection, interference, and/or diffraction of visible wavelengths of light). The optical element (e.g., a single layer or multilayer reflector or a single layer or multilayer filter; inorganic and/or organic material) can include the reflective layer(s) and/or constituent layer(s). In one embodiment, the reflective layer(s) and/or constituent layer(s) can be flat (planar) or substantially flat (substantially planar) or can have a textured topography or textured surface.

A "chromatic color" is a color in which one particular wavelength or hue predominates, while an "achromatic color" is a color in which no particular wavelength or hue predominates, as all wavelengths or hues are present in equal parts or substantially equal parts. The chromatic color can be selected from a red/yellow/blue (RYB) primary color, a RYB secondary color, a RYB tertiary color, a RYB quaternary color, a RYB quinary color, or a chromatic color that is a combination thereof. The chromatic color can be red, yellow, blue, green, orange, purple, or a chromatic color that is a combination thereof. The chromatic color can be red, orange, yellow, green, blue, indigo, violet, or a chromatic color that is a combination thereof. The chromatic color has hue and/or chroma according the Munsell color system. The chromatic color does not include black, white, or neutral gray. In an aspect, chromatic color and achromatic color are mutually exclusive of one another.

The achromatic color can be selected from black, white, or neutral gray. When the achromatic color is black, white, or a neutral gray, the phrase "pure achromatic color" can be used. As used herein, the achromatic color excludes the following colors: a warm gray, a warm brown, a warm tan, a cool gray, a cool brown, a cool tan, each of which is considered a chromatic color. For example, a warm gray, a warm brown, and a warm tan would be colors in which yellow or red predominates and so would not be achromatic. Similarly, a cool gray, a cool brown, and a cool tan would be colors in which blue or green predominates, and so would not be achromatic. Achromatic gray can include gainsboro gray, light gray, silver gray, medium gray, spanish gray, gray, dim gray, Davy's gray, jet gray, and the middle grays.

When the achromatic structural color is black, the optical element reflects all or substantially all of the wavelengths within the range of about 380 to 740 nanometers to substantially the same degree. The percent reflectance of the optical element is about 2 percent or less, about 1 percent or less, about 0.5 percent or less, about 0.1 percent or less, or 0 percent within the range of about 380 to 740 nanometers to substantially the same degree when the achromatic structural color is black. The percent absorbance of the optical element is about 98 percent or more, about 99 percent or more, about 99.5 percent or more, about 99.9 percent or more, about 100 percent within the range of about 380 to 740 nanometers to substantially the same degree when the achromatic structural color is black.

When the achromatic structural color is white, the optical element absorbs all wavelengths within the range of about 380 to 740 nanometers to substantially the same degree. The percent absorbance of the optical element is about 2 percent or less, about 1 percent or less, about 0.5 percent or less, about 0.1 percent or less, or 0 percent within the range of about 380 to 740 nanometers to substantially the same degree when the achromatic structural color is white. The percent reflectance of the optical element is about 98 percent or more, about 99 percent or more, about 99.5 percent or more, about 99.9 percent or more, or about 100 percent within the range of about 380 to 740 nanometers to substantially the same degree when the achromatic structural color is white.

If the achromatic structural color is neutral gray, then the percent absorbance is between the percent absorbance of black and white or the percent reflectance is between the percent absorbance of black and white. When the achromatic structural color is neutral gray, the percent absorbance of the optical element is about 2 to 98 percent, about 1 to 99 percent, about 0.5 to about 99.5 percent, or about 0.1 to about 99.9, within the range of about 380 to 740 nanometers to substantially the same degree. The percent reflectance of the optical element is about 2 to 98 percent, about 1 to 99 percent, about 0.5 to about 99.5 percent, or about 0.1 to about 99.9, within the range of about 380 to 740 nanometers to substantially the same degree, when the achromatic structural color is neutral gray.

The structural color shift (e.g., gradual or abrupt) occurs due to a change in the angle of incident light upon the optical element and/or upon a change in the observation angle of the optical element. The structural color can change from the achromatic color to the chromatic color or vice versa as the angle of incident light upon the optical element changes and/or as the observation angle of the optical element changes.

The change in the structural color upon a change in the angle of incident light and/or the observation angle upon the optical element can be evaluated using the CIE 1976 color space under a given illumination condition at two observation angles of about −15 and 180 degrees or about −15 degrees and +60 degrees and which are at least 15 degrees apart from each other. Under CIE 1976 color space under a given illumination condition a color measurement having coordinates $L_1^*$ and $a_1^*$ and $b_1^*$ can be obtained and measurements. A first color measurement can have coordinates $L_1^*$ and $a_1^*$ and $b_{1*}$, and a second color measurement can have coordinates $L_2^*$ and $a_2^*$ and $b_2^*$. For example, at a first observation angle the structural color is a first structural color having coordinates $L_1^*$ and $a_1^*$ and $b_1^*$ and at a second observation angle the structural color is a second structural color having coordinates $L_2^*$ and $a_2^*$ and $b_2^*$. $L_1^*$ and $L_2^*$ values may be the same or different, $a_1^*$ and $a_2^*$ coordinate values may be the same or different, $b_1^*$ and $b_2^*$ coordinate values may be the same or different, and the $\Delta E^*_{ab}$ between the first color measurement and the second color measurement is less than or equal to about 100, where $\Delta E^*_{ab} = [(L_1^* - L_2^*)^2 + (a_1^* - a_2^*)^2 + (b_1^* - b_2^*)^2]^{1/2}$.

A first color measurement at the first observation angle (e.g., the angle of incident light and/or the observation angle upon the optical element) can be obtained and has coordinates $L_1^*$ and $a_1^*$ and $b_{1*}$, while a second color measurement at the second observation angle can be obtained and has coordinates $L_2^*$ and $a_2^*$ and $b_2^*$ can be obtained. If the $\Delta E^*_{ab}$ between the first color measurement and the second color measurement is greater than 3 or optionally greater than about 4 or 5, then one of the first structural color (associated with the first color measurement) and the second structural color (associated with the second color measurement) is an achromatic structural color while the other is a chromatic structural color, where the two are perceptibly different to an average observer. The change from the achromatic structural color to the chromatic structural color is dependent, at least in part, on the angle of incident light upon the optical element and/or is dependent on the observation angle of the optical element. It is contemplated that a change in the structural color can be from a first chromatic structural color to a second chromatic structural color or from a first achromatic structural color to a second achromatic structural color, however these types of changes would likely occur for smaller changes in the observation angle than when there is a change from achromatic structural color to chromatic structural color.

In instances where the $\Delta E^*_{ab}$ between the first color measurement and the second color measurement is less than or equal to about 2.2 or is less than or equal to about 3, the first structural color associated with the first color measurement and the second structural color associated with the second color measurement are the same or not perceptibly different to an average observer. In other words, the structural color is independent of the angle of incident light upon the optical element or is independent of observation angle of the optical element and a structural color shift does not occur between the angles measured. In this instance, the difference between the first observation angle and the second observation angle was not enough for the shift from achromatic to chromatic structural color (or vice versa) to be observed.

In an alternative approach, in situations where the percent difference between one or more of values $L_1^*$ and $L_2^*$, $a_1^*$ and $a_2^*$, and $b_1^*$ and $b_2^*$ is greater than 20 percent, then one of the first structural color (associated with the first color measurement) and the second structural color (associated with the second color measurement) is an achromatic structural color while the other is a chromatic structural color, where the two are perceptibly different to an average observer. In this instance the change from the achromatic structural color to the chromatic structural color is dependent on the observation angle of the optical element. It is contemplated that a change in the structural color can be from a first chromatic structural color to a second chromatic structural color or from a first achromatic structural color to a second achromatic structural color, however these types of changes would likely occur and smaller changes in the observation angle than when there is a change from achromatic structural color to chromatic structural color.

If the percent difference between one or more of values $L_1^*$ and $L_{2*}$, $a_1^*$ and $a_{2*}$, and $b_1^*$ and $b_2^*$ is less than 20 percent, less than 10 percent, or less than 5 percent, the first structural color associated with the first color measurement and the second structural color associated with the second color measurement are the same or not perceptibly different to an average observer. The structural color is independent of the angle of incident light upon the optical element or is independent upon observation angle of the optical element and a structural color shift does not occur between the angles measured. In this instance, the difference between the first observation angle and the second observation angle was not enough for the shift from achromatic to chromatic structural color (or vice versa) to be observed.

The article includes the optical element including the one or more reflective layer(s), constituent layer(s), an optional textured surface, and, where the optical element is disposed on the surface of the article with the optional textured surface between the optical element and the surface or where the textured surface is part of the optical element, depending upon the design. The optical element and the optional textured surface can impart the structural color to the article, where the structural color can be designed to be different than the color of the components of the optical element or the underlying material, optionally with or without the application of pigments or dyes to the article. In this way, the structural color imparts an aesthetically appealing structural color that can shift to the article without requiring the use of inks or pigments and the environmental impact associated with their use.

The article can be a finished article such as, for example, an article of footwear, apparel or sporting equipment. The article can be a component of an article of footwear, apparel or sporting equipment, such as, for example, an upper or a sole for an article of footwear, a waistband or arm or hood of an article of apparel, a brim of a hat, a portion of a backpack, or a panel of a soccer ball, and the like. For example, the optical element can be disposed (e.g., affixed, attached, adhered, bonded, joined) on a surface of one or more components of the footwear, such as on the shoe upper and/or the sole. The optical element can be incorporated into the sole by incorporating it into a cushioning element such as a bladder or a foam. The sole and/or upper can be designed so that one or more portions of the structurally achromatically colored component are visible in the finished article, by including an opening, or a transparent component covering the structurally achromatically colored component, and the like.

The present disclosure provides for an article comprising: an optical element on a surface of the article, wherein the optical element imparts an achromatic color and a chromatic color to the article. The achromatic color can have no hue or chroma and has a value of 0 to 10 according to the Munsell color system, wherein the chromatic color has hue, chroma, or both hue and chroma. The achromatic color can be selected from black, white, or neutral gray and wherein the chromatic color can be a red/yellow/blue (RYB) primary color, a RYB secondary color, a RYB tertiary color, a RYB quaternary color, a RYB quinary color, or a chromatic color that is a combination thereof.

The optical element, as disposed onto the article, as measured according to the CIE 1976 color space under a given illumination condition has a color measurement that corresponds with the achromatic color, wherein the first color measurement has coordinates L* and a* and b*, wherein both of a* and b* are equal to 0.

The optical element, as disposed onto the article, as measured according to the CIE 1976 color space under a given illumination condition, has a first color measurement that corresponds with the achromatic color, wherein the first color measurement has coordinates L* and a* and b*, wherein one or both of a* and b* are equal to about 0 or wherein when a* or b* or both a* and b* are not equal to 0 but a* and b* are close enough to 0 that to an observer having 20/20 visual acuity and normal color vision from a distance of about 1 meter from the article considers the first color measurement achromatic color.

The optical element can include a textured surface having a plurality of profile features and flat planar areas, wherein the profile features extend above the flat areas of the textured surface, wherein the profile features and the flat areas result in at least one layer of the optical element having an undulating topography across the textured surface, wherein the achromatic color, the chromatic color, or both are unaffected or substantially unaffected by the undulating topography across the textured surface as compared to a substantially identical optical element which is free of the textured surface.

The present disclosure provide for an article comprising: an optical element on a surface of the article, wherein the optical element imparts a first structural color and a second structural color at different angles of observation, at different angles of incident light, or at both different angles of observation and different angles of incident light, wherein the first structural color is an achromatic color and the second structural color is a chromatic color. The achromatic color can be selected from black, white, or neutral gray. The achromatic color can have no hue or chroma and has a value of 0 to 10 according to the Munsell color system.

The optical element imparts the first structural color to the article from at a first angle of observation or a first angle of incident light and imparts the second structural color to the article from a second angle of observation or a second angle of incident light, wherein the first angle and the second angle are different by at least 15 degrees.

The achromatic color is black at the first angle of observation, wherein the optical element reflects all wavelengths within the range of about 380 to about 740 nanometers to substantially the same degree at the first angle of observation, wherein the observation angle is an observation angle at which the achromatic color is visible to an observer having 20/20 visual acuity and normal color vision from a distance of about 1 meter from the article. The percent reflectance of the optical element is about 2 percent or less at the first angle of observation for all of the wavelengths within the range of about 380 to about 740 nanometers or wherein the percent absorbance of the optical element is about 98 percent or more at the first angle of observation for all wavelengths within the range of about 380 to about 740 nanometers, wherein the observation angle is an observation angle at which the achromatic color is visible to an observer having 20/20 visual acuity and normal color vision from a distance of about 1 meter from the article.

The achromatic color is white, wherein the optical element absorbs all wavelengths within the range of about 380 to about 740 nanometers to substantially the same degree the first angle of observation, wherein the observation angle is an observation angle at which the achromatic color is visible to an observer having 20/20 visual acuity and normal color vision from a distance of about 1 meter from the article. The percent absorbance of the optical element is about 2 percent or less at the first angle of observation for all wavelengths within the range of about 380 to about 740 nanometers or wherein the percent reflectance of the optical element is about 98 percent or more at the first angle of observation for all wavelengths within the range of about 380 to about 740 nanometers, wherein the observation angle is an observation angle at which the achromatic color is visible to an observer having 20/20 visual acuity and normal color vision from a distance of about 1 meter from the article.

The achromatic color is neutral gray, wherein the percent absorbance of the optical element is about 2 to 98 percent at the first angle of observation for all wavelengths within the range of about 380 to about 740 nanometers or wherein the percent reflectance of the optical element is about 2 to 98 percent at the first angle of observation for all wavelengths within the range of about 380 to about 740 nanometers, wherein the observation angle is an observation angle at which the achromatic color is visible to an observer having 20/20 visual acuity and normal color vision from a distance of about 1 meter from the article.

The optical element, as disposed onto the article, when measured according to the CIE 1976 color space under a given illumination condition at angle of observation, has a color measurement that corresponds with the first structural color, wherein the first color measurement has coordinates $L_1^*$ and $a_1^*$ and $b_{1*}$, wherein both of $a_1^*$ and $b_1^*$ are equal to about 0 or wherein when a* or b* or both a* and b* are not equal to 0 but a* and b* are close enough to 0 that to an observer having 20/20 visual acuity and normal color vision from a distance of about 1 meter from the article considers the first structural color achromatic; and wherein the optical element, as disposed onto the article, when measured according to the CIE 1976 color space under a given illumination condition at angle of observation, has a color measurement that corresponds with the second structural color, wherein the second color measurement has coordinates $L_2^*$ and $a_2^*$ and $b_2^*$, wherein at least one of $a_2^*$ or $b_2^*$ is greater than 0 or less than 0 or optionally wherein when a* or b* or both a* and b* are not equal to 0 but a* and b* are far enough from 0 that to an observer having 20/20 visual acuity and normal color vision from a distance of about 1 meter from the article considers the second structural color chromatic.

The optical element can include a textured surface having a plurality of profile features and flat planar areas, wherein the profile features extend above the flat areas of the textured surface, wherein the profile features and the flat areas result in at least one layer of the optical element having an undulating topography across the textured surface, wherein the achromatic color at the first angle of observation is unaffected or substantially unaffected by the undulating topography across the textured surface as compared to a substantially identical optical element which is free of the textured surface and wherein the chromatic color at the second angle of observation is unaffected or substantially unaffected by the undulating topography across the textured surface as compared to a substantially identical optical element which is free of the textured surface.

The optical element can include at least one layer, wherein at least layer is made of a material selected from metal, metal oxide, or stainless steel. The article can be a non-woven synthetic leather upper for an article of footwear. The chromatic color can be blue, indigo, violet, or a chromatic color that is a combination thereof.

The present disclosure will be better understood upon reading the following numbered features, which should not be confused with the claims. Any of the numbered features below can, in some instances, be combined with features described elsewhere in this disclosure and such combinations are intended to form part of the disclosure and these combinations can be claimed.

Feature 1. An article comprising:
an optical element on a surface of the article, wherein the optical element imparts an achromatic color and a chromatic color to the article.

Feature 2. An article comprising:
an optical element on a surface of the article, wherein the optical element imparts a first structural color and a second structural color at different angles of observation and/or different angles of incident light, wherein the first structural color is an achromatic color and the second structural color is a chromatic color.

Feature 3. An article comprising:
an optical element on a surface of the article, wherein the optical element imparts a first structural color to the article from at a first angle of observation and/or a first angle of incident light and a second structural color to the article from a second angle of observation and/or a second angle of incident light, wherein the first structural color is an achromatic color and the second structural color is a chromatic color.

Feature 4. The article of any preceding feature, wherein the optical element, as disposed onto the article, when measured according to the CIE 1976 color space under a given illumination condition at angle of observation and/or an angle of incident light, has a color measurement that corresponds with the second structural color, wherein the second color measurement has coordinates L* and a* and b*, wherein at least one of a* or b* is greater than 0 or less than 0 or optionally wherein when a* or b* or both a* and b* are not equal to 0, a* and b* are far enough from 0 that to an observer having 20/20 visual acuity and normal color vision from a distance of about 1 meter from the article considers the second structural color chromatic.

Feature 5. The article of any preceding feature, wherein the chromatic color is a red/yellow/blue (RYB) primary color, a RYB secondary color, a RYB tertiary color, a RYB quaternary color, a RYB quinary color, or a chromatic color that is a combination thereof.

Feature 6. The article of any preceding feature, wherein the chromatic color is red, yellow, blue, green, orange, purple, or a chromatic color that is a combination thereof.

Feature 7. The article of any preceding feature, wherein the chromatic color is red, orange, yellow, green, blue, indigo, violet, or a chromatic color that is a combination thereof.

Feature 8. The article of any preceding feature, wherein the chromatic color has hue and chroma.

Feature 9. The article of any preceding feature, wherein the optical element, as disposed onto the article, as measured according to the CIE 1976 color space under a given illumination condition at angle of observation and/or an angle of incident light, has a color measurement that corresponds with the first structural color, wherein the first color measurement has coordinates L* and a* and b*, wherein both of a* and b* are equal to 0.

Feature 10. The article of any preceding feature, wherein the optical element, as disposed onto the article, as measured according to the CIE 1976 color space under a given illumination condition at angle of observation and/or an angle of incident light, has a color measurement that corresponds with the first structural color, wherein the first color measurement has coordinates L* and a* and b*, wherein one or both of a* and b* are equal to about 0 or equal to 0, wherein when a* or b* or both a* and b* are not equal to 0, a* and b* are close enough to 0 that to an observer having 20/20 visual acuity and normal color vision from a distance of about 1 meter from the article considers the first structural color achromatic.

Feature 11. The article of any preceding feature, wherein the optical element absorbs all wavelengths within the range of about 380 to about 740 nanometers to substantially the same degree (optionally wherein substantially the same degree is plus or minus about 5 percent, plus or minus about 10 percent, plus or minus about 15 percent) when viewed from an observation angle at which the structural color is the first structural color, optionally wherein the observation angle is an observation angle at which the first structural color is visible to an observer having 20/20 visual acuity and normal color vision from a distance of about 1 meter from the article.

Feature 12. The article of any preceding feature, wherein the optical element reflects all wavelengths within the range of about 380 to about 740 nanometers to substantially the same degree (optionally wherein substantially the same degree is plus or minus about 5 percent, plus or minus about 10 percent, plus or minus about 15 percent) when viewed from an observation angle at which the structural color is the first structural color, optionally wherein the observation angle is an observation angle at which the first structural color is visible to an observer having 20/20 visual acuity and normal color vision from a distance of about 1 meter from the article.

Feature 13. The article of any preceding feature, wherein the achromatic color is selected from black, white, or neutral gray.

Feature 14. The article of feature 13, wherein the achromatic color is black, optionally wherein the optical element reflects all wavelengths within the range of about 380 to about 740 nanometers to substantially the same degree when viewed from an observation angle at which the achromatic color is visible, optionally wherein the observation angle is an observation angle at which the achromatic color is visible to an observer having 20/20 visual acuity and normal color vision from a distance of about 1 meter from the article.

Feature 15. The article of feature 14, wherein the percent reflectance of the optical element is about 2 percent or less, about 1 percent or less, about 0.5 percent or less, about 0.1 percent or less, or 0 percent, for all of the wavelengths within the range of about 380 to about 740 nanometers.

Feature 16. The article of feature 13, wherein the achromatic color is black, optionally wherein the percent absorbance of the optical element is about 98 percent or more, about 99 percent or more, about 99.5 percent or more, about 99.9 percent or more, or 100 percent, for all wavelengths within the range of about 380 to about 740 nanometers when viewed from an observation angle at which the achromatic color is visible, optionally wherein the observation angle is an observation angle at which the achromatic color is visible to an observer having 20/20 visual acuity and normal color vision from a distance of about 1 meter from the article.

Feature 17. The article of feature 13, wherein the achromatic color is white, optionally wherein the optical element absorbs all wavelengths within the range of about 380 to about 740 nanometers to substantially the same degree when viewed from an observation angle at which the achromatic color is visible, optionally wherein the observation angle is an observation angle at which the achromatic color is visible to an observer having 20/20 visual acuity and normal color vision from a distance of about 1 meter from the article.

Feature 18. The article of feature 17, wherein the percent absorbance of the optical element is about 2 percent or less, about 1 percent or less, about 0.5 percent or less, about 0.1 percent or less, or about 0 percent, for all wavelengths within the range of about 380 to about 740 nanometers.

Feature 19. The article of feature 13, wherein the achromatic color is white, optionally wherein the percent reflectance of the optical element is about 98 percent or more, about 99 percent or more, about 99.5 percent or more, about 99.9 percent or more, or 100 percent, for all wavelengths within the range of about 380 to about 740 nanometers when viewed from an observation angle at which the achromatic color is visible, optionally wherein the observation angle is an observation angle at which the achromatic color is visible to a observer having 20/20 visual acuity and normal color vision from a distance of about 1 meter from the article.

Feature 20. The article of feature 13, wherein the achromatic color is neutral gray, optionally wherein the percent absorbance of the optical element is about 2 to 98 percent, about 1 to 99 percent, about 0.5 to about 99.5 percent, or about 0.1 to about 99.9, for all wavelengths within the range of about 380 to about 740 nanometers when viewed from an observation angle at which the achromatic color is visible, optionally wherein the observation angle is an observation angle at which the achromatic color is visible to an observer having 20/20 visual acuity and normal color vision from a distance of about 1 meter from the article.

Feature 21. The article of feature 132, wherein the achromatic color is neutral gray, optionally wherein the percent reflectance of the optical element is about 2 to 98 percent, about 1 to 99 percent, about 0.5 to about 99.5 percent, or about 0.1 to about 99.9, for all wavelengths within the range of about 380 to about 740 nanometers when viewed from an observation angle at which the achromatic color is visible, optionally wherein the observation angle is an observation angle at which the achromatic color is visible to a observer having 20/20 visual acuity and normal color vision from a distance of about 1 meter from the article.

Feature 22. The article of any preceding feature, wherein the achromatic color has no hue or chroma and has a value of 0 to 10 according to the Munsell color system.

Feature 23. The article of any preceding feature, wherein the optical element, as disposed onto the article, when measured according to the CIE 1976 color space under a given illumination condition at angle of observation and/or an angle of incident light, has a color measurement that corresponds with the first structural color, wherein the first color measurement has coordinates $L_1^*$ and $a_1^*$ and $b_{1*}$, wherein both of $a_1^*$ and $b_1^*$ are equal to about 0 or equal to 0, wherein when a* or b* or both a* and b* are not equal to 0, a* and b* are close enough to 0 that to an observer having 20/20 visual acuity and normal color vision from a distance of about 1 meter from the article considers the first structural color achromatic;

wherein the optical element, as disposed onto the article, when measured according to the CIE 1976 color space under a given illumination condition at angle of observation and/or an angle of incident light, has a color measurement that corresponds with the second structural color, wherein the second color measurement has coordinates $L_2^*$ and $a_2^*$ and $b_2^*$, wherein at least one of $a_2^*$ or $b_2^*$ is greater than 0 or less than 0 or optionally wherein when a* or b* or both a* and b* are not equal to 0, a* and b* are far enough from 0 that to an observer having 20/20 visual acuity and normal color vision from a distance of about 1 meter from the article considers the second structural color chromatic.

Feature 24. The article of any preceding feature, wherein the optical element, as disposed onto the article, when measured according to the CIE 1976 color space under a given illumination condition at two observation angles which are at least 15 degrees apart from each other, has the first structural color and the second structural color, wherein the optical element has a first color measurement at the first observation angle having coordinates $L_1^*$ and $a_1^*$ and $b_1^*$ over the wavelength range of about 380 to 740 nanometers and a second color measurement at the second observation angle having coordinates $L_2^*$ and $a_2^*$ and $b_2^*$ over the wavelength range of about 380 to 740 nanometers, wherein both of $a_1^*$ and $b_1^*$ are equal to 0, wherein the first color measurement corresponds to the first structural color and the second color measurement corresponds to the second structural color, wherein at least one of $a_1^*$ and $a_2^*$ coordinate values are different, $b_1^*$ and $b_2^*$ coordinate values are different, or both $a_1^*$ and $a_2^*$ coordinate values are different and $b_1^*$ and $b_2^*$ coordinate values are different, wherein $\Delta E^*_{ab} = [(L_1^* - L_2^*)^2 + (a_1^* - a_2^*)^2 + (b_1^* - b_2^*)^2]^{1/2}$, and wherein the $\Delta E^*_{ab}$ between the first color measurement and the second color measurement is greater than 3, or optionally wherein the $\Delta E^*_{ab}$ between the first color measurement and the second color measurement is more than or equal to about 4 or 5, or 10.

Feature 25. The article of any preceding feature, wherein the optical element, as disposed onto the article, when measured according to the CIE 1976 color space under a given illumination condition at two observation angles which are at least 15 degrees apart from each other, has the first structural color and the second structural color, wherein the optical element has a first color measurement at the first observation angle having coordinates $L_1^*$ and $a_1^*$ and $b_1^*$ over the wavelength range of 380 to 740 nanometers and a second color measurement at the second observation angle having coordinates $L_2^*$ and $a_2^*$ and $b_2^*$ over the wavelength range of 380 to 740 nanometers, wherein both of $a_1^*$ and $b_1^*$ are equal to 0, wherein the first color measurement corresponds to the first structural color and the second color measurement corresponds to the second structural color, wherein at least one of $a_1^*$ and $a_2^*$ coordinate values are different, $b_1^*$ and $b_2^*$ coordinate values are different, or both $a_1^*$ and $a_2^*$ coordinate values and $b_1^*$ and $b_2^*$ coordinate values are different, wherein the percent difference between one or more of values $a_1^*$ and $a_2^*$ or $b_1^*$ and $b_2^*$ is greater than 20 percent (optionally, greater than 25 percent, greater than 30 percent, greater than 35 percent).

Feature 26. A method, comprising:
disposing an optical element on a surface of an article according to any one of features 1 to 25.

Feature 27. The method of feature 26, wherein disposing the optical element comprises forming the optical element on the surface of the article.

Feature 28. The method of any one of the preceding features, wherein disposing the optical element comprises forming the optical element on a surface of a component, and then disposing the component with the optical element on a surface of the article; optionally wherein the component is a film, or a textile, or a molded component.

Feature 29. The method of any one of the preceding features, wherein forming the optical element comprises using: physical vapor deposition, electron beam deposition, atomic layer deposition, molecular beam epitaxy, cathodic arc deposition, pulsed laser deposition, sputtering, chemical vapor deposition, plasma-enhanced chemical vapor deposition, low pressure chemical vapor deposition, wet chemistry techniques, or a combination thereof.

Feature 30. The method of any one of the preceding features, wherein disposing the optical element comprises depositing the at least one reflective layer and the at least two constituent layers of the optical element using a deposition process, wherein the method optionally includes depositing a first reflective layer comprising a metal, depositing a first constituent layer comprising a metal oxide on the first reflective layer, and depositing a second constituent layer comprising a metal oxide on the first reflective layer.

Feature 31. An article comprising: a product of the method of any one of the preceding method features.

Feature 32. The methods and/or articles of any one of the preceding features, wherein the optical element is disposed on an externally-facing side of the article.

Feature 33. The methods and/or articles of any one of the preceding features, wherein the article comprises a polymer material.

Feature 34. The methods and/or articles of any one of the preceding features, wherein the optical element is disposed on the polymer material.

Feature 35. The methods and/or articles of any one of the preceding features, wherein the optical element is a single-layer reflector, a multilayer reflector, a single-layer filter, or a multilayer filter.

Feature 36. The methods and/or articles of any one of the preceding features, wherein the multilayer reflector has at least two constituent layers and the at least one reflector layer.

Feature 37. The methods and/or articles of any one of the preceding features, wherein the at least two constituent layers adjacent to the base reflective layer have different refractive indices, optionally wherein each constituent layer of the multilayer reflector has a thickness of about one quarter of the wavelength of the wavelength to be reflected.

Feature 38. The article and/or method of any one of the preceding features, wherein the optical element includes a textured surface having a plurality of profile features and flat planar areas, wherein the profile features extend above the flat areas of the textured surface, wherein the profile features and the flat areas result in at least one layer of the optical element having an undulating topography across the textured surface, wherein the achromatic color at the first angle of observation is unaffected or substantially unaffected by the undulating topography across the textured surface as compared to a substantially identical optical element which is free of the textured surface and wherein the chromatic color at the second angle of observation is unaffected or substantially unaffected by the undulating topography across the textured surface as compared to a substantially identical optical element which is free of the textured surface.

Feature 39. The article and/or method of any one of the preceding features, wherein the optical element is an optical element, an organic optical element, or a mixed/organic optical element.

Feature 40. The article and/or method of any one of the preceding features, wherein the organic optical element has at least one layer that is made of an organic material, optionally wherein the at least one layer is made of a non-metal or non-metal oxide material, optionally, wherein at least one layer is made of a polymeric material (optionally a synthetic polymeric material), optionally wherein the at least one layer is made an organic material that does not include a metal or metal oxide, optionally wherein the at least one layer is made of a polymeric (optionally a synthetic polymeric material) that does not include a metal or metal oxide.

Feature 41. The methods and/or articles of any one of the preceding features, wherein the at least one reflective layer is made of a material selected from a metal or a metal oxide.

Feature 42. The methods and/or articles of any one of the features, wherein the at least one reflective layer is made of a metal.

Feature 43. The methods and/or articles of any one of the preceding features, wherein adjacent constituent layers have different refractive indices.

Feature 44. The methods and/or articles of any one of the preceding features, wherein the each constituent layer of the multilayer reflector has a thickness of about one quarter of the wavelength of the wavelength to be reflected.

Feature 45. The methods and/or articles of any of the preceding features, wherein the optical element has a thickness of about 100 to about 700 nanometers, or of about 200 to about 500 nanometers, optionally wherein the optical element has an area of about 1 centimeter squared to 20 centimeter squared, about 1 centimeter squared to 50 centimeter squared, about 1 centimeter squared to 100 centimeter squared (optionally or more), about 5 centimeter squared to 50 centimeter squared, about 5 centimeter squared to 30 centimeter squared, about 5 centimeter squared to 20 centimeter squared, about 3 centimeter squared to 20 centimeter squared, about 3 centimeter squared to 15 centimeter squared, about 3 centimeter squared to 30 centimeter squared, about 10 centimeter squared to 100 centimeter squared, about 10 centimeter squared to 70 centimeter squared, about 10 centimeter squared to 50 centimeter squared, about 10 centimeter squared to 30 centimeter squared, as well as any ranges in increments of 1 cm in each range provided above and herein.

Feature 46. The methods and/or articles of any one of the preceding features, wherein the at least one reflector layer is made of a material selected from metal or metal oxide.

Feature 47. The methods and/or articles of any one of the preceding features, wherein the metal is selected from the group consisting of: titanium, aluminum, silver, zirconium, chromium, magnesium, silicon, gold, platinum, and a combination thereof.

Feature 48. The methods and/or articles of any one of the preceding features, the base reflective layer has a thickness of at least 10 nanometers (optionally at least 30 nanometers, optionally at least 40 nanometers, optionally at least 50 nanometers, optionally at least 60 nanometers, optionally a thickness of from about 10 nanometers to about 100 nanometers, or of from about 30 nanometers to about 80 nanometers, or from about 40 nanometers to about 60 nanometers).

Feature 49. The methods and/or articles of any one of the preceding features, wherein the constituent layer is made of a material selected from the group consisting of: silicon dioxide, titanium dioxide, zinc sulphide, magnesium fluoride, tantalum pentoxide, and a combination thereof.

Feature 50. The methods and/or articles of any one of the preceding features, wherein the at least one reflective layer comprises a titanium layer, wherein the first constituent layer comprises a titanium dioxide layer, or a silicon layer, and wherein the second constituent layer comprises a titanium dioxide layer or a silicon dioxide layer.

Feature 51. The methods and/or articles of any one of the preceding features, wherein the first surface of the article includes or is a textile; optionally wherein the textile is a woven, crochet, braided, knit or nonwoven textile; and optionally wherein the textile has a mesh structure.

Feature 52. The methods and/or articles of any one of the preceding features, wherein the article includes or is a fiber.

Feature 53. The methods and/or methods and/or articles of any one of the preceding features, wherein the article is a yarn, optionally wherein the yarn is a monofilament yarn.

Feature 54. The methods and/or articles of any one of the preceding features, wherein the article is a film.

Feature 55. The methods and/or articles of any one of the preceding features, wherein the article is an article of footwear, a component of footwear, an article of apparel, a component of apparel, an article of sporting equipment, or a component of sporting equipment.

Feature 56. The methods and/or articles of any one of the preceding features, wherein the article is an article of footwear.

Feature 57. The methods and/or articles of any one of the preceding features, wherein the article is a sole component of an article of footwear, wherein the optical element is disposed on the sole component.

Feature 58. The methods and/or articles of any one of the preceding features, wherein the sole component includes a foam, wherein the optical element is disposed on the foam.

Feature 59. The methods and/or articles of any one of the preceding features, wherein the sole component includes a solid polymeric molded component, wherein the optical element is disposed on the solid polymeric molded component.

Feature 60. The methods and/or articles of any one of the preceding features, wherein the article is an upper component of an article of footwear, wherein the optical element is disposed on the upper component.

Feature 61. The methods and/or articles of any one of the preceding features, wherein the article is a knit upper component of an article of footwear.

Feature 62. The methods and/or articles of any one of the preceding features, wherein the article is a non-woven synthetic leather upper for an article of footwear.

Feature 63. The methods and/or articles of any one of the preceding features, wherein the article is a bladder including a volume of a fluid, wherein the bladder has a first bladder wall having a first bladder wall thickness, wherein the first bladder wall has a gas transmission rate of 15 $cm^3/m^2 \cdot atm \cdot day$ or less for nitrogen for an average wall thickness of 20 mils.

Feature 64. The methods and/or articles of any one of the preceding features, wherein the article is a bladder, and the optical element is optionally on an inside surface of the bladder or optionally the optical element is on an outside surface of the bladder.

Feature 65. The article and/or method of any of the preceding features, wherein the profile feature has at least one dimension greater than 500 micrometers and optionally greater than about 600 micrometers.

Feature 66. The article and/or method of any of the preceding features, wherein at least one of the length and width of the profile feature is greater than 500 micrometers or optionally both the length and the width of the profile feature is greater than 500 micrometers.

Feature 67. The article and/or method of any of the preceding features, wherein the height of the profile features can be greater than 50 micrometers or optionally greater than about 60 micrometers.

Feature 68. The article and/or method of any of the preceding features, wherein at least one of the length and width of the profile feature is less than 500 micrometers or both the length and the width of the profile feature is less than 500 micrometers, while the height is greater than 50 micrometers.

Feature 69. The article and/or method of any of the preceding features, wherein at least one of the length and width of the profile feature is greater than 500 micrometers or both the length and the width of the profile feature is greater than 500 micrometers, while the height is greater than 50 micrometers.

Feature 70. The article and/or method of any of the preceding features, wherein at least one of the dimensions of the profile feature is in the nanometer range, while at least one other dimension is in the micrometer range.

Feature 71. The article and/or method of any of the preceding features, wherein the nanometer range is about 10 nanometers to about 1000 nanometers, while the micrometer range is about 5 micrometers to 500 micrometers.

Feature 72. The article and/or method of any of the preceding features, wherein at least one of the length and width of the profile feature is in the nanometer range, while the other of the length and the width of the profile feature is in the micrometer range.

Feature 73. The article and/or method of any of the preceding features, wherein height of the profile features is greater than 250 nanometers.

Feature 74. The article and/or method of any of the preceding features, wherein at least one of the length and width of the profile feature is in the nanometer range and the other in the micrometer range, where the height is greater than 250 nanometers.

Feature 75. The article and/or method of any of the preceding features, wherein spatial orientation of the profile features is periodic.

Feature 76. The article and/or method of any of the preceding features, wherein spatial orientation of the profile features is a semi-random pattern or a set pattern.

Feature 77. The article and/or method of any of the preceding features, wherein the surface of the layers of the optical element are a substantially three dimensional flat planar surface or a three dimensional flat planar surface.

Feature 78. The article and/or method of any preceding feature, wherein the structural color is dependent upon the angle of incident light upon the optical element, the observation angle of the optical element, or both.

Feature 79. The article and/or method of any preceding feature, wherein the color is different at two or more angles of incident light upon the optical element, different at two or more observation angles of the optical element, or both.

Feature 80. The article and/or method of any of the preceding features, wherein the structural color is not affected by the presence of the textured surface.

Feature 81. The article and/or method of any of the preceding features, wherein the structural color is affected by less than 20 percent by the presence of the textured surface.

Feature 82. The article and/or method of any of the preceding features, wherein the structural color is due solely to the optical element consisting of the one or more constituent layers, optionally one or more reflective layers, or both one or more constituent layers and one or more reflective layers.

Feature 83. The article of any one of the preceding features, wherein a layer of the optical element further comprises a textured surface.

Feature 84. The article of feature 83, wherein a layer of the optical element further comprises a textured surface, wherein the optical element is on the textured surface, and a hue of the second structural color, an intensity of the second structural color, a viewing angle at which the second structural color is visible, or any combination thereof, is altered by the textured surface, as determined by comparing the optical element comprising the textured surface of a substantially identical optical element which is free of the textured surface.

Feature 85. The article of feature 83, wherein a layer of the optical element further comprises a textured surface, wherein the optical element is on the textured surface, wherein the textured surface reduces or eliminates shift of the first structural color to the second structural color as a viewing angle is varied from a first viewing angle to a second viewing angle, as compared to a substantially identical optical element which is free of the textured surface.

Feature 86. The article of feature 83, wherein a layer of the optical element further comprises a textured surface, wherein the optical element is on the textured surface, wherein the textured surface reduces or eliminates shift of the first structural color as a viewing angle is varied from a first viewing angle to a second viewing angle, as compared to a substantially identical optical element which is free of the textured surface.

Feature 87. The article of feature 83, wherein a layer of the optical element further comprises a textured surface, wherein the optical element is on the textured surface, and a hue of the second structural color, an intensity of the second structural color, a viewing angle at which the second structural color is visible, or any combination thereof, is unaffected by or substantially unaffected by the textured surface, as determined by comparing the optical element comprising the textured surface to a substantially identical optical element which is free of the textured surface.

Feature 88. The article of feature 83, wherein a layer of the optical element further comprises a textured surface, wherein the optical element is on the textured surface, wherein shift of the first structural color to the second structural color is unaltered by or substantially the same as a viewing angle is varied from a first viewing angle to a second viewing angle, as compared to a substantially identical optical element which is free of the textured surface.

Feature 89. The article of feature 83, wherein a layer of the optical element further comprises a textured surface, wherein the optical element is on the textured surface, wherein shift of the second structural color is unaltered by or substantially the same as a viewing angle is varied from a first viewing angle to a second viewing angle, as compared to a substantially identical optical element which is free of the textured surface.

Feature 90. The article of any one of the preceding features, wherein the surface of the article is a textured surface, wherein the optical element is on the textured surface.

Feature 91. The article of feature 90, wherein the surface of the article is a textured surface, wherein the optical element is on the textured surface, and a hue of the second structural color, an intensity of the second structural color, a viewing angle at which the second structural color is visible, or any combination thereof, is altered by the textured surface, as determined by comparing the optical element comprising the textured surface of a substantially identical optical element on a surface of a substantially identical article which is free of the textured surface.

Feature 92. The article of feature 90, wherein the surface of the article is a textured surface, wherein the optical element is on the textured surface, wherein the textured surface reduces or eliminates shift of the first structural color to the second structural color as a viewing angle is varied from a first viewing angle to a second viewing angle, as compared to a substantially identical optical element on a surface of a substantially identical article which is free of the texture.

Feature 93. The article of feature 90, wherein the surface of the article is a textured surface, wherein the optical element is on the textured surface, wherein the textured surface reduces or eliminates shift of the second structural color as a viewing angle is varied from a first viewing angle to a second viewing angle, as compared to a substantially identical optical element on a surface of a substantially identical article which is free of the texture.

Feature 94. The article of feature 90, wherein the surface of the article is a textured surface, wherein the optical element is on the textured surface, and a hue of the second structural color, an intensity of the second structural color, a viewing angle at which the second structural color is visible, or any combination thereof, is unaffected by or substantially unaffected by the textured surface, as determined by comparing the optical element comprising the textured surface to a substantially identical optical element on a surface of a substantially identical article which is free of the textured surface.

Feature 95. The article of feature 90, wherein the surface of the article is a textured surface, wherein the optical element is on the textured surface, wherein shift of the first structural color to the second structural color is unaltered by or substantially the same as a viewing angle is varied from a first viewing angle to a second viewing angle, as compared to a substantially identical optical element on a surface of a substantially identical article which is free of the textured surface.

Feature 96. The article of feature 90, wherein the surface of the article is a textured surface, wherein the optical element is on the textured surface, wherein shift of the second structural color is unaltered by or substantially the same as a viewing angle is varied from a first viewing angle to a second viewing angle, as compared to a substantially identical optical element on a surface of a substantially identical article which is free of the textured surface.

Feature 97. The article of any one of the preceding features, wherein the textured surface includes a plurality of profile features and flat planar areas, wherein the profile features extend above the flat areas of the textured surface.

Feature 98. The article feature 97, wherein dimensions of the profile features, a shape of the profile features, a spacing among the plurality of the profile features, or any combination thereof, in combination with the optical element, affect a hue of the first structural color, a hue of the second structural color, an intensity of the first structural color, an intensity of the second structural color, a viewing angle at which the first structural color is visible, a viewing angle at which the second structural color is visible, shift of the first structural color to the second structural color as a viewing angle is varied from a first viewing angle to a second viewing angle, or any combination thereof.

Feature 99. The article feature 97, wherein dimensions of the profile features, a shape of the profile features, a spacing among the plurality of the profile features, or any combination thereof, in combination with the optical element, affect a hue of the second structural color, an intensity of the second structural color, a viewing angle at which the second structural color is visible, shift of the second structural color as a viewing angle is varied from a first viewing angle to a second viewing angle, or any combination thereof.

Feature 100. The article of feature 97, wherein a hue of the first structural color, a hue of the second structural color, an intensity of the first structural color, an intensity of the second structural color, a viewing angle at which the first structural color is visible, a viewing angle at which the second structural color is visible, shift of the first structural color to the second structural color as a viewing angle is varied from a first viewing angle to a second viewing angle, or any combination thereof, are unaffected or substantially unaffected by dimensions of the profile features, a shape of the profile features, a spacing among the plurality of the profile features, or any combination thereof, of the textured surface.

Feature 101. The article of feature 97, wherein a hue of the second structural color, an intensity of the second structural color, a viewing angle at which the second structural color is visible, shift of the second structural color as a viewing angle is varied from a first viewing angle to a second viewing angle, or any combination thereof, are unaffected or substantially unaffected by dimensions of the profile features, a shape of the profile features, a spacing among the plurality of the profile features, or any combination thereof, of the textured surface.

Feature 102. The article of feature 97, wherein the profile features of the textured surface are in random positions relative to one another within a specific area and/or wherein spacing among the profile features is random within a specific area.

Feature 103. The article of feature 102, wherein spacing between the profile features, in combination with the optical element, affects a hue of the first structural color, a hue of the second structural color, an intensity of the first structural color, an intensity of the second structural color, a viewing angle at which the first structural color is visible, a viewing angle at which the second structural color is visible, shift of the first structural color to the second structural color as a viewing angle is varied from a first viewing angle to a second viewing angle, or any combination thereof.

Feature 104. The article of feature 102, wherein spacing between the profile features, in combination with the optical element, affects a hue of the second structural color, an intensity of the second structural color, a viewing angle at which the second structural color is visible, shift of the second structural color as a viewing angle is varied from a first viewing angle to a second viewing angle, or any combination thereof.

Feature 105. The article of feature 102, wherein a hue of the first structural color, a hue of the second structural color, an intensity of the first structural color, an intensity of the second structural color, a viewing angle at which the first structural color is visible, a viewing angle at which the second structural color is visible, shift of the first structural color to the second structural color as a viewing angle is varied from a first viewing angle to a second viewing angle, or any combination thereof, is unaffected by, or substantially unaffected by, spacing between the profile features in combination with the optical element.

Feature 106. The article of feature 102, wherein a hue of the second structural color, an intensity of the second structural color, a viewing angle at which the second structural color is visible, shift of the second structural color as a viewing angle is varied from a first viewing angle to a second viewing angle, or any combination thereof, is unaffected by, or substantially unaffected by, spacing between the profile features in combination with the optical element.

Feature 107. The article of any one of the preceding features, wherein the profile features and the flat areas result in at least one layer of the optical element having an undulating topography across the textured surface, and wherein there is a planar region between neighboring profile features that is planar with the flat planar areas of the textured surface.

Feature 108. The article of feature 107, wherein dimensions of the planar region relative to the profile features affect a hue of the first structural color, a hue of the second structural color, an intensity of the first structural color, an intensity of the second structural color, a viewing angle at which the first structural color is visible, a viewing angle at which the second structural color is visible, shift of the first structural color to the second structural color as a viewing angle is varied from a first viewing angle to a second viewing angle, or any combination thereof.

Feature 109. The article of feature 107, wherein dimensions of the planar region relative to the profile features affect a hue of the second structural color, an intensity of the second structural color, a viewing angle at which the second structural color is visible, shift of the first structural color to the second structural color as a viewing angle is varied from a first viewing angle to a second viewing angle, or any combination thereof.

Feature 110. The article of feature 107, wherein a hue of the second structural color, an intensity of the second structural color, a viewing angle at which the second structural color is visible, shift of the second structural color as a viewing angle is varied from a first viewing angle to a second viewing angle, or any combination thereof, is unaffected by or substantially unaffected by dimensions of the planar region relative to the profile features.

Feature 111. The article of any one of the preceding feature, wherein the profile features and the flat areas result in each layer of the optical element having an undulating topography across the textured surface.

Feature 112. The article of feature 111, wherein the undulating topography of the optical element affects a hue of the first structural color, a hue of the second structural color, an intensity of the first structural color, an intensity of the second structural color, a viewing angle at which the first structural color is visible, a viewing angle at which the second structural color is visible, shift of the first structural color to the second structural color as a viewing angle is varied from a first viewing angle to a second viewing angle, or any combination thereof.

Feature 113. The article of feature 111, wherein the undulating topography of the optical element affects a hue of the second structural color, an intensity of the second structural color, a viewing angle at which the second structural color is visible, shift of the second structural color as a viewing angle is varied from a first viewing angle to a second viewing angle, or any combination thereof.

Feature 114. The article of feature 111, wherein a hue of the first structural color, a hue of the second structural color, an intensity of the first structural color, an intensity of the second structural color, a viewing angle at which the first structural color is visible, a viewing angle at which the second structural color is visible, shift of the first structural color to the second structural color as a viewing angle is varied from a first viewing angle to a second viewing angle, or any combination thereof, is unaffected by or substantially unaffected by the undulating topography of the optical element.

Feature 115. The article of feature 111, wherein a hue of the second structural color, an intensity of the second structural color, a viewing angle at which the second structural color is visible, shift of the second structural color as a viewing angle is varied from a first viewing angle to a second viewing angle, or any combination thereof, is unaffected by or substantially unaffected by the undulating topography of the optical element.

Feature 116. The article and/or method of any preceding feature, wherein a layer of the optical element further comprises a textured surface, wherein the optical element is on the textured surface, and a lightness (e.g., L* of CIE 1976 color space or CIELAB) of the achromatic structural color is altered by the textured surface, as determined by comparing the optical element comprising the textured surface of a substantially identical optical element which is free of the textured surface.

Feature 117. The article and/or method of any preceding feature, wherein a layer of the optical element further comprises a textured surface, wherein the optical element is on the textured surface, wherein the textured surface reduces or eliminates shift of the achromatic structural color as a viewing angle is varied from a first viewing angle to a second viewing angle, as compared to a substantially identical optical element which is free of the textured surface.

Feature 118. The article and/or method of any preceding feature, wherein a layer of the optical element further comprises a textured surface, wherein the optical element is on the textured surface, and a lightness (e.g., L* of CIE 1976 color space or CIELAB) (optionally a hue and/or a chroma) is unaffected by or substantially unaffected by the textured surface, as determined by comparing the optical element comprising the textured surface to a substantially identical optical element which is free of the textured surface.

Feature 119. The article and/or method of any preceding feature, wherein a layer of the optical element further comprises a textured surface, wherein the optical element is on the textured surface, wherein shift of the achromatic structural color is unaltered by or substantially the same as a viewing angle is varied from a first viewing angle to a second viewing angle, as compared to a substantially identical optical element which is free of the textured surface.

Feature 120. The article and/or method of any preceding feature, wherein the surface of the article is a textured surface, wherein the optical element is on the textured surface, and a lightness (e.g., L* of CIE 1976 color space or CIELAB), is altered by the textured surface, as determined by comparing the optical element comprising the textured surface of a substantially identical optical element on a surface of a substantially identical article which is free of the textured surface.

Feature 121. The article and/or method of any preceding feature, wherein the surface of the article is a textured surface, wherein the optical element is on the textured surface, wherein the textured surface reduces or eliminates shift of the achromatic structural color as a viewing angle is varied from a first viewing angle to a second viewing angle, as compared to a substantially identical optical element on a surface of a substantially identical article which is free of the texture.

Feature 122. The article and/or method of any preceding feature, wherein the surface of the article is a textured surface, wherein the optical element is on the textured surface, and a lightness (e.g., L* of CIE 1976 color space or CIELAB) (optionally a hue and/or a chroma) is unaffected by or substantially unaffected by the textured surface, as determined by comparing the optical element comprising the textured surface to a substantially identical optical element on a surface of a substantially identical article which is free of the textured surface.

Feature 123. The article and/or method of any preceding feature, wherein the surface of the article is a textured surface, wherein the optical element is on the textured surface, wherein shift of the achromatic structural color is unaltered by or substantially the same as a viewing angle is varied from a first viewing angle to a second viewing angle, as compared to a substantially identical optical element on a surface of a substantially identical article which is free of the textured surface.

Feature 124. The article and/or method of any preceding feature, wherein dimensions of the profile features, a shape of the profile features, a spacing among the plurality of the profile features, or any combination thereof, in combination with the optical element, affect a lightness (e.g., L* of CIE 1976 color space or CIELAB), a shift of the achromatic structural color as a viewing angle is varied from a first viewing angle to a second viewing angle, or any combination thereof.

Feature 125. The article and/or method of any preceding feature, wherein a lightness (e.g., L* of CIE 1976 color space or CIELAB) (optionally a hue and/or a chroma), a shift of the structural color as a viewing angle is varied from a first viewing angle to a second viewing angle, or any combination thereof, are unaffected or substantially unaffected by dimensions of the profile features, a shape of the profile features, a spacing among the plurality of the profile features, or any combination thereof, of the textured surface.

Feature 126. The article and/or method of any preceding feature, wherein the profile features of the textured surface are in random positions relative to one another within a specific area.

Feature 127. The article and/or method of any preceding feature, wherein spacing among the profile features is random within a specific area.

Feature 128. The article and/or method of any preceding feature, wherein spacing between the profile features, in combination with the optical element, affects a lightness (e.g., L* of CIE 1976 color space or CIELAB), a shift of the achromatic structural color as a viewing angle is varied from a first viewing angle to a second viewing angle, or any combination thereof.

Feature 129. The article and/or method of any preceding feature, wherein a lightness (e.g., L* of CIE 1976 color space or CIELAB) (optionally a hue and/or a chroma), a shift of the achromatic structural color as a viewing angle is varied from a first viewing angle to a second viewing angle, or any combination thereof, is unaffected by, or substantially unaffected by, spacing between the profile features in combination with the optical element.

Feature 130. The article and/or method of any preceding feature, wherein the profile features and the flat areas result in at least one layer of the optical element having an undulating topography across the textured surface, and wherein there is a planar region between neighboring profile features that is planar with the flat planar areas of the textured surface.

Feature 131. The article and/or method of any preceding feature, wherein dimensions of the planar region relative to the profile features affect a lightness (e.g., L* of CIE 1976 color space or CIELAB), a shift of the achromatic structural color as a viewing angle is varied from a first viewing angle to a second viewing angle, or any combination thereof.

Feature 132. The article and/or method of any preceding feature, wherein a lightness (e.g., L* of CIE 1976 color space or CIELAB) (optionally a hue and/or a chroma), a shift of the achromatic structural color as a viewing angle is varied from a first viewing angle to a second viewing angle, or any combination thereof, is unaffected by or substantially unaffected by dimensions of the planar region relative to the profile features.

Feature 133. The article and/or method of any one of the preceding features, wherein the profile features and the flat areas result in each layer of the optical element having an undulating topography across the textured surface.

Feature 134. The article and/or method of any preceding feature, wherein the undulating topography of the optical element affects a lightness (e.g., L* of CIE 1976 color space or CIELAB), a shift of the achromatic structural color as a viewing angle is varied from a first viewing angle to a second viewing angle, or any combination thereof.

Feature 135. The article and/or method of any preceding feature, wherein a lightness (e.g., L* of CIE 1976 color space or CIELAB) (optionally a hue and/or a chroma), a shift of the achromatic structural color as a viewing angle is varied from a first viewing angle to a second viewing angle, or any combination thereof, is unaffected by or substantially unaffected by the undulating topography of the optical element.

Feature 1A. An article comprising:
an optical element on a surface of the article, wherein the optical element imparts an achromatic color and a chromatic color to the article.

Feature 2A. The article of feature 1A, wherein the achromatic color has no hue or chroma and has a value of 0 to 10 according to the Munsell color system, wherein the chromatic color has hue, chroma, or both hue and chroma.

Feature 3A. The article of feature 1A, wherein the achromatic color is selected from black, white, or neutral gray and wherein the chromatic color is a red/yellow/blue (RYB) primary color, a RYB secondary color, a RYB tertiary color, a RYB quaternary color, a RYB quinary color, or a chromatic color that is a combination thereof.

Feature 4A. The article of feature 1A, wherein the optical element, as disposed onto the article, as measured according to the CIE 1976 color space under a given illumination condition has a color measurement that corresponds with the achromatic color, wherein the first color measurement has coordinates L* and a* and b*, wherein both of a* and b* are equal to 0.

Feature 5A. The article of feature 1A, wherein the optical element, as disposed onto the article, as measured according to the CIE 1976 color space under a given illumination condition, has a first color measurement that corresponds with the achromatic color, wherein the first color measurement has coordinates L* and a* and b*, wherein one or both of a* and b* are equal to about 0 or wherein when a* or b* or both a* and b* are not equal to 0 but a* and b* are close enough to 0 that to an observer having 20/20 visual acuity and normal color vision from a distance of about 1 meter from the article considers the first color measurement achromatic color.

Feature 6A. The article of feature 1A, wherein the optical element includes a textured surface having a plurality of profile features and flat planar areas, wherein the profile features extend above the flat areas of the textured surface, wherein the profile features and the flat areas result in at least one layer of the optical element having an undulating topography across the textured surface, wherein the achromatic color, the chromatic color, or both are unaffected or substantially unaffected by the undulating topography across the textured surface as compared to a substantially identical optical element which is free of the textured surface.

Feature 7A. An article comprising: an optical element on a surface of the article, wherein the optical element imparts a first structural color and a second structural color at different angles of observation, at different angles of incident light, or at both different angles of observation and different angles of incident light, wherein the first structural color is an achromatic color and the second structural color is a chromatic color.

Feature 8A. The article of feature 7A, wherein the achromatic color is selected from black, white, or neutral gray.

Feature 9A. The article of feature 7A, wherein the achromatic color has no hue or chroma and has a value of 0 to 10 according to the Munsell color system.

Feature 10A. The article of feature 7A, wherein the optical element imparts the first structural color to the article from a first angle of observation or a first angle of incident light and imparts the second structural color to the article from a second angle of observation or a second angle of incident light, wherein the first angle and the second angle are different by at least 15 degrees.

Feature 11A. The article of feature 8A, wherein the achromatic color is black at the first angle of observation, wherein the optical element reflects all wavelengths within the range of about 380 to about 740 nanometers to substantially the same degree at the first angle of observation, wherein the observation angle is an observation angle at which the achromatic color is visible to an observer having 20/20 visual acuity and normal color vision from a distance of about 1 meter from the article.

Feature 12A. The article of feature 11A, wherein the percent reflectance of the optical element is about 2 percent or less at the first angle of observation for all of the wavelengths within the range of about 380 to about 740 nanometers or wherein the percent absorbance of the optical element is about 98 percent or more at the first angle of observation for all wavelengths within the range of about 380 to about 740 nanometers, wherein the observation angle is an observation angle at which the achromatic color is visible to an observer having 20/20 visual acuity and normal color vision from a distance of about 1 meter from the article.

Feature 13A. The article of feature 8A, wherein the achromatic color is white, wherein the optical element absorbs all wavelengths within the range of about 380 to about 740 nanometers to substantially the same degree the first angle of observation, wherein the observation angle is an observation angle at which the achromatic color is visible to an observer having 20/20 visual acuity and normal color vision from a distance of about 1 meter from the article.

Feature 14A. The article of feature 13A, wherein the percent absorbance of the optical element is about 2 percent or less at the first angle of observation for all wavelengths within the range of about 380 to about 740 nanometers or wherein the percent reflectance of the optical element is about 98 percent or more at the first angle of observation for all wavelengths within the range of about 380 to about 740 nanometers, wherein the observation angle is an observation angle at which the achromatic color is visible to an observer having 20/20 visual acuity and normal color vision from a distance of about 1 meter from the article.

Feature 15A. The article of feature 8A, wherein the achromatic color is neutral gray, wherein the percent absorbance of the optical element is about 2 to 98 percent at the first angle of observation for all wavelengths within the range of about 380 to about 740 nanometers or wherein the percent reflectance of the optical element is about 2 to 98 percent at the first angle of observation for all wavelengths within the range of about 380 to about 740 nanometers, wherein the observation angle is an observation angle at which the achromatic color is visible to an observer having 20/20 visual acuity and normal color vision from a distance of about 1 meter from the article.

Feature 16A. The article of feature 10A, wherein the optical element, as disposed onto the article, when measured according to the CIE 1976 color space under a given illumination condition at angle of observation, has a color measurement that corresponds with the first structural color, wherein the first color measurement has coordinates $L_1^*$ and $a_1^*$ and $b_{1*}$, wherein both of $a_1^*$ and $b_1^*$ are equal to about 0 or wherein when $a^*$ or $b^*$ or both $a^*$ and $b^*$ are not equal to 0 but $a^*$ and $b^*$ are close enough to 0 that to an observer having 20/20 visual acuity and normal color vision from a distance of about 1 meter from the article considers the first structural color achromatic;

wherein the optical element, as disposed onto the article, when measured according to the CIE 1976 color space under a given illumination condition at angle of observation, has a color measurement that corresponds with the second structural color, wherein the second color measurement has coordinates $L_2^*$ and $a_2^*$ and $b_2^*$, wherein at least one of $a_2^*$ or $b_2^*$ is greater than 0 or less than 0 or optionally wherein when $a^*$ or $b^*$ or both $a^*$ and $b^*$ are not equal to 0 but $a^*$ and $b^*$ are far enough from 0 that to an observer having 20/20 visual acuity and normal color vision from a distance of about 1 meter from the article considers the second structural color chromatic.

Feature 17A. The article feature 10A, wherein the optical element includes a textured surface having a plurality of profile features and flat planar areas, wherein the profile features extend above the flat areas of the textured surface, wherein the profile features and the flat areas result in at least one layer of the optical element having an undulating topography across the textured surface, wherein the achromatic color at the first angle of observation is unaffected or substantially unaffected by the undulating topography across the textured surface as compared to a substantially identical optical element which is free of the textured surface and wherein the chromatic color at the second angle of observation is unaffected or substantially unaffected by the undulating topography across the textured surface as compared to a substantially identical optical element which is free of the textured surface.

Feature 18A. The article of feature 7A, wherein the optical element includes at least one layer, wherein at least layer is made of a material selected from metal, metal oxide, or stainless steel.

Feature 19A. The article of feature 7A, wherein the article is a non-woven synthetic leather upper for an article of footwear.

Feature 20A. The article of feature 7A, wherein the chromatic color is cyan, blue, indigo, violet, or a chromatic color that is a combination thereof.

Feature 1B. An article of footwear comprising: an optical element on a surface of the article, wherein the surface is a non-woven synthetic leather upper, wherein the optical element imparts a first structural color and a second structural color at different angles of observation, at different angles of incident light, or at both different angles of observation and different angles of incident light, wherein the first structural color is an achromatic color and the second structural color is a chromatic color, wherein achromatic color is selected from black, white, or neutral gray, wherein the chromatic color is cyan, blue, indigo, violet, or a chromatic color that is a combination thereof.

Feature 2B. The article of feature 1B, wherein the achromatic color has no hue or chroma and has a value of 0 to 10 according to the Munsell color system, wherein the chromatic color has hue, chroma, or both hue and chroma.

Feature 3B. The article of feature 1B, wherein the optical element, as disposed onto the article, as measured according to the CIE 1976 color space under a given illumination condition has a color measurement that corresponds with the achromatic color, wherein the first color measurement has coordinates $L^*$ and $a^*$ and $b^*$, wherein both of $a^*$ and $b^*$ are equal to 0.

Feature 4B. The article of feature 1B, wherein the achromatic color is black at the first angle of observation, wherein the optical element reflects all wavelengths within the range of about 380 to about 740 nanometers to substantially the same degree at the first angle of observation, wherein the observation angle is an observation angle at which the achromatic color is visible to an observer having 20/20 visual acuity and normal color vision from a distance of about 1 meter from the article.

Feature 5B. The article of feature 4B, wherein the percent reflectance of the optical element is about 2 percent or less at the first angle of observation for all of the wavelengths within the range of about 380 to about 740 nanometers or wherein the percent absorbance of the optical element is about 98 percent or more at the first angle of observation for all wavelengths within the range of about 380 to about 740 nanometers, wherein the observation angle is an observation angle at which the achromatic color is visible to an observer having 20/20 visual acuity and normal color vision from a distance of about 1 meter from the article.

Feature 6B. The article of feature 1B, wherein the achromatic color is white, wherein the optical element absorbs all wavelengths within the range of about 380 to about 740 nanometers to substantially the same degree the first angle of observation, wherein the observation angle is an observation angle at which the achromatic color is visible to an observer having 20/20 visual acuity and normal color vision from a distance of about 1 meter from the article.

Feature 7B. The article of feature 6B, wherein the percent absorbance of the optical element is about 2 percent or less at the first angle of observation for all wavelengths within the range of about 380 to about 740 nanometers or wherein the percent reflectance of the optical element is about 98 percent or more at the first angle of observation for all wavelengths within the range of about 380 to about 740 nanometers, wherein the observation angle is an observation angle at which the achromatic color is visible to an observer having 20/20 visual acuity and normal color vision from a distance of about 1 meter from the article.

Feature 8B. The article of feature 7B, wherein the achromatic color is neutral gray, wherein the percent absorbance of the optical element is about 2 to 98 percent at the first angle of observation for all wavelengths within the range of about 380 to about 740 nanometers or wherein the percent reflectance of the optical element is about 2 to 98 percent at the first angle of observation for all wavelengths within the range of about 380 to about 740 nanometers, wherein the observation angle is an observation angle at which the achromatic color is visible to an observer having 20/20 visual acuity and normal color vision from a distance of about 1 meter from the article.

Feature 9B. The article of feature 1B, wherein the optical element has the characteristic that at a change of the angle of observation of an observer having 20/20 visual acuity and normal color vision from a distance of about 1 meter from the article of 15 percent or more results in an abrupt change from the achromatic color to the chromatic color.

Feature 10B. An article of footwear comprising: an optical element on a surface of the article, wherein the surface is a non-woven synthetic leather upper, wherein the optical element imparts a first structural color and a second structural color at different angles of observation, at different angles of incident light, or at both different angles of observation and different angles of incident light, wherein the first structural color is an achromatic color and the second structural color is a chromatic color, wherein achromatic color is selected from black, white, or neutral gray, wherein the chromatic color is a red/yellow/blue (RYB) primary color, a RYB secondary color, a RYB tertiary color, a RYB quaternary color, a RYB quinary color, or a chromatic color that is a combination thereof.

Feature 11B. The article of feature 10B, wherein the optical element, as disposed onto the article, when measured according to the CIE 1976 color space under a given illumination condition at angle of observation, has a color measurement that corresponds with the first structural color, wherein the first color measurement has coordinates $L_1^*$ and $a_1^*$ and $b_{1*}$, wherein both of $a_1^*$ and $b_1^*$ are equal to about 0 or wherein when a* or b* or both a* and b* are not equal to 0 but a* and b* are close enough to 0 that to an observer having 20/20 visual acuity and normal color vision from a distance of about 1 meter from the article considers the first structural color achromatic; and wherein the optical element, as disposed onto the article, when measured according to the CIE 1976 color space under a given illumination condition at angle of observation, has a color measurement that corresponds with the second structural color, wherein the second color measurement has coordinates $L_2^*$ and $a_2^*$ and $b_2^*$, wherein at least one of $a_2^*$ or $b_2^*$ is greater than 0 or less than 0 or optionally wherein when a* or b* or both a* and b* are not equal to 0 but a* and b* are far enough from 0 that to an observer having 20/20 visual acuity and normal color vision from a distance of about 1 meter from the article considers the second structural color chromatic.

Feature 12B. The article of feature 10B, wherein the optical element includes a textured surface having a plurality of profile features and flat planar areas, wherein the profile features extend above the flat areas of the textured surface, wherein the profile features and the flat areas result in at least one layer of the optical element having an undulating topography across the textured surface, wherein the achromatic color, the chromatic color, or both are unaffected or substantially unaffected by the undulating topography across the textured surface as compared to a substantially identical optical element which is free of the textured surface.

Feature 13B. The article of feature 10B, wherein achromatic color is black, wherein the chromatic color is blue, indigo, violet, or a chromatic color that is a combination thereof.

Feature 14B. The article of feature 10B, wherein achromatic color is white, wherein the chromatic color is blue, indigo, violet, or a chromatic color that is a combination thereof.

Feature 15B. The article of feature 10B, wherein achromatic color is neutral gray, wherein the chromatic color is blue, indigo, violet, or a chromatic color that is a combination thereof, Feature 16B. The article of feature 10B, wherein the optical element has the characteristic that at a change of the angle of observation of an observer having 20/20 visual acuity and normal color vision from a distance of about 1 meter from the article of 15 percent or more results in an abrupt change from the achromatic color to the chromatic color.

Feature 17B. The article of feature 10B, wherein the optical element has the characteristic that at a change of the angle of observation of an observer having 20/20 visual acuity and normal color vision from a distance of about 1 meter from the article of 3 to 10 percent results in a gradual change from the achromatic color to the chromatic color.

Feature 18B. The article of feature 10B, wherein the optical element includes at least one layer, wherein at least layer is made of a material selected from metal, metal oxide, or stainless steel.

Feature 19B. The article of feature 10B, wherein the optical element imparts the first structural color to the article from at a first angle of observation or a first angle of incident light and imparts the second structural color to the article from a second angle of observation or a second angle of incident light, wherein the first angle and the second angle are different by at least 15 degrees.

Feature 20B. The article of feature 10B, wherein the achromatic color has no hue or chroma and has a value of 0 to 10 according to the Munsell color system, wherein the chromatic color has hue, chroma, or both hue and chroma.

Feature 10. An article comprising:

an optical element on a surface of the article, wherein the optical element imparts an achromatic color and a chromatic color to the article.

Feature 2C. The article of feature 10, wherein the achromatic color has no hue or chroma and has a value of 0 to 10 according to the Munsell color system, wherein the chromatic color has hue, chroma, or both hue and chroma.

Feature 3C. The article of feature 10, wherein the achromatic color is selected from black, white, or neutral gray and wherein the chromatic color is a red/yellow/blue (RYB) primary color, a RYB secondary color, a RYB tertiary color, a RYB quaternary color, a RYB quinary color, or a chromatic color that is a combination thereof.

Feature 4C. The article of feature 10, wherein the optical element, as disposed onto the article, as measured according to the CIE 1976 color space under a given illumination condition has a color measurement that corresponds with the achromatic color, wherein the first color measurement has coordinates L* and a* and b*, wherein both of a* and b* are equal to 0.

Feature 5C. The article of feature 10, wherein the optical element, as disposed onto the article, as measured according to the CIE 1976 color space under a given illumination condition, has a first color measurement that corresponds with the achromatic color, wherein the first color measurement has coordinates L* and a* and b*, wherein one or both of a* and b* are equal to about 0 or wherein when a* or b* or both a* and b* are not equal to 0 but a* and b* are close enough to 0 that to an observer having 20/20 visual acuity and normal color vision from a distance of about 1 meter from the article considers the first color measurement achromatic color.

Feature 6C. The article of features 1C-5C, wherein the optical element includes a textured surface having a plurality of profile features and flat planar areas, wherein the profile features extend above the flat areas of the textured surface, wherein the profile features and the flat areas result in at least one layer of the optical element having an undulating topography across the textured surface, wherein the achromatic color, the chromatic color, or both are unaffected or substantially unaffected by the undulating topography across the textured surface as compared to a substantially identical optical element which is free of the textured surface.

Feature 7C. An article comprising: an optical element on a surface of the article, wherein the optical element imparts a first structural color and a second structural color at different angles of observation, at different angles of incident light, or at both different angles of observation and different angles of incident light, wherein the first structural color is an achromatic color and the second structural color is a chromatic color.

Feature 8C. The article of feature 7C, wherein the achromatic color is selected from black, white, or neutral gray.

Feature 9C. The article of feature 7C, wherein the achromatic color has no hue or chroma and has a value of 0 to 10 according to the Munsell color system.

Feature 10C. The article of features 7C-9C, wherein the optical element imparts the first structural color to the article from at a first angle of observation or a first angle of incident light and imparts the second structural color to the article from a second angle of observation or a second angle of incident light, wherein the first angle and the second angle are different by at least 15 degrees.

Feature 110. The article of feature 8C, wherein the achromatic color is black at the first angle of observation, wherein the optical element reflects all wavelengths within the range of about 380 to about 740 nanometers to substantially the same degree at the first angle of observation, wherein the observation angle is an observation angle at which the achromatic color is visible to an observer having 20/20 visual acuity and normal color vision from a distance of about 1 meter from the article.

Feature 12C. The article of feature 110, wherein the percent reflectance of the optical element is about 2 percent or less at the first angle of observation for all of the wavelengths within the range of about 380 to about 740 nanometers or wherein the percent absorbance of the optical element is about 98 percent or more at the first angle of observation for all wavelengths within the range of about 380 to about 740 nanometers, wherein the observation angle is an observation angle at which the achromatic color is visible to an observer having 20/20 visual acuity and normal color vision from a distance of about 1 meter from the article.

Feature 13C. The article of features 8C or 9C, wherein the achromatic color is white, wherein the optical element absorbs all wavelengths within the range of about 380 to about 740 nanometers to substantially the same degree the first angle of observation, wherein the observation angle is an observation angle at which the achromatic color is visible to an observer having 20/20 visual acuity and normal color vision from a distance of about 1 meter from the article.

Feature 14C. The article of feature 13C, wherein the percent absorbance of the optical element is about 2 percent or less at the first angle of observation for all wavelengths within the range of about 380 to about 740 nanometers or wherein the percent reflectance of the optical element is about 98 percent or more at the first angle of observation for all wavelengths within the range of about 380 to about 740 nanometers, wherein the observation angle is an observation angle at which the achromatic color is visible to an observer having 20/20 visual acuity and normal color vision from a distance of about 1 meter from the article.

Feature 15C. The article of features 8C or 9C, wherein the achromatic color is neutral gray, wherein the percent absorbance of the optical element is about 2 to 98 percent at the first angle of observation for all wavelengths within the range of about 380 to about 740 nanometers or wherein the percent reflectance of the optical element is about 2 to 98 percent at the first angle of observation for all wavelengths within the range of about 380 to about 740 nanometers, wherein the observation angle is an observation angle at which the achromatic color is visible to an observer having 20/20 visual acuity and normal color vision from a distance of about 1 meter from the article.

Feature 16C. The article of feature 100, wherein the optical element, as disposed onto the article, when measured according to the CIE 1976 color space under a given illumination condition at angle of observation, has a color measurement that corresponds with the first structural color, wherein the first color measurement has coordinates $L_1^*$ and $a_1^*$ and $b_{1*}$, wherein both of $a_1^*$ and $b_1^*$ are equal to about 0 or wherein when a* or b* or both a* and b* are not equal to 0 but a* and b* are close enough to 0 that to an observer having 20/20 visual acuity and normal color vision from a distance of about 1 meter from the article considers the first structural color achromatic;

wherein the optical element, as disposed onto the article, when measured according to the CIE 1976 color space under a given illumination condition at angle of observation, has a color measurement that corresponds with the second structural color, wherein the second color measurement has coordinates $L_2^*$ and $a_2^*$ and $b_2^*$, wherein at least one of $a_2^*$ or $b_2^*$ is greater than 0 or less than 0 or optionally wherein when a* or b* or both a* and b* are not equal to 0 but a* and b* are far enough from 0 that to an observer having 20/20 visual acuity and normal color vision from a distance of about 1 meter from the article considers the second structural color chromatic.

Feature 17C. The article feature 100, wherein the optical element includes a textured surface having a plurality of profile features and flat planar areas, wherein the profile features extend above the flat areas of the textured surface, wherein the profile features and the flat areas result in at least one layer of the optical element having an undulating topography across the textured surface, wherein the achromatic color at the first angle of observation is unaffected or substantially unaffected by the undulating topography across the textured surface as compared to a substantially identical optical element which is free of the textured surface and wherein the chromatic color at the second angle of observation is unaffected or substantially unaffected by the undulating topography across the textured surface as compared to a substantially identical optical element which is free of the textured surface.

Feature 18C. The article of features 7C-9C, wherein the optical element includes at least one layer, wherein at least layer is made of a material selected from metal, metal oxide, or stainless steel.

Feature 19C. The article of features 7C-9C, wherein the article is a non-woven synthetic leather upper for an article of footwear.

Feature 20C. The article of features 7C-9C, wherein the chromatic color is blue, indigo, violet, or a chromatic color that is a combination thereof.

Now having described embodiments of the present disclosure generally, additional discussion regarding embodiments will be described in greater details.

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method may be carried out in the order of events recited or in any other order that is logically possible.

Embodiments of the present disclosure will employ, unless otherwise indicated, techniques of material science, chemistry, textiles, polymer chemistry, and the like, which are within the skill of the art. Such techniques are explained fully in the literature.

Unless otherwise defined, all technical and scientific terms used herein have the same meaning as commonly understood by one of ordinary skill in the art of material science, chemistry, textiles, polymer chemistry, and the like. Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

The present disclosure provides for articles that exhibit structural color, where the structural color can shift based on the angle of observation and/or incident light. For example, as the angle of observation and/or incident light changes (e.g., about 10 or 15 degrees), the structural color shifts. The structural color shift can be achieved through the use of an optical element. For example in one type of shift, the structural color shift can be between achromatic structural color and chromatic structural color or vice versa. The structural color can be imparted by the optical element having reflective layer(s) and/or constituent layer(s), incorporated onto one or more components of the article, for example, when the article is an article of footwear, on an upper or sole of an article of footwear. The structural color (achromatic or chromatic color) is a visible color produced, at least in part, through optical effects (e.g., through scattering, refraction, reflection, interference, and/or diffraction of visible wavelengths of light).

In one or more embodiments of the present disclosure the surface of the article includes the optical element (e.g., a signal layer, a multilayer reflector or a multilayer filter), where at least one layer is flat (or planar) or substantially flat (or substantially planar), and where the optical element imparts structural color. In one or more additional embodiments of the present disclosure the surface of the article includes the optical element (e.g., a signal layer reflector, a multilayer reflector, a single layer filter, or a multilayer filter), and is optionally a textured surface or the layers have a textured topography, where the optical element and optionally the textured surface or textured topography impart structural color and/or shift in structural color, or optionally the textured surface or textured topography do not contribute to the structural color and/or shift the structural color. The optional textured surface can be disposed between the optical element and the surface or be part of the optical element, depending upon the design. The optical element can be disposed on or is an integral part of a surface of the article.

A "chromatic color" is a color in which one particular wavelength or hue predominates, while an "achromatic color" is a color in which no particular wavelength or hue predominates as well as all wavelengths or hues are present in equal parts or substantially equal parts. The achromatic color can be selected from black, white, or neutral gray. In contrast, the chromatic color can be selected from a red/yellow/blue (RYB) primary color, a RYB secondary color, a RYB tertiary color, a RYB quaternary color, a RYB quinary color, or a chromatic color that is a combination thereof. The chromatic color can be red, yellow, blue, green, orange, purple, or a chromatic color that is a combination thereof. The chromatic color can be red, orange, yellow, green, blue, indigo, violet, or a chromatic color that is a combination thereof. The chromatic color has hue and/or chroma according the Munsell color system. The chromatic color does not include black, white, or neutral gray.

Figure 3A:
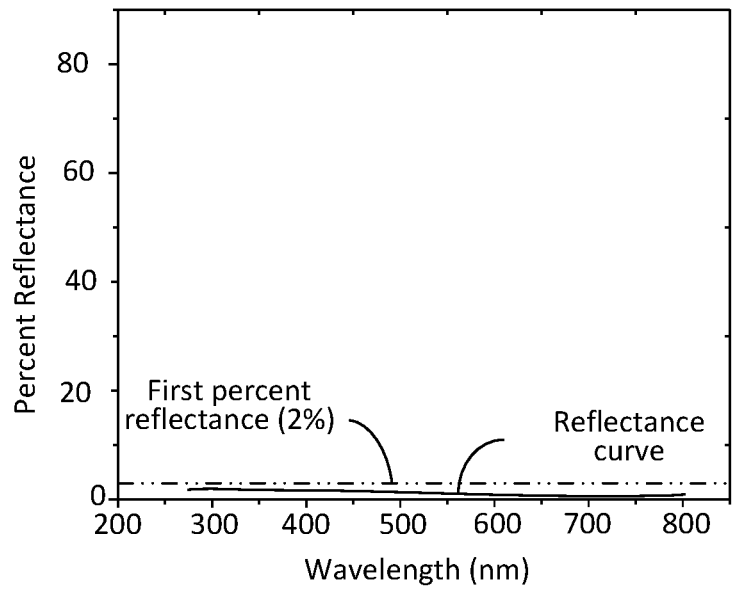
FIGS. 3A and 3B illustrate graphs of wavelength as a function of percent reflectance and absorbance, respectively, where each graph is illustrative of measurement of various parameters when the achromatic structural color is black.
Figure 3B:
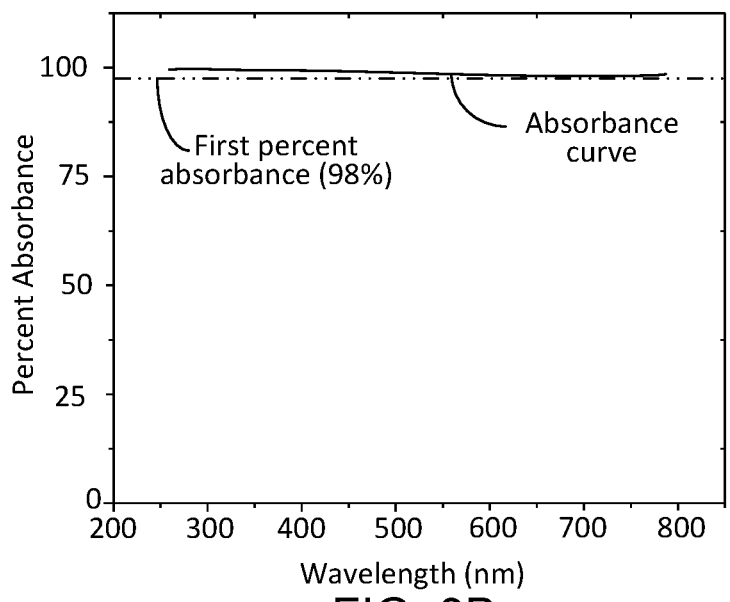
Figure 4A:
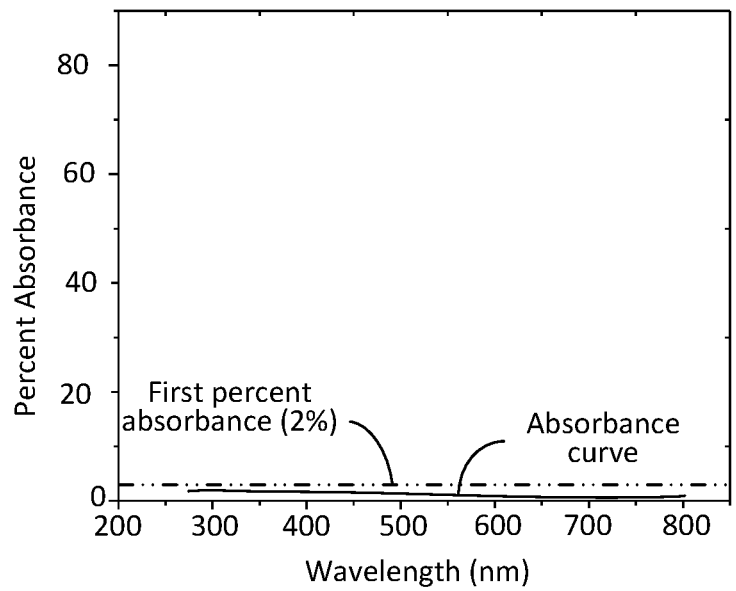
FIGS. 4A and 4B illustrate graphs of wavelength as a function of percent reflectance and absorbance, respectively, where each graph is illustrative of measurement of various parameters when the achromatic structural color is white.
Figure 4B:
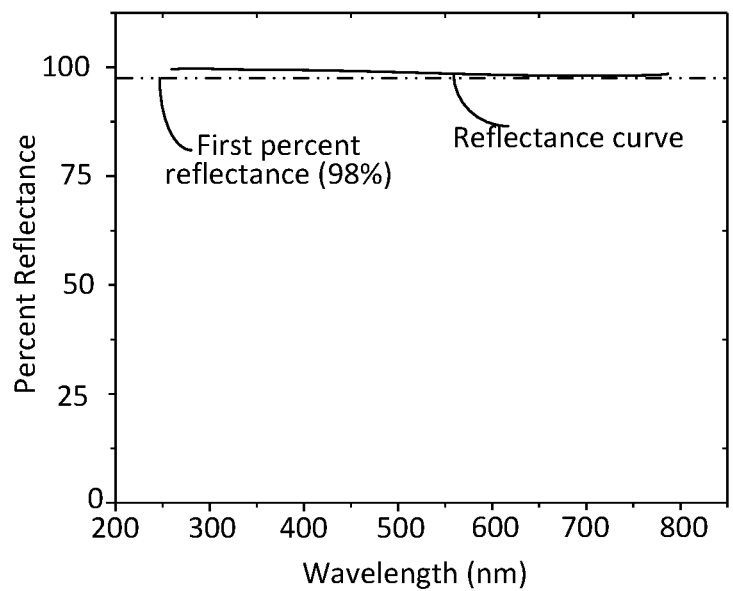
Figure 5A:
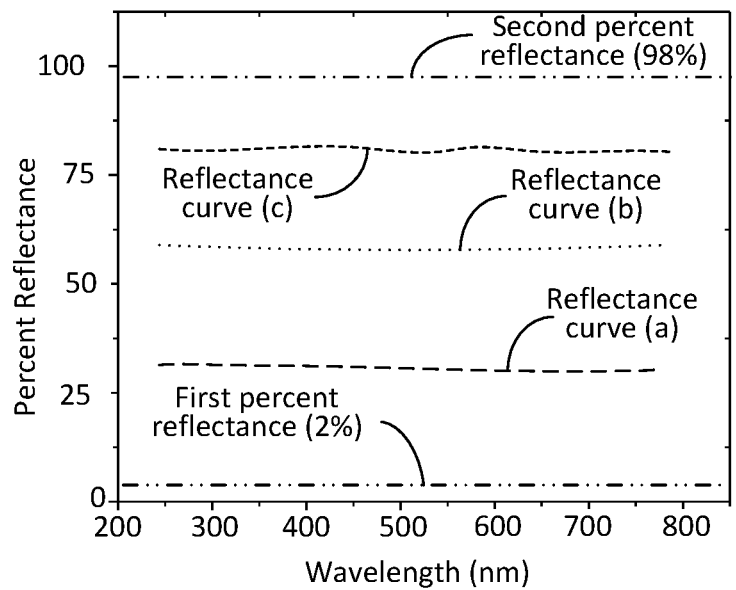
FIGS. 5A and 5B illustrate graphs of wavelength as a function of percent reflectance and absorbance, respectively, where each graph is illustrative of measurement of various parameters when the achromatic structural color is neutral gray.
Figure 5B:
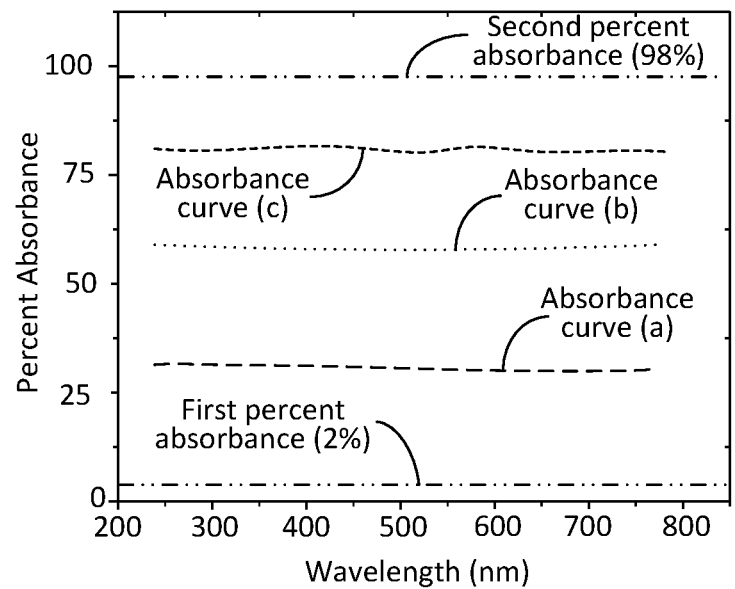

The wavelength range can be about 380 to 740 nanometers and can be measured as a function of absorbance or reflectance, each of which can be used to define the structural color imparted by the optical element. Graphs illustrating chromatic colors can include a wide variety curves where certain wavelengths are more prevalent than others while graphs illustrating achromatic color are relatively flat across the visible wavelength range. Graphs for chromatic color are not illustrated while FIGS. 3A and 3B illustrate graphs of wavelength as a function of percent reflectance and absorbance, respectively, where each graph is illustrative of measurement of various parameters where the structural achromatic color is black. Similarly, FIGS. 4A and 4B and 5A and 5B illustrate graphs of wavelength as a function of percent reflectance and absorbance, respectively, where each graph is illustrative of measurement of various parameters for white and neutral gray (e.g., three curves (a)-(c) illustrate possible neutral grays), respectively.

In regard to absorbance, the optical element absorbs all wavelengths within the range of about 380 to 740 nanometers to substantially the same degree, where the percent absorbance correlates to the particular structural color (e.g., achromatic structural color). "Substantially the same degree" as used herein for absorbance and reflectance encompasses plus or minus about 5 percent, plus or minus about 10 percent, plus or minus about 15 percent. The percent absorbance of the optical element is about 98 percent or more, about 99 percent or more, about 99.5 percent or more, about 99.9 percent or more, about 100 percent within the range of about 380 to 740 nanometers to substantially the same degree when the achromatic structural color is black. The percent absorbance of the optical element is about 2 percent or less, about 1 percent or less, about 0.5 percent or less, about 0.1 percent or less, 0 percent within the range of about 380 to 740 nanometers to substantially the same degree when the achromatic structural color is white. When the achromatic structural color is neutral gray, the percent absorbance of the optical element is about 2 to 98, about 1 to 99 percent, about 0.5 to about 99.5 percent, about 0.1 to about 99.9, within the range of about 380 to 740 nanometers to substantially the same degree.

In regard to reflectance, the optical element reflects all wavelengths within the range of about 380 to 740 nanometers to substantially the same degree, where the percent absorbance correlates to the particular achromatic structural color. The percent reflectance of the optical element is about 2 percent or less, about 1 percent or less, about 0.5 percent or less, about 0.1 percent or less, or 0 percent within the range of about 380 to 740 nanometers to substantially the same degree when the achromatic structural color is black. The percent reflectance of the optical element is about 98 percent or more, about 99 percent or more, about 99.5 percent or more, about 99.9 percent or more, about 100 percent within the range of about 380 to 740 nanometers to substantially the same degree when the achromatic structural color is white. The percent reflectance of the optical element is about 2 to 98, about 1 to 99 percent, about 0.5 to about 99.5 percent, about 0.1 to about 99.9, within the range of about 380 to 740 nanometers to substantially the same degree, when the achromatic structural color is neutral gray.

The optical element can have a structural color that can be independent of the angle of incident light upon the optical element. In addition or in the alternative, the optical element can have a structural color that is independent of the observation angle. In either of these cases where regardless of the change (e.g., 10 degrees, 15 degrees, 30 degrees, 60 degrees, 90 degrees, or more) of the angle of incident light upon the optical element and/or the observation angle the structural color does not shift from achromatic to chromatic structural color (or vice versa), then the structural color can be independent of the angle of incident light upon the optical element.

The optical element can impart structural color that can be dependent of the angle of incident light upon the optical element and/or observation angle, where the structural color is different at two, three, or more different angles (e.g., each angle being about 10 agrees, about 15 degrees, about 20 degrees, about 30 degrees, about 45 degrees, about 90 degrees, or more apart) of incident light or observation angles (e.g., the shift can be between an achromatic color (e.g., white, black, neutral gray) to a chromatic color (e.g., red/yellow/blue (RYB) primary color, a RYB secondary color, a RYB tertiary color, a RYB quaternary color, or a RYB quinary color)) or vice versa.

The structural color imparted by the optical element can be dependent of the angle of incident light upon the optical element and/or dependent on the observation angle. The dependence upon the angle of incident light and/or the observation angle can be evaluated using CIE 1976 color space under a given illumination condition at two observation angles (e.g., between −15 degrees and 180 degrees or between −15 degrees and +60 degrees) and which are at least 10 degrees or at least 15 degrees apart from each other. For example, at a first observation angle the structural color is a first structural color and at a second observation angle the structural color is a second structural color. A first color measurement at the first observation angle can be obtained and has coordinates $L_1^*$ and $a_1^*$ and $b_{1*}$, while a second color measurement at the second observation angle can be obtained and has coordinates $L_2^*$ and $a_2^*$ and $b_2^*$ can be obtained. $\Delta E^*_{ab}$ can be determined using the following equation: $\Delta E^*_{ab} = [(L_1^* - L_2^*)^2 + (a_1^* - a_2^*)_2 + (b_1^* - b_2^*)^2]^{1/2}$.

When $\Delta E^*_{ab}$ between the first color measurement and the second color measurement is less than or equal to about 2.2 or is less than or equal to about 3, the first structural color associated with the first color measurement and the second structural color associated with the second color measurement are the same or not perceptibly different to an average observer (e.g., the structural color is independent of the angle of incident light and/or is independent of the observation angle for this particle set of angles). When $\Delta E^*_{ab}$ between the first color measurement and the second color measurement is greater than 3 or optionally greater than about 4 or 5, the first structural color associated with the first color measurement and the second structural color associated with the second color measurement are different or perceptibly different to an average observer (e.g., the structural color is dependent on the angle of incident light and/or is dependent on observation angle and shifts from achromatic structural color to chromatic structural color (or vice versa) upon a change in the angle).

In another approach, when the percent difference between one or more of values $L_1^*$ and $L_{2*}$, $a_1^*$ and $a_2^*$, and $b_1^*$ and $b_2^*$ is less than 20 percent, the first structural color associated with the first color measurement and the second structural color associated with the second color measurement are the same or not perceptibly different to an average observer (e.g., the structural color is independent of the angle of incident light upon the optical element and/or is independent upon observation angle of the optical element for this particular set of angles). When the percent difference between one or more of values $L_1^*$ and $L_2^*$ $a_1^*$ and $a_{2*}$, and $b_1^*$ and $b_2^*$ is greater than 20 percent, the first structural color associated with the first color measurement and the second structural color associated with the second color measurement are different or perceptibly different to an average observer (e.g., the structural color is dependent of the angle of incident light on the optical element and/or is dependent on the observation angle of the optical element and shifts from achromatic structural color to chromatic structural color (or vice versa) upon a change in the angle).

The optical element, as disposed onto the article, when measured according to CIE 1976 color space under a given illumination condition at an observation angle has a color measurement that corresponds with the achromatic structural color. For example, the first color measurement can have coordinates L* and a* and b*, wherein both of a* and b* are equal to 0. In another example, the first color measurement can have coordinates L* and a* and b*, wherein both of a* and b* are equal to about 0. In this instance, optionally, a* or b* or both of a* and b* are less than 0.5. 0.2, or 0.1, and are within about 10 percent or about 5 percent of each other. In another example, the color may appear to be achromatic to an observer having 20/20 visual acuity and normal color vision from a distance of about 1 meter from the article when a* or b* or both a* and b* are about 0. In another example, the color may appear to be achromatic to an observer having 20/20 visual acuity and normal color vision from a distance of about 1 meter from the article when a* or b* or both a* and b* are about 0, where a* or b* or both of a* and b* are less than 0.5. 0.2, or 0.1, and are within about 10 percent or 5 percent of each other.

As described herein, the optical element is used to impart the structural color (e.g., one that shifts from achromatic to chromatic structural color or vice versa), where the optical element can include one or a plurality of layers. In an example, the layers can include one or more reflective layers and/or one or more constituent layers to produce the structural color. The layers can be flat (or three dimensional flat planar surface) or substantially flat (or substantially three dimensional flat planar surface) or can have a textured topography. One of the reflective layers can be a base reflective layer disposed on one side of the optical element; in other words the layer structure is as follows: base reflective layer/$1^{st}$ constituent layer/$n^{th}$ constituent layer. Optionally, one of the reflective layers can be a non-base reflective layer disposed between a pair of constituent layers of the optical element; in other words the layer structure is as follows: base reflective layer/$1^{st}$ constituent layer/$n^{th}$ constituent layer/non-base reflective layer/$m^{th}$ constituent layer. Also as described herein, the optical element can also include the optional textured surface, such as a texture layer and/or a textured structure as opposed to a three dimensional flat planar surface. Additionally and optionally, the optical element can include one or more layers (e.g., protection layer, top layer, and the like). In an embodiment, the reflective layer(s) can be omitted and the optical element only includes constituent layers and can still produce the structural color.

The base reflective layer can have a percent reflectance of about 50 percent or more, about 75 percent or more, about 80 percent or more, about 85 percent or more, about 90 percent or more, or about 95 percent or more. The base reflective layer can have a thickness of at least 10 nanometers, optionally at least 30 nanometers, at least 40 nanometers, at least 50 nanometers, at least 60 nanometers, at least 100 nanometers, at least 150 nanometers, optionally a thickness of from about 10 nanometers to about 250 nanometers or more, about 10 nanometers to about 100 nanometers, about 10 nanometers to about 150 nanometers, about 10 nanometers to about 100 nanometers, or of from about 30 nanometers to about 80 nanometers, or from about 40 nanometers to about 60 nanometers. For example, the base layer can be about 30 to 150 nanometers thick.

The optical element can include one or more non-base reflective layers. The non-base reflective layer can have a minimum percent transmittance of at least 5 percent, optionally at least 10 percent, at least 15 percent, at least 20 percent, at least 30 percent, at least 40 percent, or at least 50 percent, or at least 60 percent. Typically, the base reflective layer has a greater percent reflectance than the non-base reflective layer. The non-base reflective layer can have a thickness of less than 40 nanometers, optionally less than 30 nanometers, optionally less than 20 nanometers, optionally less than 10 nanometers. For example, the non-base layer can be 20 to 30 nanometers thick. The non-base layer is not opaque.

A minimum percent transmittance of greater than 50 percent is an opaque layer, a minimum percent transmittance of 20 to 50 percent to be semi-transparent, and a minimum percent transmittance of less than 20 percent is transparent.

The reflective layer (e.g., base or non-base reflective layer) can include a metal layer, an alloy thereof, an organic layer, an oxide layer, or stainless steel or mixtures thereof. The oxide layer can be a metal oxide, a doped metal oxide, or a combination thereof. The metal layer, the metal oxide or the doped metal oxide can include the following: the transition metals, the metalloids, the lanthanides, and the actinides, as well as nitrides, oxynitrides, sulfides, sulfates, selenides, tellurides and a combination of these. The metal layer can be titanium, aluminum, silver, zirconium, chromium, magnesium, silicon, gold, platinum, nobium, and a combination thereof. The metal oxide can include titanium oxide, silver oxide, aluminum oxide, silicon dioxide, tin dioxide, chromia, iron oxide, nickel oxide, silver oxide, cobalt oxide, zinc oxide, platinum oxide, palladium oxide, vanadium oxide, molybdenum oxide, lead oxide, nobium oxide, and combinations thereof as well as doped versions of each. In some aspects, the reflective layer can consist essentially of a metal oxide. In some aspects, the reflective layer can consist essentially of titanium dioxide. The metal oxide can be doped with water, inert gasses (e.g., argon), reactive gasses (e.g., oxygen or nitrogen), metals, small molecules, and a combination thereof. In some aspects, the reflective layer can consist essentially of a doped metal oxide or a doped metal oxynitride or both.

The reflective layer can be a coating on the surface of the article. The coating can be chemically bonded (e.g., covalently bonded, ionically bonded, hydrogen bonded, and the like) to the surface of the article. The coating has been found to bond well to a surface made of a polymeric material. In an example, the surface of the article can be made of a polymeric material such as a polyurethane, including a thermoplastic polyurethane (TPU), as those described herein. Additional details about the optical element and the reflective layer(s) are provided herein.

In an embodiment, the imparted structural color is not used in combination with a pigment and/or dye. In another aspect, the imparted structural color is used in combination with a pigment and/or dye.

The article including the optical element can be an article of manufacture or a component of the article. The article of manufacture can include footwear, apparel (e.g., shirts, jerseys, pants, shorts, gloves, glasses, socks, hats, caps, jackets, undergarments), containers (e.g., backpacks, bags), and upholstery for furniture (e.g., chairs, couches, car seats), bed coverings (e.g., sheets, blankets), table coverings, towels, flags, tents, sails, and parachutes, or components of any one of these. In addition, the optical element can be used with or disposed on textiles or other items such as striking devices (e.g., bats, rackets, sticks, mallets, golf clubs, paddles, etc.), athletic equipment (e.g., golf bags, baseball and football gloves, soccer ball restriction structures), protective equipment (e.g., pads, helmets, guards, visors, masks, goggles, etc.), locomotive equipment (e.g., bicycles, motorcycles, skateboards, cars, trucks, boats, surfboards, skis, snowboards, etc.), balls or pucks for use in various sports, fishing or hunting equipment, furniture, electronic equipment, construction materials, eyewear, timepieces, jewelry, and the like.

The article can be an article of footwear. The article of footwear can be designed for a variety of uses, such as sporting, athletic, military, work-related, recreational, or casual use. Primarily, the article of footwear is intended for outdoor use on unpaved surfaces (in part or in whole), such as on a ground surface including one or more of grass, turf, gravel, sand, dirt, clay, mud, pavement, and the like, whether as an athletic performance surface or as a general outdoor surface. However, the article of footwear may also be desirable for indoor applications, such as indoor sports including dirt playing surfaces for example (e.g., indoor baseball fields with dirt infields).

In particular, the article of footwear can be designed for use in indoor or outdoor sporting activities, such as global football/soccer, golf, American football, rugby, baseball, running, track and field, cycling (e.g., road cycling and mountain biking), and the like. The article of footwear can optionally include traction elements (e.g., lugs, cleats, studs, and spikes as well as tread patterns) to provide traction on soft and slippery surfaces, where components of the present disclosure can be used or applied between or among the traction elements and optionally on the sides of the traction elements but on the surface of the traction element that contacts the ground or surface. Cleats, studs and spikes are commonly included in footwear designed for use in sports such as global football/soccer, golf, American football, rugby, baseball, and the like, which are frequently played on unpaved surfaces. Lugs and/or exaggerated tread patterns are commonly included in footwear including boots design for use under rugged outdoor conditions, such as trail running, hiking, and military use.

In particular, the article can be an article of apparel (i.e., a garment). The article of apparel can be an article of apparel designed for athletic or leisure activities. The article of apparel can be an article of apparel designed to provide protection from the elements (e.g., wind and/or rain), or from impacts.

In particular, the article can be an article of sporting equipment. The article of sporting equipment can be designed for use in indoor or outdoor sporting activities, such as global football/soccer, golf, American football, rugby, baseball, running, track and field, cycling (e.g., road cycling and mountain biking), and the like.

FIGS. 1A-1M illustrates footwear, apparel, athletic equipment, container, electronic equipment, and vision wear that include the structure (e.g., the optical element) of the present disclosure. A structure including the optical element is represented by hashed areas 12A'/12M'-12A"/12M'. The location of the structure is provided only to indicate one possible area that the structure can be located. Also, two locations are illustrated in some of the figures and one location is illustrated in other figures, but this is done only for illustration purposes as the items can include one or a plurality of structure, where the size and location can be determined based on the item. The structure(s) located on each item can represent a number, letter, symbol, design, emblem, graphic mark, icon, logo, or the like.

Figure 1N:
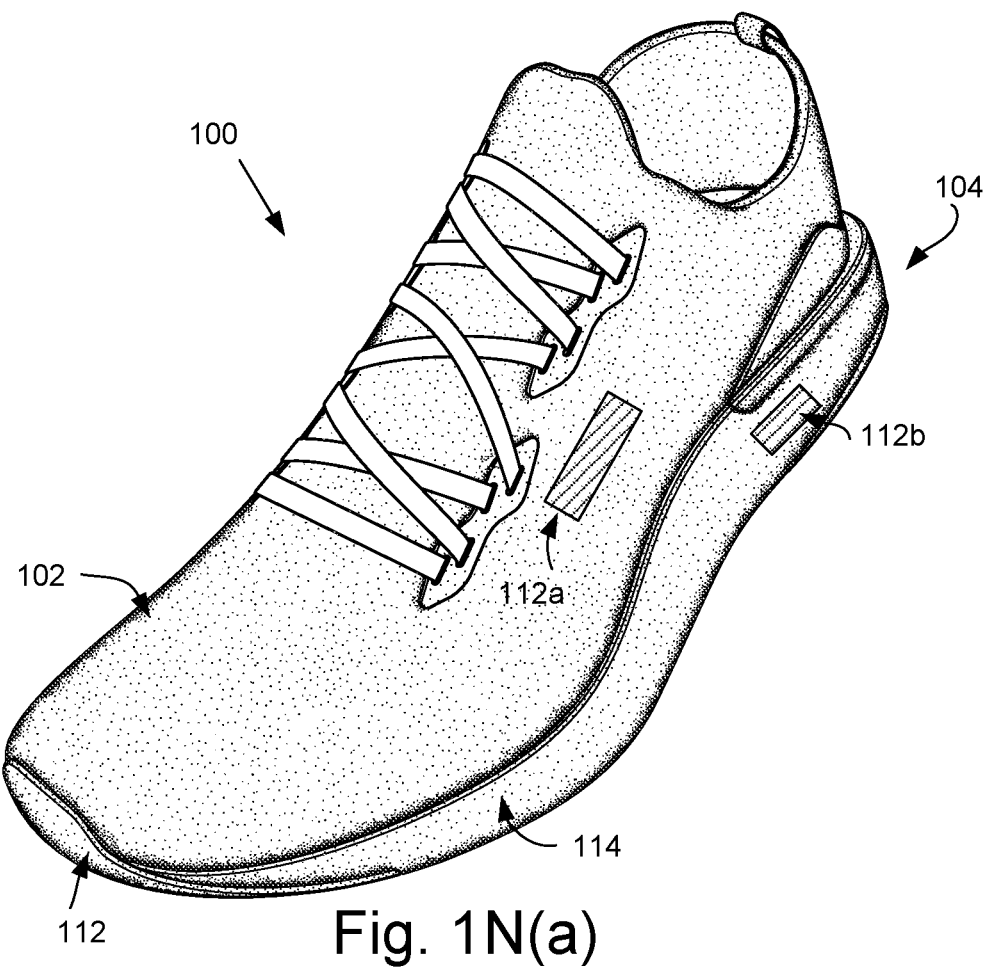
Figure 1N:
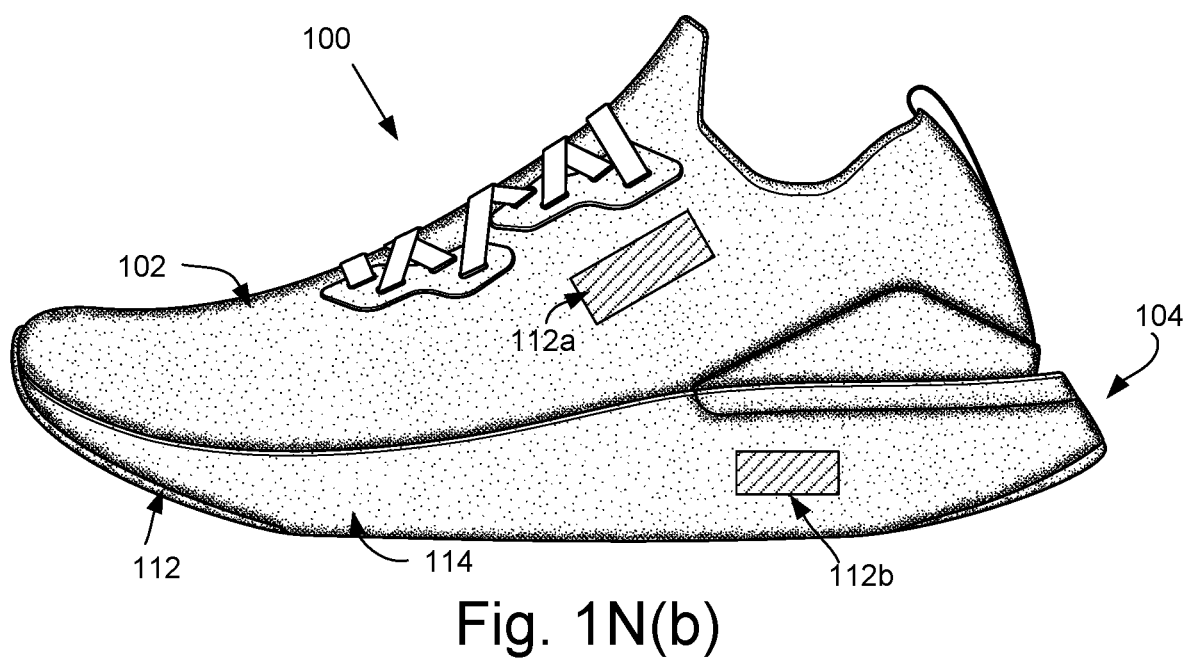

FIGS. 1N(a) and 1N(b) illustrate a perspective view and a side view of an article of footwear 100 that include a sole structure 104 and an upper 102. The structure including the optical element is represented by 122a and 122b. The sole structure 104 is secured to the upper 102 and extends between the foot and the ground when the article of footwear 100 is worn. The primary elements of the sole structure 104 are a midsole 114 and an outsole 112, The midsole 114 is secured to a lower area of the upper 102 and may be formed of a polymer foam or another appropriate material. In other configurations, the midsole 114 can incorporate fluid-filled chambers, plates, moderators, and/or other elements that further attenuate forces, enhance stability, or influence motions of the foot. The outsole 112 is secured to a lower surface of the midsole 114 and may be formed from a wear-resistant rubber material that is textured to impart traction, for example. The upper 102 can be formed from various elements (e.g., lace, tongue, collar) that combine to provide a structure for securely and comfortably receiving a foot. Although the configuration of the upper 102 may vary significantly, the various elements generally define a void within the upper 102 for receiving and securing the foot relative to sole structure 104. Surfaces of the void within upper 102 are shaped to accommodate the foot and extend over the in step and toe areas of the foot, along the medial and lateral sides of the foot, under the foot, and around the heel area of the foot. The upper 102 can be made of one or more materials such as textiles, a polymer foam, leather, synthetic leather, and the like that are stitched or bonded together. Although this configuration for the sole structure 104 and the upper 102 provides an example of a sole structure that may be used in connection with an upper, a variety of other conventional or nonconventional configurations for the sole structure 104 and/or the upper 102 can also be utilized. Accordingly, the configuration and features of the sole structure 104 and/or the upper 102 can vary considerably.

Figure 1O:
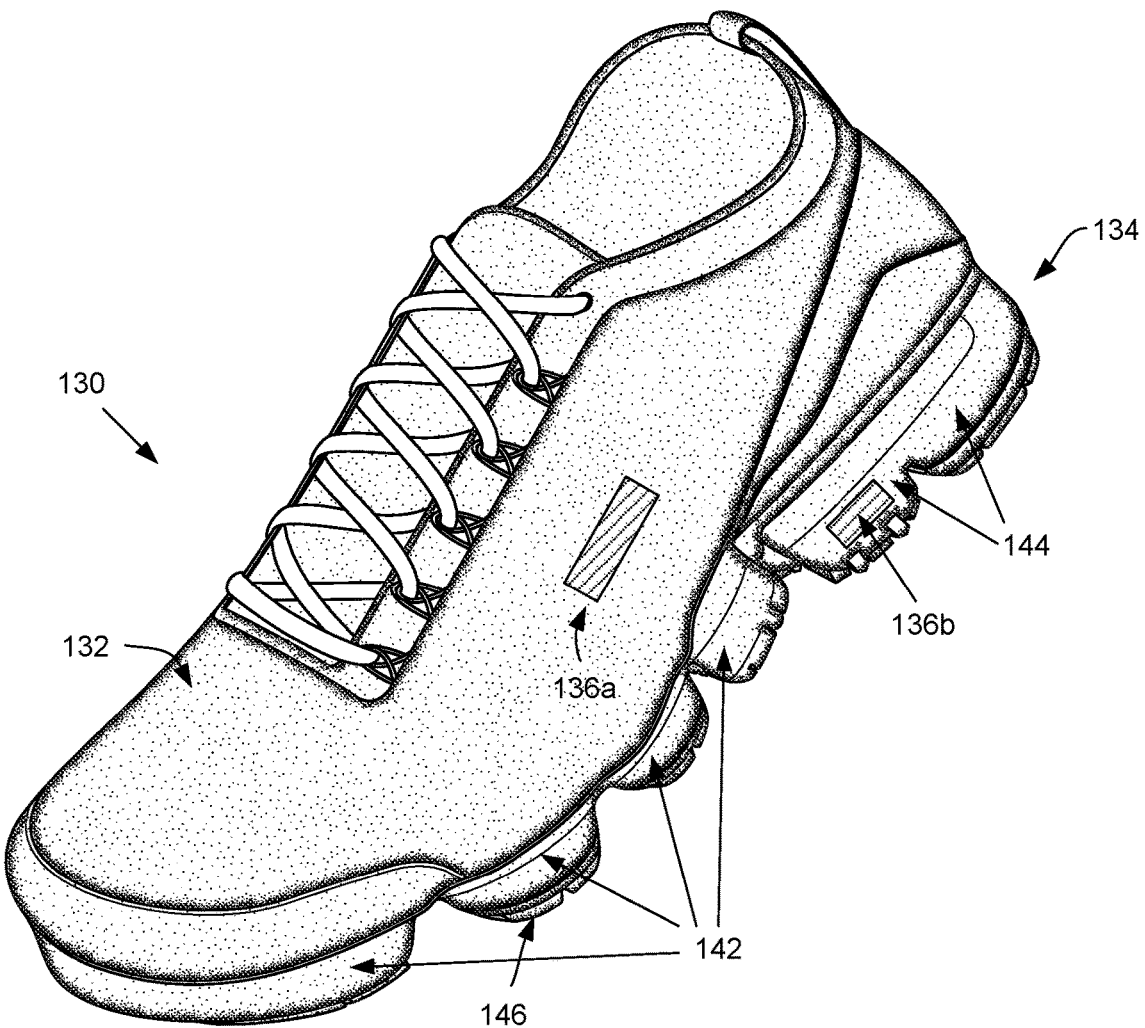
Figure 1O:
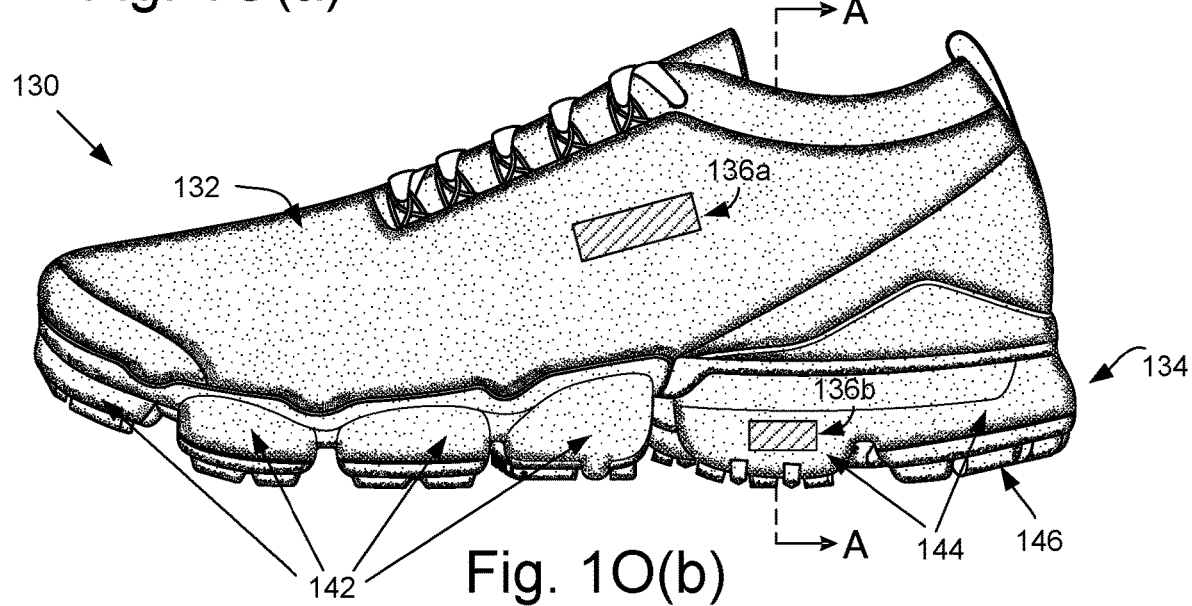
Figure 1O:
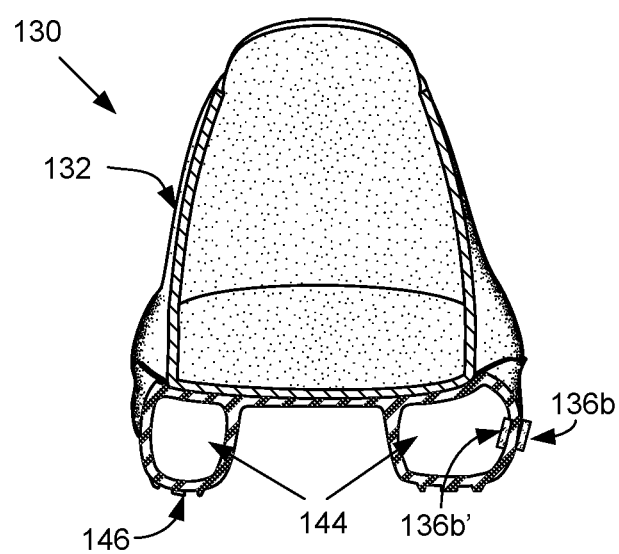

FIGS. 1O(a) and 1O(b) illustrate a perspective view and a side view of an article of footwear 130 that include a sole structure 134 and an upper 132. The structure including the optical element is represented by 136a and 136b/136b'. The sole structure 134 is secured to the upper 132 and extends between the foot and the ground when the article of footwear 130 is worn. The upper 132 can be formed from various elements (e.g., lace, tongue, collar) that combine to provide a structure for securely and comfortably receiving a foot. Although the configuration of the upper 132 may vary significantly, the various elements generally define a void within the upper 132 for receiving and securing the foot relative to the sole structure 134. Surfaces of the void within the upper 132 are shaped to accommodate the foot and extend over the in step and toe areas of the foot, along the medial and lateral sides of the foot, under the foot, and around the heel area of the foot. The upper 132 can be made of one or more materials such as textiles, polymer foam, leather, synthetic leather, and the like that are stitched or bonded together.

The primary elements of the sole structure 134 are a forefoot component 142, a heel component 144, and an outsole 146. Each of the forefoot component 142 and the heel component 144 are directly or indirectly secured to a lower area of the upper 132 and formed from a polymer material that encloses a fluid, which may be a gas, liquid, or gel. During walking and running, for example, the forefoot component 142 and the heel component 144 compress between the foot and the ground; thereby attenuating ground reaction forces. That is, the forefoot component 142 and the heel component 144 are inflated and generally pressurized with the fluid to cushion the foot. The outsole 146 is secured to lower areas of the forefoot component 142 and the heel component 144 and may be formed from a wear-resistant rubber material that is textured to impart traction. The forefoot component 142 can be made of one or more polymers (e.g., layers of one or more polymers films) that form a plurality of chambers that includes a fluid such as a gas. The plurality of chambers can be independent or fluidically interconnected. Similarly, the heel component 144 can be made of one or more polymers (e.g.; layers of one or more polymers films) that form a plurality of chambers that includes a fluid such as a gas and can also be independent or fluidically interconnected. In some configurations, the sole structure 134 may include a foam layer, for example, that extends between the upper 132 and one or both of the forefoot component 142 and the heel component 144, or a foam element may be located within indentations in the lower areas of the forefoot component 142 and the heel component 144. In other configurations, the sole structure 132 may incorporate plates, moderators, lasting elements, or motion control members that further attenuate forces, enhance stability, or influence the motions of the foot, for example. Although the depicted configuration for the sole structure 134 and the upper 132 provides an example of a sole structure that may be used in connection with an upper, a variety of other conventional or nonconventional configurations for the sole structure 134 and/or the upper 132 can also be utilized. Accordingly, the configuration and features of the sole structure 134 and/or the upper 132 can vary considerably.

FIG. 10(c) is a cross-sectional view of A-A that depicts the upper 132 and the heel component 144. The optical element 136b can be disposed on the outside wall of the heel component 144 or alternatively or optionally the optical element 136b' can be disposed on the inside wall of the heel component 144.

Figure 1P:
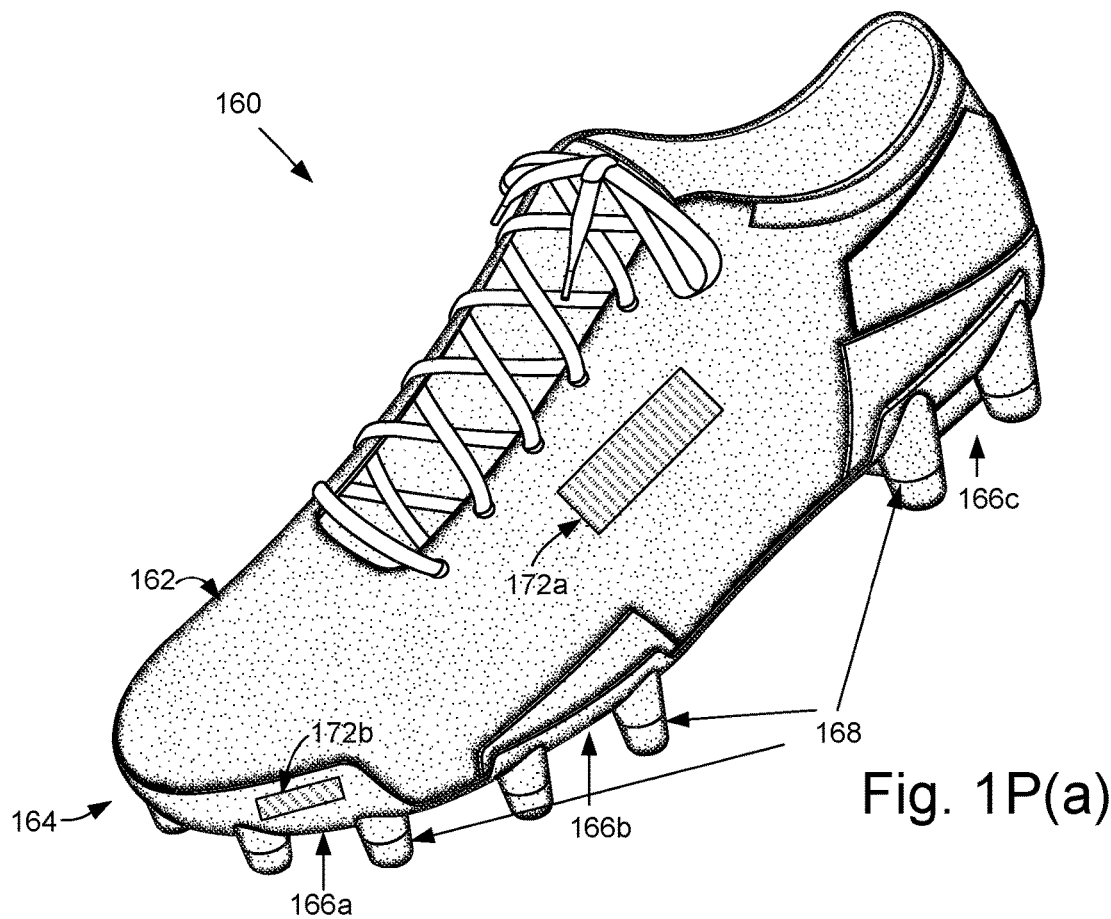
Figure 1P:
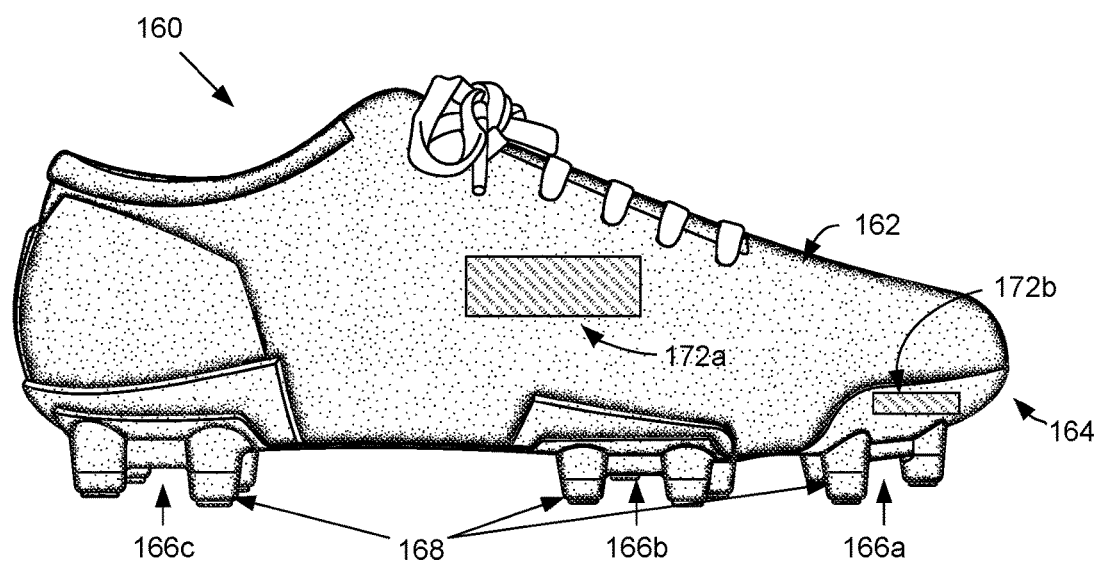

FIGS. 1P(a) and 1P(b) illustrate a perspective view and a side view of an article of footwear 160 that includes traction elements 168. The structure including the optical element is represented by 172a and 172b. The article of footwear 160 includes an upper 162 and a sole structure 164, where the upper 162 is secured to the sole structure 164. The sole structure 164 can include a toe plate 166a, a mid-plate 166b, and a heel plate 166c as well as traction elements 168. The traction elements 168 can include lugs, cleats, studs, and spikes as well as tread patterns to provide traction on soft and slippery surfaces. In general, the cleats, studs and spikes are commonly included in footwear designed for use in sports such as global football/soccer, golf, American football, rugby, baseball, and the like, while lugs and/or exaggerated tread patterns are commonly included in footwear (not shown) including boots design for use under rugged outdoor conditions, such as trail running, hiking, and military use. The sole structure 164 is secured to the upper 162 and extends between the foot and the ground when the article of footwear 160 is worn. The upper 162 can be formed from various elements (e.g., lace; tongue, collar) that combine to provide a structure for securely and comfortably receiving a foot. Although the configuration of the upper 162 may vary significantly, the various elements generally define a void within the upper 162 for receiving and securing the foot relative to the sole structure 164. Surfaces of the void within upper 162 are shaped to accommodate the foot and extend over the in step and toe areas of the foot, along the medial and lateral sides of the foot, under the foot, and around the heel area of the foot. The upper 162 can be made of one or more materials such as textiles, a polymer foam, leather, synthetic leather, and the like that are stitched or bonded together. In other aspects not depicted, the sole structure 164 may incorporate foam, one or more fluid-filled chambers, plates, moderators, or other elements that further attenuate forces, enhance stability, or influence the motions of the foot. Although the depicted configuration for the sole structure 164 and the upper 162 provides an example of a sole structure that may be used in connection with an upper, a variety of other conventional or nonconventional configurations for the sole structure 164 and/or the upper 162 can also be utilized. Accordingly, the configuration and features of the sole structure 164 and/or the upper 162 can vary considerably.

Figure 1Q:
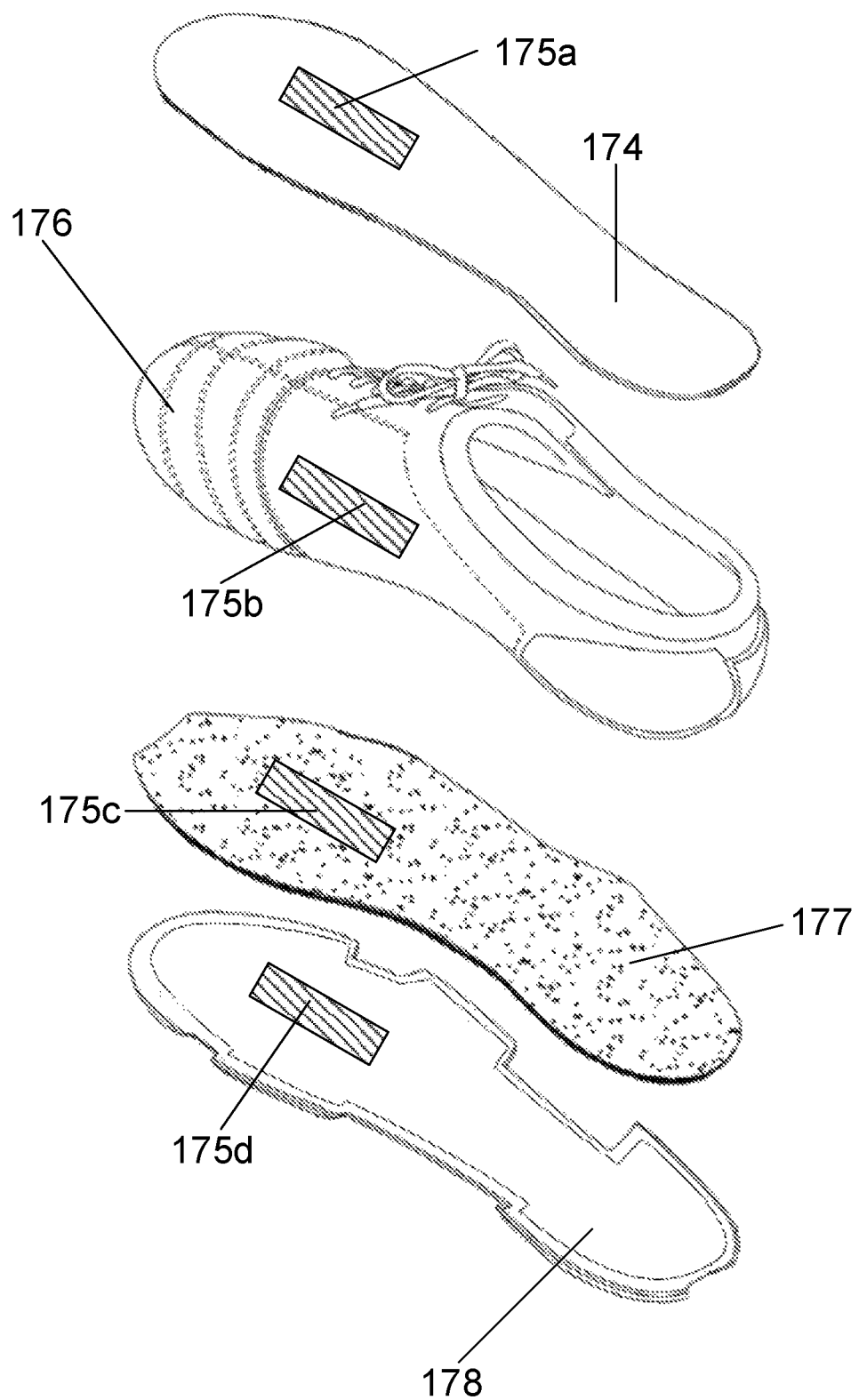
Figure 1Q:
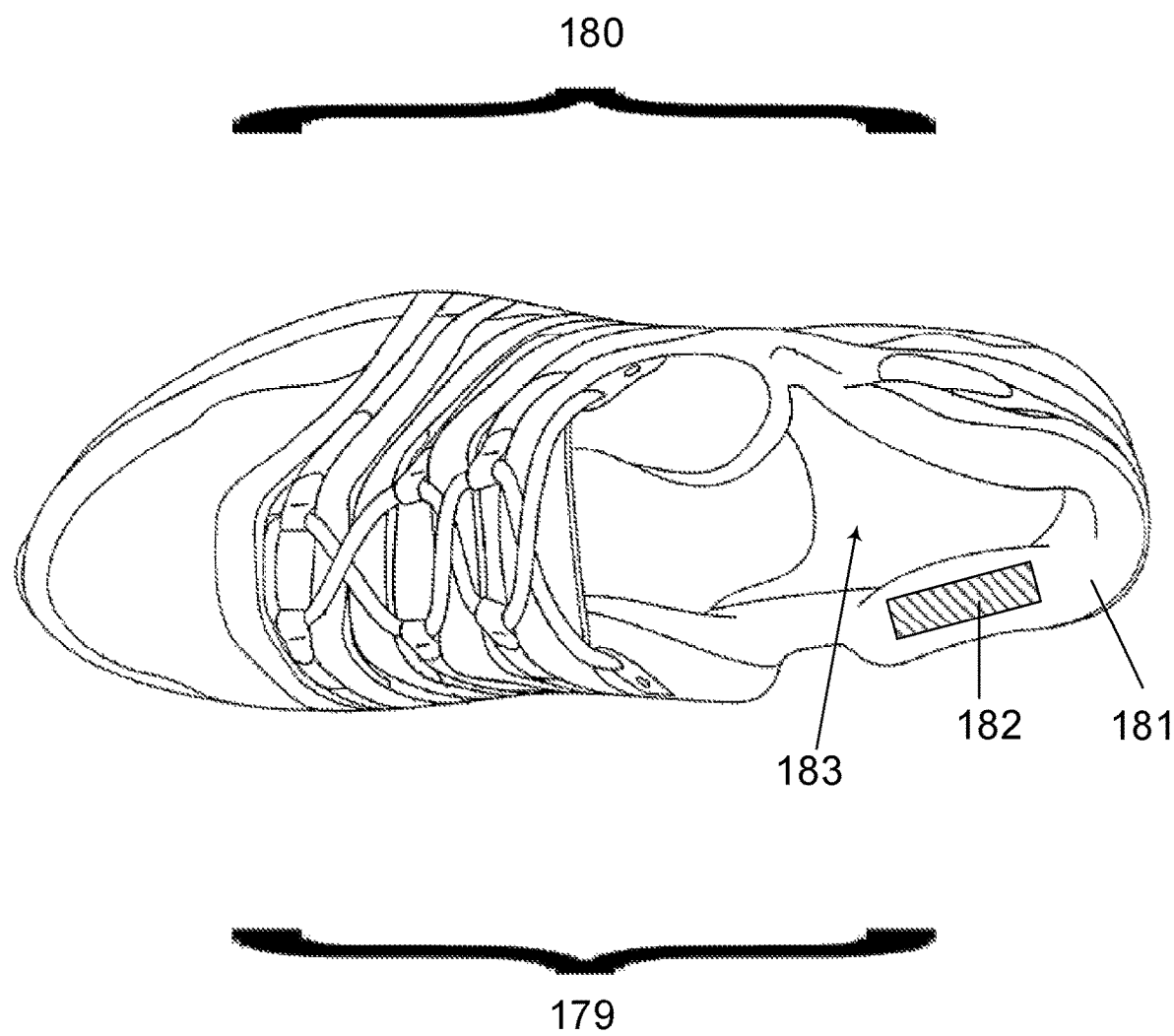
Figure 1Q:
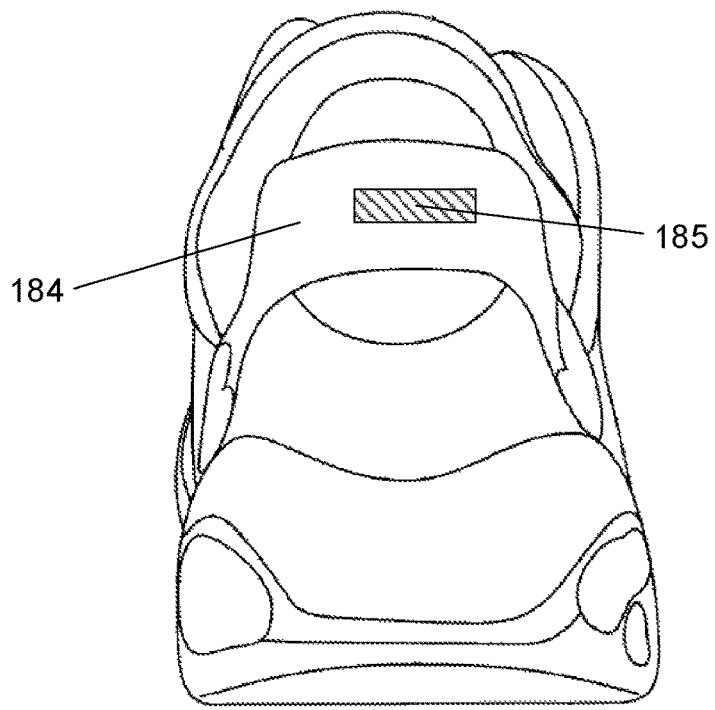
Figure 1Q:
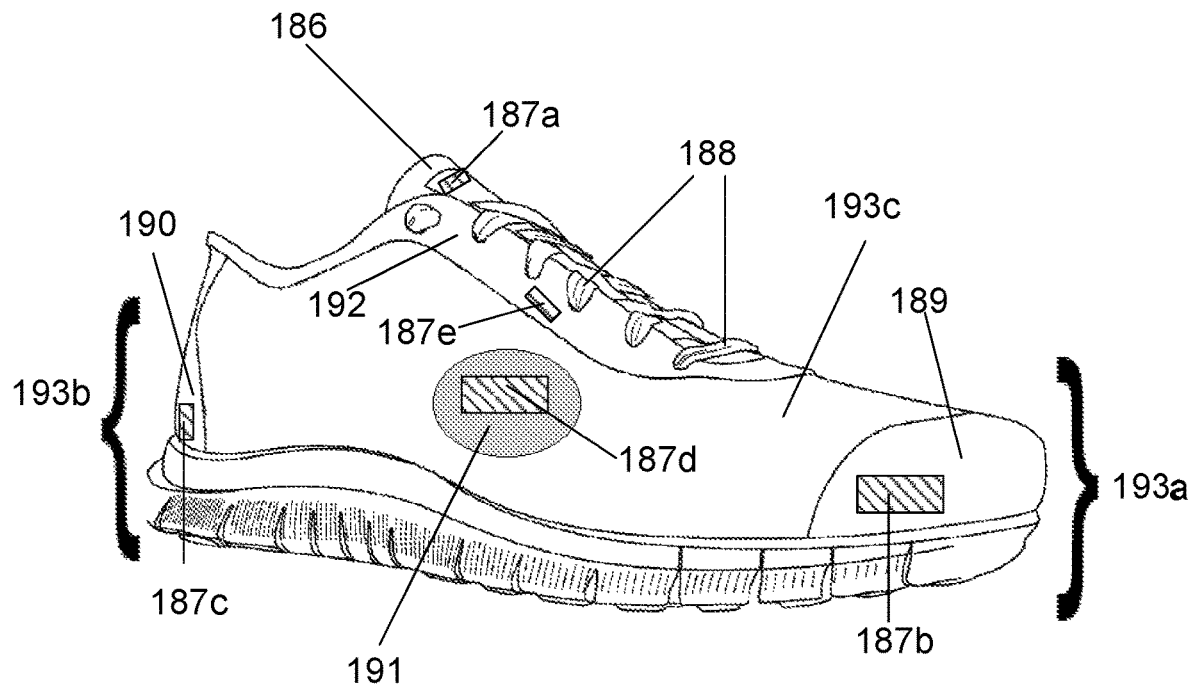
Figure 1Q:
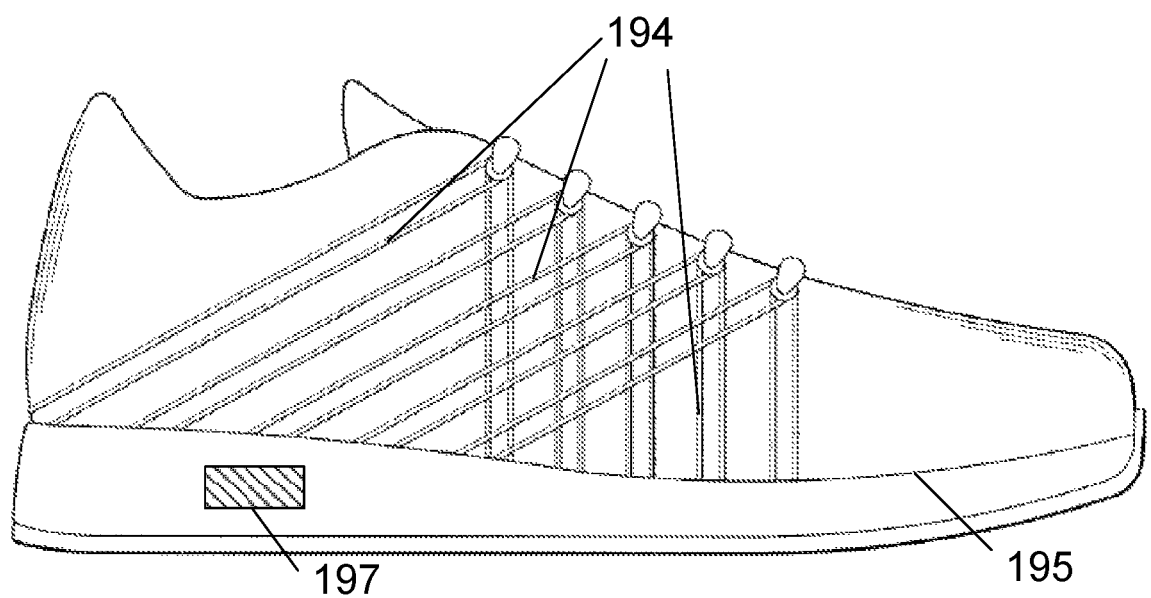

FIGS. 1Q(a)-1Q(j) illustrate additional views of exemplary articles of athletic footwear including various configurations of upper 176. FIG. 1Q(a) is an exploded perspective view of an exemplary article of athletic footwear showing insole 174, upper 176, optional midsole or optional lasting board 177, and outsole 178, which can take the form of a plate. Structures including optical elements are represented by 175a-175d. FIG. 1Q(b) is a top view of an exemplary article of athletic footwear indicating an opening 183 configured to receive a wearer's foot as well as an ankle collar 181 which may include optical element 182. The ankle collar is configured to be positioned around a wearers ankle during wear, and optionally can include a cushioning element. Also illustrated are the lateral side 180 and medial side 179 of the exemplary article of athletic footwear. FIG. 1Q(c) is a back view of the article of footwear depicted in FIG. 10(b), showing an optional heel clip 184 that can include optical element 185. FIG. 1Q(d) shows a side view of an exemplary article of athletic footwear, which may optionally also include a tongue 186, laces 188, a toe cap 189, a heel counter 190, a decorative element such as a logo 191 and/or eyestays for the laces 192 as well as a toe area 193a, a heel area 193b, and a vamp 193c. In some aspects, the heel counter 190 can be covered by a layer of knitted, woven, or nonwoven fabric, natural or synthetic leather, film, or other shoe upper material. In some aspects, the eyestays 192 are formed as one continuous piece; however, they can also comprise several separate pieces or cables individually surrounding a single eyelet or a plurality of eyelets. Structures including optical elements are represented by 187a-187e. While not depicted, optical elements can be present on the eyestays 192 and/or the laces 188. In some configurations, the sole structure can include a sole structure, such as a midsole having a cushioning element in part or substantially all of the midsole, and the optical element can be disposed on an externally-facing side of the sole structure, including on an externally-facing side of the midsole. FIG. 1Q(e) is a side view of another exemplary article of athletic footwear. In certain aspects, the upper can comprise one or more containment elements 194 such as wires, cables or molded polymeric component extending from the lace structure over portions of the medial and lateral sides of the exemplary article of athletic footwear to the top of the sole structure to provide lockdown of the foot to the sole structure, where the containment element(s) can have an optical element (not shown) disposed on an externally-facing side thereon. In some configurations, a rand (not shown) can be present across part or all of the biteline 195.

Now having described embodiments of the present disclosure generally, additional details are provided. As has been described herein, the structural color can be achromatic structural color (e.g., black, white, or neutral gray) or chromatic structural color, where a change in the incident angle of light and/or observation angle can result in a shift in the structural color observed. The structural color (e.g., chromatic and achromatic) of an article as perceived by a viewer can differ from the actual structural color of the article, as the structural color perceived by a viewer is determined by the actual structural color of the article (e.g., the structural color of the light leaving the surface of the article), by the presence of optical elements which may absorb, refract, interfere with, or otherwise alter light reflected by the article, the viewer's visual acuity, by the viewer's ability to detect the wavelengths of light reflected by the article, by the characteristics of the perceiving eye and brain, by the intensity and type of light used to illuminate the article (e.g., sunlight, incandescent light, fluorescent light, and the like), as well as other factors such as the coloration of the environment of the article. As a result, the structural color of an object as perceived by a viewer can differ from the actual achromatic color of the article.

Conventionally, color is imparted to man-made objects by applying colored pigments or dyes to the object. Non-structurally colored materials are made of molecules which absorb all but particular wavelengths of light and reflect back the unabsorbed wavelengths, or which absorb and emit particular wavelengths of light. In non-structural color, it is the unabsorbed and/or the emitted wavelengths of light which impart the color to the article. As the color-imparting property is due to molecule's chemical structure, the only way to remove or eliminate the color is to remove the molecules or alter their chemical structure.

More recently, methods of imparting "structural color" to man-made objects have been developed. Structural color is color that is produced, at least in part, by microscopically structured surfaces that interfere with visible light contacting the surface. The structural color is color caused by physical phenomena including the scattering, refraction, reflection, interference, and/or diffraction of light, unlike color caused by the absorption or emission of visible light through coloring matters. For example, optical phenomena which impart structural color can include single- or multi-layer interference, thin-film interference, refraction, dispersion, light scattering, Mie scattering, diffraction, and diffraction grating. As structural color is produced by physical structures, destroying or altering the physical structures can eliminate or alter the imparted color. The ability to eliminate color by destroying the physical structure, such as by grinding or melting an article can facilitate recycling and reuse colored materials. In various aspects described herein, structural color imparted to an article can be visible to an observer having 20/20 visual acuity and normal color vision from a distance of about 1 meter from the article, when the structurally-colored region is illuminated by about 30 lux of sunlight, incandescent light, or fluorescent light. In some such aspects, the structurally-colored region is at least one square centimeter in size to 10s of centimeters in size.

As described herein, structural color (e.g., achromatic structural color or chromatic structural color) is produced, at least in part, by the optical element, as opposed to the color being produced solely by pigments and/or dyes. The coloration of an article can be due solely to structural color (i.e., the article, a colored portion of the article, or a colored outer layer of the article can be substantially free of pigments and/or dyes). Structural color can also be used in combination with pigments and/or dyes, for example, to alter all or a portion of the achromatic structural color.

In another aspect, the optical element can impart a "combined color," where a "combined color" can be described as having a structural color component (e.g., achromatic structural color or chromatic structural color) and a non-structural color component. For example, the structural color can be used in combination with pigments and/or dyes to alter all or a portion of the structural color, forming a combined structural color. In a combined color, the structural color component, when viewed without the non-structural color component, imparts a structural color having a first structural color and the non-structural color component, when viewed without the structural color component imparts a second color, where the first structural color and the second color differ. Further in this aspect, when viewed together, the first structural color and the second color combine to form a third combined color, which differs from either the first structural color or the second color, for example, through shifting the reflectance spectrum of the optical element.

In another aspect, an optical element can impart a "modified color," where a "modified color" can be described as having a structural color component (e.g., achromatic structural color or chromatic structural color) and a modifier component. In a modified color, the structural color component, when viewed without the modifier component, imparts a structural color and the modifier component, when viewed without the structural color component, does not impart any color, hue, or chroma. Further in this aspect, when viewed together, the modifier component can expand, narrow, or shift the range of wavelengths of light reflected or absorbed by the structural color component. In still another aspect, an optical element can impart a "modified combined color," where a "modified combined color" can be described as having a structural color component (e.g., achromatic structural color or chromatic structural color) having a first structural color, a non-structural color component having a second color, and a modifier component not imparting a color but instead functioning to expand, narrow, or shift the range of wavelengths of light reflected by the combined color formed from the structural color component and the non-structural color component.

In one aspect, the structural color component (e.g., achromatic structural color or chromatic structural color), combined color component, or modified color component disclosed herein is opaque; that is, it prevents light from passing through any articles to which they are applied. Further in this aspect, most wavelengths of light are absorbed by one or more layers of the structural color, combined color, or modified color component, with only a narrow band of light reflected (e.g., if chromatic structural color and would be broad if achromatic structural color) about the wavelength of maximum reflectance.

"Hue" is commonly used to describe the property of color which is discernible based on a dominant wavelength(s) of visible light, and is often described using terms such as magenta, red, orange, yellow, green, cyan, blue, indigo, violet, etc. or can be described in relation (e.g., as similar or dissimilar) to one of these. The hue of a color is generally considered to be independent of the intensity or lightness of the color. For achromatic color, the hue is typically zero and lightness imparts the white, black, or gray color (or shade) as opposed to chromatic where hue and lightness can have zero or non-zero values depending upon the chromatic color. For example, in the Munsell color system, the properties of color include hue, value (lightness) and chroma (color purity) (e.g., achromatic has a zero or close to zero value for hue and chroma, whereas chromatic can have zero or non-zero values depending upon the chromatic color). Particular hues are commonly associated with particular ranges of wavelengths in the visible spectrum: wavelengths in the range of about 700 to 635 nanometers are associated with red, the range of about 635 to 590 nanometers is associated with orange, the range of about 590 to 560 nanometers is associated with yellow, the range of about 560 to 520 nanometers is associated with green, the range of about 520 to 490 nanometers is associated with cyan, the range of about 490 nanometers to 450 nanometers is associated with blue, and the range of about 450 to 400 nanometers is associated with violet. As described herein, that achromatic color can have no hue or chroma and the achromatic color is a color in which no particular wavelength or hue predominates, as all wavelengths or hues are present in equal parts or substantially equal parts. The achromatic color can be selected from black, white, or neutral gray. The chromatic color can be selected from a red/yellow/blue (RYB) primary color, a RYB secondary color, a RYB tertiary color, a RYB quaternary color, a RYB quinary color, or a chromatic color that is a combination thereof. The chromatic color can be red, yellow, blue, green, orange, purple, or a chromatic color that is a combination thereof. The chromatic color can be red, orange, yellow, green, blue, indigo, violet, or a chromatic color that is a combination thereof. The wavelength range can be about 380 to 740 nanometers and can be measured as a function of absorbance or reflectance, each of which can be used to define the chromatic or achromatic structural color imparted by the optical element.

While the optical element may impart a first structural color (e.g., chromatic or achromatic structural color), the presence of an optional textured surface and/or primer layer can alter the structural color or in the alternative have no impact on the first structural color. Other factors such as coatings or transparent elements may further alter the perceived achromatic structural color.

In some embodiments, the structural color of a structurally-colored article does not change substantially, if at all, depending upon the angle at which the article is observed or illuminated. In instances such as this the structural color can be an angle-independent or when observed is substantially independent or is independent of the angle of observation.

Other factors such as coatings or transparent elements may further alter the perceived structural color (e.g., chromatic or achromatic structural color). The structural color can be referred to as a "non-shifting" (i.e., the color remains substantially the same, regardless of the angle of observation and/or illumination), or "shifting" (i.e., the structural color varies depending upon the angle of observation and/or illumination). For example, a shift can occur over a small change in the angle of observation and/or illumination (e.g., less than 5 degrees, less than 7 degrees, or less than 10 degrees, but this is dependent upon the particular optical element) so that achromatic structural color is achromatic over the change in the angle (e.g., shifts from black to gray, shifts from gray to white, shifts from black to white, shifts between different shades of gray, shifts between different shades of white, shifts between different shades of black) or so that the chromatic structural color is chromatic over the change in the angle (e.g., shifts from different blues, green, yellows, reds, etc or between these chromatic colors). In another example, the shift can occur over a larger angle of observation and/or illumination (e.g., greater than 10 degrees, greater than 12 degrees, greater than 15 degrees but this is dependent upon the particular optical element) so the shift is from chromatic to achromatic or vice versa. In an aspect, the shift over the smaller angle can occur and the shift over the larger angle can occur, which can be aesthetically desirable. In this regard, the shifting color can change gradually (e.g., as the angle changes by 4 or 5 degrees) over two or more shades or colors while being chromatic or achromatic as the angle of observation or illumination changes (e.g., a change of less than 5 to about 10 or up to 15 degrees). In as aspect, the shifting color can shift from a achromatic color to a chromatic color upon reaching a threshold change (e.g., an abrupt (e.g., a change of 1 to 3 degrees) change from chromatic to achromatic or vice versa or the change is gradual (e.g., a change of about 4 to 8 degrees) and not abrupt) in angle of observation or illumination (e.g., a change of more than 10, 12, or 15 degrees). For example, an abrupt change can occur as the angle changes from 14 to 15 degrees, whereas a gradual change can occur as the angle changes from 13 to 17 degrees. Thus, the shifting of the structural color can change gradually or abruptly as the angle of observation or illumination changes, which can be determined by the design of the optical element.

In an example, the shift from achromatic to chromatic structural color can as the angle of observation or illumination changes from 13 to 15 degree (an abrupt change). Optionally, as the angle of observation or illumination changes from 3 to 8 degrees, there is a shift in the achromatic color from black to neutral gray. Optionally, as the angle of observation or illumination changes from 16 to 20 degrees, there is a shift in the chromatic color from blue to blue green.

In another example, the shift from achromatic to chromatic structural color can as the angle of observation or illumination changes from 12 to 17 degree (an gradual change). Optionally, as the angle of observation or illumination changes from 3 to 8 degrees, there is a shift in the achromatic color from white to neutral gray. Optionally, as the angle of observation or illumination changes from 17 to 22 degrees, there is a shift in the chromatic color from blue to blue green to green.

These examples simply illustrate that the shifting can be varied and diverse and the optical element can be designed according to the desired outcome.

As discussed above, the color of a structurally-colored article (e.g., an article include structural color) can be independent of or vary depending upon the angle at which the structurally-colored article is observed or illuminated. As used herein, the "angle" of illumination or viewing is the angle measured from an axis or plane that is orthogonal to the surface. The viewing or illuminating angles can be set between about 0 and 180 degrees. The viewing or illuminating angles can be set at 0 degrees, 5 degrees, 10 degrees, 15 degrees, 30 degrees, 45 degrees, 60 degrees, and −15 degrees (as well as increments of 1 within the ranges described above and herein) and the color can be measured using a colorimeter or spectrophotometer (e.g., Konica Minolta), which focuses on a particular area of the article to measure the color. The viewing or illuminating angles can be set at 0 degrees, 5 degrees, 10 degrees, 15 degrees, 30 degrees, 45 degrees, 60 degrees, 75 degrees, 90 degrees, 105 degrees, 120 degrees, 135 degrees, 150 degrees, 165 degrees, 180 degrees, 195 degrees, 210 degrees, 225 degrees, 240 degrees, 255 degrees, 270 degrees, 285 degrees, 300 degrees, 315 degrees, 330 degrees, and 345 degrees and the color can be measured using a colorimeter or spectrophotometer Various methodologies for defining color coordinate systems exist. One example is L*a*b* color space, where, for a given illumination condition, L* is a value for lightness, and a* and b* are values for color-opponent dimensions based on the CIE coordinates (CIE 1976 color space or CIELAB) (e.g., a* and b* are 0 or close to 0). In an embodiment, a structural color (e.g., chromatic structural color or achromatic structural color) can be considered as having a "single" color when the change in color measured for the article is within about 10 percent or within about 5 percent of the total scale of the a* or b* coordinate of the L*a*b* scale (CIE 1976 color space) at three or more measured observation or illumination angles selected from measured at observation or illumination angles of 0 degrees, 15 degrees, 30 degrees, 45 degrees, 60 degrees, and −15 degrees.

Another example of a color scale is the CIELCH color space, where, for a given illumination condition, L* is a value for lightness, C* is a value for chroma, and h° denotes a hue as an angular measurement (e.g., C* and h° are 0 or close to 0). In an embodiment, a structural color (e.g., chromatic structural color or achromatic structural color) can be considered as having a "single" color when the color measured for the article is less than 10 degrees different or less than 5 degrees different at the h° angular coordinate of the CIELCH color space, at three or more measured observation or illumination angles selected from measured at observation or illumination angles of 0 degrees, 15 degrees, 30 degrees, 45 degrees, 60 degrees, and −15 degrees. In certain embodiments, colors which, when measured and assigned values in the CIELCH system that vary by at least 45 degrees in the h° measurements, are considered to be different colors.

Another system for characterizing color includes the "PANTONE" Matching System (Pantone LLC, Carlstadt, N.J., USA), which provides a visual color standard system to provide an accurate method for selecting, specifying, broadcasting, and matching colors through any medium. In an example, a first optical element and a second optical element (or the same optical element at different angles) can be said to have the same color when the color measured for each optical element is within a certain number of adjacent standards, e.g., within 20 adjacent PANTONE standards, at three or more measured observation or illumination angles selected from 0 degrees, 15 degrees, 30 degrees, 45 degrees, 60 degrees, and 75 degrees. In an alternative aspect, the first optical element and the second optical element (or a single optical element at different angles) can be said to have different colors when the color measured for each optical element is outside a certain number of adjacent standards, e.g., at least 20 adjacent PANTONE standards or farther apart, at three or more measured observation or illumination angles selected from 0 degrees, 15 degrees, 30 degrees, 45 degrees, 60 degrees, and 75 degrees. In another aspect, an optical element can be said to be single color when all areas of the optical element have the same PANTONE color as defined herein, or can be multi-colored when at least two areas of the optical element have different PANTONE colors. In another aspect, a single optical element can be said to have a non-shifting color if it exhibits the same PANTONE color as defined herein at three or more measured observation or illumination angles (e.g., 0 degrees, 15 degrees, 30 degrees, 45 degrees, 60 degrees, and −15 degrees). In an alternative aspect, a single optical element can be said to be shifting if it exhibits two, three, or four different PANTONE colors as defined herein at two or more measured observation or illumination angles (e.g., 0 degrees, 15 degrees, 30 degrees, 45 degrees, 60 degrees, and −15 degrees).

Another example of a color scale is the Natural Color System® or NCS, which is built on principles of human physiological vision and describes color by using color similarity relationships. The NCS is based on the premise that the human visual system consists of six elementary color precepts, or colors that can be challenging to define perceptually in terms of other colors. These colors consist of three pairs: (i) the achromatic colors of black (S) and white (W), (ii) the opposing primary color pair of red (R) and green (G), and (iii) the opposing primary color pair of yellow (Y) and blue (B). In the NCS, any color that can be perceived by the human eye can be similar to the two achromatic colors and a maximum of two non-opposing primary colors. Thus, for example, a perceived color can have similarities to red and blue but not to red and green. NCS descriptions of colors are useful for colors that belong to the surfaces of materials, so long as the surfaces are not fluorescent, translucent, luminescent, or the like; the NCS does not encompass other visual properties of the surface such as, for example, gloss and texture.

The NCS color space is a three dimensional model consisting of a flat circle at which the four primary colors are positioned in order at 0 degrees, 90 degrees, 180 degrees, and 270 degrees. For example, if yellow is at 0 degrees, red is at 90 degrees, blue is at 180 degrees, and green is at 270 degrees. White is represented above the circle and black below such that a hue triangle forms between the black/white (grayscale) axis and any point on the circle.

Percentage "blackness" (s) is defined in the NCS as a color's similarity to the elementary color black. Percentage "chromaticness" (c) represents similarity to the most saturated color in a hue triangle. "Hue" (φ) in the NCS, meanwhile, represents similarity of a color to one or at most two non-opposing primary colors. Blackness and chromaticness add up to a value less than or equal to 100 percent; any remaining value is referred to as "whiteness" (w) of a color. In some cases, the NCS can be used to further describe "saturation" (m), a value from 0 to 1 determined in terms of chromaticness and whiteness (e.g., m=c/(w+c)). NCS can further be used to describe "lightness" (v), a description of whether the color contains more of the achromatic elementary colors black or white. A pure black article would have a lightness of 0 and a pure white article would have a lightness of 1. Purely neutral grays (c=0) have lightness defined by v=(100−s)/100, while chromatic colors are first compared to a reference scale of grays and lightness is then calculated as for grays.

NCS notation takes the generic form sc-AφB, where sc defines "nuance," ss is the percent blackness and cc refers to the chromaticity; A and B are the two primary colors to which the color relates; and φ is a measure of where a color falls between A and B. Thus, a color (e.g., orange) that has equal amounts of yellow and red could be represented such that AφB=Y50R (e.g., yellow with 50 percent red), whereas a color having relatively more red than yellow is represented such that AφB=Y60R, Y70R, Y80R, Y90R, or the like. The color having equal amounts of yellow and red with a relatively low (10 percent) amount of darkness and a medium (50 percent) level of chromaticity would thus be represented as 1050-Y50R. In this system, neutral colors having no primary color components are represented by sc-N, where sc is defined in the same manner as with a non-neutral color and N indicates neutrality, while a pure color would have a notation such as, for example, 3050-B (for a blue with 30 percent darkness and 50 percent chromaticity). A capital "S" in front of the notation indicates that a value was present in the NCS 1950 Standard, a reduced set of samples. As of 2004, the NCS system contains 1950 standard colors.

The NCS is more fully described in ASTM E2970-15, "Standard Practice for Specifying Color by the Natural Colour System (NCS)." Although the NCS is based on human perception and other color scales such as the CIELAB or CIELCH spaces may be based on physical properties of objects, NCS and CIE tristimulus values are interconvertible.

In an example, a first optical element and a second optical element (or the same optical element at different angles) can be considered as being the same structural color when the structural colors measured for each optical element are within a certain number of adjacent standards, e.g., within 20 adjacent NCS values, at three or more measured observation or illumination angles selected from 0 degrees, 15 degrees, 30 degrees, 45 degrees, 60 degrees, and −15 degrees. In another example, the first optical element and the second optical element (or the same optical element at different angles) can be considered as being different structural colors when the colors measured for each optical element are outside a certain number of adjacent standards, e.g., farther apart than at least 20 adjacent NCS values, at three or more measured observation or illumination angles selected from 0 degrees, 15 degrees, 30 degrees, 45 degrees, 60 degrees, and −15 degrees. In another aspect, an optical element can be said to be a single structural color when all areas of the optical element have the same NCS color as defined herein, or can be multi-colored when at least two areas of the optical element have different NCS colors. In another aspect, a single optical element can be said to have a non-shifting color if it exhibits the same NCS color as defined herein at three or more measured observation or illumination angles (e.g., 0 degrees, 15 degrees, 30 degrees, 45 degrees, 60 degrees, and −15 degrees). In an alternative aspect, a single optical element can be said to be shifting color if it exhibits two, three, or four different NCS colors as defined herein at two or more measured observation or illumination angles (e.g., 0 degrees, 15 degrees, 30 degrees, 45 degrees, 60 degrees, and −15 degrees).

The method of making articles including the optical element (e.g., structurally colored article) can include disposing (e.g., affixing, attaching, bonding, fastening, joining, appending, connecting, binding) the optical element onto an article (e.g., an article of footwear, an article of apparel, an article of sporting equipment, etc.). The article includes a component, and the component has a surface upon which the optical element can be disposed. The surface of the article can be made of a material such as a thermoplastic material or thermoset material, as described herein. For example, the article has a surface including a thermoplastic material (i.e., a first thermoplastic material), for example an externally-facing surface of the component or an internally-facing surface of the component (e.g., an externally-facing surface or an internally-facing surface a bladder). The optical element can be disposed onto the thermoplastic material, for example.

In an aspect, the temperature of at least a portion of the first surface of the article including the thermoplastic material is increased to a temperature at or above creep relaxation temperature (Tcr), Vicat softening temperature (Tvs), heat deflection temperature (Thd), and/or melting temperature (Tm) of the thermoplastic material, for example to soften or melt the thermoplastic material. The temperature can be increased to a temperature at or above the creep relaxation temperature. The temperature can be increased to a temperature at or above the Vicat softening temperature. The temperature can be increased to a temperature at or above the heat deflection temperature. The temperature can be increased to a temperature at or above the melting temperature. While the temperature of the at least a portion of the first side of the article is at or above the increased temperature (e.g., at or above the creep relaxation temperature, the heat deflection temperature, the Vicat softening temperature, or the melting temperature of the thermoplastic material), the optical element is affixed to the thermoplastic material within the at least a portion of the first side of the article. Following the affixing, the temperature of the thermoplastic material is decreased to a temperature below its creep relaxation temperature to at least partially re-solidify the thermoplastic material. The thermoplastic material can be actively cooled (e.g., removing the source that increases the temperature and actively (e.g., flowing cooler gas adjacent the article reducing the temperature of the thermoplastic material) or passively cooled (e.g., removing the source that increases the temperature and allowing the thermoplastic layer to cool on its own).

The method of making the article can include disposing (e.g., affixing, attaching, bonding, fastening, joining, appending, connecting, binding, which includes operably disposing etc.) the optical element onto a surface of an article (e.g., an article of footwear, an article of apparel, an article of sporting equipment, etc.) or a surface of a component of an article. The article can include a component, and the component can include the surface upon which the optical element is be disposed. The surface of the article can be made of a material such as a thermoplastic material or thermoset material, as described herein. For example, the article can have a surface including a thermoplastic material (i.e., a first thermoplastic material), for example an externally-facing surface of the component or article or an internally-facing surface of the component or article (e.g., an externally-facing surface or an internally-facing surface a bladder). The optical element can be disposed onto the thermoplastic material, for example.

Now having described color and other aspects generally, additional details regarding the optical element are provided. As described herein, the article includes the optical element. The optical element can include at least one reflective layer (e.g., base and/or non-base reflective layers) and/or at least one constituent layer. The optical element that can be or include a single layer reflector, a single layer filter, or multilayer reflector or a multilayer filter. The optical element can function to modify the light that impinges thereupon so that structural color is imparted to the article. The optical element can also optionally include one or more additional layers (e.g., a protective layer, the textured layer, a polymer layer, and the like). The optical element can have a thickness of about 100 to about 1,500 nanometers, about 100 to about 1,200 nanometers, about 100 to about 700 nanometers, or of about 200 to about 500 nanometers.

The optical element can be an optical element, an organic optical element, or a mixed inorganic/organic optical element, where the layers (e.g., reflective layer, constituent layer) can be made of these types of materials. The organic optical element has at least one layer and that layer is made of an organic material. The organic material can include a polymer, such as those described herein. The organic material is made of a non-metal or non-metal oxide material. The organic material that does not include a metal or metal oxide. The organic material is made of a polymeric material that does not include a metal or metal oxide.

The inorganic optical element has at least one layer and that layer is made of a non-organic material. As described in detail herein, the non-organic material can be a metal or metal oxide. The non-organic material does not include any organic material.

The optical element can be a mixed inorganic/organic optical element, meaning that one or more of the layers can be made of an inorganic material, one or more layers can be made of an organic material, and/or one or more layers can be made of a layer of a mixture of inorganic and organic materials (e.g., a polymer include metal or metal oxide particles (e.g., micro- or nano-particles).

The optical element has a first side (including the outer surface) and a second side opposing the first side (including the opposing outer surface), where the first side or the second side is adjacent the article. For example, when the optical element is used in conjunction with a component having internally-facing and externally-facing surfaces, such as a film or a bladder, the first side of the optical element can be disposed on the internally-facing surface of the component, such as in the following order: second side of the optical element/core of the optical element/first side of the optical element/internally-facing surface of the component/core of the component/externally-facing surface of the component. Alternatively, the second side the optical element can be disposed on the internally-facing surface of the component, such as in the following order: first side of the optical element/core of the optical element/second side of the optical element/internally-facing surface of the component/core of the component wall/externally-facing surface of the component. In another example, the first side of the optical element can be disposed on the externally-facing surface of the component, such as in the following order: internally-facing surface of the component/core of the component/externally-facing surface of the component/first side of the optical element/core of the optical element/second side of the optical element. Similarly, the second side of the optical element can be disposed on the externally-facing surface of the component, such as in the following order: internally-facing surface of the component/core of the component/externally-facing surface of the component/second side of the optical element/core of the optical element/first side of the optical element. In examples where the optional textured surface, the textured surface can be located at the interface between the surface of the component and a side of the optical element.

In regard to the components of the optical element, when the optical element is on and visible from an outside surface of the article, the base reflective layer is between the at least two constituent layers and the surface. When the optical element is on an inside surface of the article and is visible through an outside surface of the article, the at least two constituent layers are between the base reflective layer and the surface.

The optical element or layers or portions thereof (e.g., reflective layer, constituent layer) can be formed using known techniques such as physical vapor deposition, electron beam deposition, atomic layer deposition, molecular beam epitaxy, cathodic arc deposition, pulsed laser deposition, sputtering deposition (e.g., radio frequency, direct current, reactive, non-reactive), chemical vapor deposition, plasma-enhanced chemical vapor deposition, low pressure chemical vapor deposition and wet chemistry techniques such as layer-by-layer deposition, sol-gel deposition, Langmuir blodgett, and the like. The temperature of the first side can be adjusted using the technique to form the optical element and/or a separate system to adjust the temperature.

The optical element can comprise a single layer reflector or a multilayer reflector (e.g., reflective layer(s) and/or constituent layer(s)). The multilayer reflector can be configured to have a certain reflectivity for a range of wavelengths depending, at least in part, on the material selection, thickness and number of the layers of the multilayer reflector. In other words, one can carefully select the materials, thicknesses, and numbers of the layers of a multilayer reflector and optionally its interaction with one or more other layers, so that it can reflect and/or absorb a wavelength range of light to produce a desired structural color or shift.

The optical element can include at least one reflective layer and/or at least two adjacent constituent layers, where the adjacent constituent layers (e.g., and the non-base reflective layer(s) when present) have different refractive indices. The difference in the index of refraction of adjacent layers of the constituent layer, and the reflective layer when present, can be about 0.0001 to about 50 percent, about 0.1 to about 40 percent, about 0.1 to about 30 percent, about 0.1 to about 20 percent, about 0.1 to about 10 percent (and other ranges there between (e.g., the ranges can be in increments of 0.0001 to 5 percent)). The index of refraction depends at least in part upon the material of the constituent and can range from about 1.3 to about 2.6.

The combination of the reflective(s) layer and/or the constituent layer(s) can include 1 to 100 layers, 1 to 50, 1 to 25 layer, 1 to 15 layers, 1 to 10 layers, 2 to 4 layers, 2 to 20 layers, 2 to 15, 2 to 10 layer, 2 to 6 layers, or 2 to 4 layers. Each of the reflective layer(s) or the constituent layer(s) can have a thickness that is about one-fourth of the wavelength of light to be reflected to produce the desired structural color or shift. Each of the reflective layer(s) or the constituent layer(s) can have a thickness of about 10 to about 500 nanometers, 10 to 100 nanometers, 10 to 150 nanometers, about 50 to 150 nanometers, about 50 to 200 nanometers, or about 90 to about 200 nanometers. The optical element can have at least two constituent layers, where adjacent constituent layers have different thicknesses and optionally the same or different refractive indices.

The optical element can comprise a single layer filter or a multilayer filter. The multilayer filter destructively interferes with light that impinges upon the article, where the destructive interference of the light and optionally interaction with one or more other layers or structures of the optical element (e.g., a multilayer reflector, a textured structure) impart the structural color or shift. In this regard, the layers of the multilayer filter can be designed (e.g., material selection, thickness, number of layer, and the like) so that certain wavelength range is reflected and/or absorbed to a certain degree to impart the desired structural color or shift.

The reflective layer(s) and/or constituent layer(s) can include multiple layers where each layer independently comprises a material selected from: the transition metals, the metalloids, the lanthanides, and the actinides, as well as nitrides, oxynitrides, sulfides, sulfates, selenides, and tellurides of these, as well as others described herein such as stainless steel. The reflective layer(s) and/or constituent layer(s) can be titanium, aluminum, silver, zirconium, chromium, magnesium, silicon, gold, platinum, and a combination thereof as well as oxides of each. The material for the constituent layer(s) can be selected to provide an index of refraction that when optionally combined with the other layers of the optical element achieves the desired result. One or more layers of the constituent layer can be made of liquid crystals. Each layer of the constituent layer can be made of liquid crystals. One or more layers of the constituent layer can be made of a material such as: silicon dioxide, titanium dioxide, zinc sulfide, magnesium fluoride, tantalum pentoxide, aluminum oxide, or a combination thereof. Each layer of the constituent layer can be made of a material such as: silicon dioxide, titanium dioxide, zinc sulfide, magnesium fluoride, tantalum pentoxide, aluminum oxide, or a combination thereof. To improve adhesion between layers, a metal layer is adjacent a metal oxide layer comprising the same metal. For example, Ti and $TiO_x$ can be positioned adjacent one another to improve adhesion.

The optical element can be uncolored (e.g., no pigments or dyes added to the structure or its layers), colored (e.g., pigments and/or dyes are added to the structure or its layers. The surface of the component upon which the optical element is disposed can be uncolored (e.g., no pigments or dyes added to the material), colored (e.g., pigments and/or dyes are added to the material), reflective, and/or transparent (e.g., percent transmittance of about 75 percent or more).

The reflective layer(s) and/or the constituent layer(s) can be formed in a layer-by-layer manner, where each layer has a different index of refraction. Each layer can have a textured topography or a three dimensional flat planar surface or substantially three dimensional flat planar surface. Each of the reflective layer(s) and/or the constituent layer(s) can be formed using known techniques such as those described above and herein.

As mentioned above, the optical element can include one or more layers in addition to the reflective layer(s) and the constituent layer(s). The optical element has a first side (e.g., the side having a surface) and a second side (e.g., the side having a surface), where the first side or the second side is adjacent the surface of the component. The one or more other layers of the optical element can be on the first side and/or the second side of the optical element. For example, the optical element can include the top layer (e.g., non-stoichiometric metal layer), a protective layer and/or a polymeric layer such as a thermoplastic polymeric layer, where the protective layer and/or the polymeric layer can be on one or both of the first side and the second side of the optical element. One or more of the optional other layers can include a textured surface. Alternatively or in addition, one or more of the reflective layer(s) and/or one or more constituent layer(s) of the optical element can include a textured surface.

A protective layer can be disposed on the first and/or second side of the constituent layer to protect the constituent layer. The protective layer is more durable or more abrasion resistant than the constituent layer. The protective layer is optically transparent to visible light. The protective layer can be on the first side of the optical element to protect the constituent layer. All or a portion of the protective layer can include a dye or pigment in order to alter an appearance of the structural color or shift. The protective layer can include silicon dioxide, glass, combinations of metal oxides, or mixtures of polymers. The protective layer can have a thickness of about 3 nanometers to about 1 millimeter.

The protective layer can be formed using physical vapor deposition, chemical vapor deposition, pulsed laser deposition, evaporative deposition, sputtering deposition (e.g., radio frequency, direct current, reactive, non-reactive), plasma enhanced chemical vapor deposition, electron beam deposition, cathodic arc deposition, low pressure chemical vapor deposition and wet chemistry techniques such as layer by layer deposition, sol-gel deposition, Langmuir blodgett, and the like. Alternatively or in addition, the protective layer can be applied by spray coating, dip coating, brushing, spin coating, doctor blade coating, and the like.

A polymeric layer can be disposed on the first and/or second side of the optical element. The polymeric layer can be used to dispose the optical element onto an article, such as, for example, when the article does not include a thermoplastic material to adhere the optical element. The polymeric layer can comprise a polymeric adhesive material, such as a hot melt adhesive. The polymeric layer can be a thermoplastic material and can include one or more layers. The thermoplastic material can be any one of the thermoplastic material described herein. The polymeric layer can be applied using various methodologies, such as spin coating, dip coating, doctor blade coating, and so on. The polymeric layer can have a thickness of about 3 nanometer to about 1 millimeter.

As described above, one or more embodiments of the present disclosure provide articles that incorporate the optical element (e.g., single or multilayer structures) on a side of a component of the article to impart structural color or shift. The optical element can be disposed onto the thermoplastic material of the side of the article, and the side of the article can include a textile, including a textile comprising the thermoplastic material.

Having described aspects, additional details will now be described for the optional textured surface. As described herein, the component includes the optical element and the optical element can include at least one reflective layer and/or at least one constituent layer and optionally a textured surface. The textured surface can be a surface of a textured structure or a textured layer. The textured surface may be provided as part of the optical element. For example, the optical element may comprise a textured layer or a textured structure that comprises the textured surface. The textured surface may be formed on the first or second side of the optical element. For example, a side of the reflective layer and/or the constituent layer may be formed or modified to provide a textured surface, or a textured layer or textured structure can be affixed to the first or second side of the optical element. The textured surface may be provided as part of the component to which the optical element is disposed. For example, the optical element may be disposed onto the surface of the component where the surface of the component is a textured surface, or the surface of the component includes a textured structure or a textured layer affixed to it.

The textured surface (or a textured structure or textured layer including the textured surface) may be provided as a feature on or part of another medium, such as a transfer medium, and imparted to a side or layer of the optical element or to the surface of the component. For example, a mirror image or relief form of the textured surface may be provided on the side of a transfer medium, and the transfer medium contacts a side of the optical element or the surface of the component in a way that imparts the textured surface to the optical element or article. While the various embodiments herein may be described with respect to a textured surface of the optical element, it will be understood that the features of the textured surface, or a textured structure or textured layer, may be imparted in any of these ways.

The textured surface can contribute to the structural color resulting from the optical element and/or the shift in the structural color (e.g., from achromatic to chromatic structural color or vice versa) or in the alternative may not contribute to the structural color and/or shift in the structural color. As described herein, structural coloration is imparted, at least in part, due to optical effects caused by physical phenomena such as scattering, diffraction, reflection, interference or unequal refraction of light rays from an optical element. The textured surface (or its mirror image or relief) can include a plurality of profile features and flat or planar areas. The plurality of profile features included in the textured surface, including their size, shape, orientation, spatial arrangement, etc., can affect the light scattering, diffraction, reflection, interference and/or refraction resulting from the optical element. The flat or planar areas included in the textured surface, including their size, shape, orientation, spatial arrangement, etc., can affect the light scattering, diffraction, reflection, interference and/or refraction resulting from the optical element. The desired structural color (or color shift) can be designed, at least in part, by adjusting one or more of properties of the profile features and/or flat or planar areas of the textured surface.

The profile features can extend from a side of the flat areas, so as to provide the appearance of projections and/or depressions therein. A flat area can be a flat planar area. A profile feature may include various combinations of projections and depressions. For example, a profile feature may include a projection with one or more depressions therein, a depression with one or more projections therein, a projection with one or more further projections thereon, a depression with one or more further depressions therein, and the like. The flat areas do not have to be completely flat and can include texture, roughness, and the like. The texture of the flat areas may not contribute much, if any, to the imparted structural color and/or color shift. Or the texture of the flat areas may contribute to the imparted structural color and/or color shift. For clarity, the profile features and flat areas are described in reference to the profile features extending above the flat areas, but the inverse (e.g., dimensions, shapes, and the like) can apply when the profile features are depressions in the textured surface.

The textured surface can comprise a thermoplastic material. The profile features and the flat areas can be formed using a thermoplastic material. For example, when the thermoplastic material is heated above its softening temperature a textured surface can be formed in the thermoplastic material such as by molding, stamping, printing, compressing, cutting, etching, vacuum forming, etc., the thermoplastic material to form profile features and flat areas therein. The textured surface can be imparted on a side of a thermoplastic material. The textured surface can be formed in a layer of thermoplastic material. The profile features and the flat areas can be made of the same thermoplastic material or a different thermoplastic material.

The textured surface generally has a length dimension extending along an x-axis, and a width dimension extending along a z-axis, and a thickness dimension extending along a y-axis. The textured surface has a generally planar portion extending in a first plane that extends along the x-axis and the z-axis. A profile feature can extend outward from the first plane, so as to extend above or below the plane x. A profile feature may extend generally orthogonal to the first plane, or at an angle greater to or less than 90 degrees to the first plane.

The dimensional measurements in reference to the profile features (e.g., length, width, height, diameter, and the like) described herein refer to an average dimensional measurement of profile features in 1 square centimeter in the optical element.

The dimension (e.g., length, width, height, diameter, depending upon the shape of the profile feature) of each profile feature can be within the nanometer to micrometer range. A textured surface can have a profile feature and/or flat area with a dimension of about 10 nanometers to about 500 micrometers. The profile feature can have dimensions in the nanometer range, e.g., from about 10 nanometers to about 1000 nanometers. All of the dimensions of the profile feature (e.g., length, width, height, diameter, depending on the geometry) can be in the nanometer range, e.g., from about 10 nanometers to about 1000 nanometers. The textured surface can have a plurality of profile features having dimensions that are 1 micrometer or less. In this context, the phrase "plurality of the profile features" is meant to mean that about 50 percent or more, about 60 percent or more, about 70 percent or more, about 80 percent or more, about 90 percent or more, or about 99 percent or more of the profile features have a dimension in this range. The profile features can have a ratio of width:height and/or length:height dimensions of about 1:2 and 1:100, or 1:5 and 1:50, or 1:5 and 1:10.

The textured surface can have a profile feature and/or flat area with a dimension within the micrometer range of dimensions. A textured surface can have a profile feature and/or flat area with a dimension of about 1 micrometer to about 500 micrometers. All of the dimensions of the profile feature (e.g., length, width, height, diameter, depending on the geometry) can be in the micrometer range, e.g., from about 1 micrometer to about 500 micrometers. The textured surface can have a plurality of profile features having dimensions that are from about 1 micrometer to about 500 micrometer. In this context, the phrase "plurality of the profile features" is meant to mean that about 50 percent or more, about 60 percent or more, about 70 percent or more, about 80 percent or more, about 90 percent or more, or about 99 percent or more of the profile features have a dimension in this range. The height of the profile features (or depth if depressions) can be about 0.1 and 50 micrometers, about 1 to 5 micrometers, or 2 to 3 micrometers. The profile features can have a ratio of width:height and/or length:height dimensions of about 1:2 and 1:100, or 1:5 and 1:50, or 1:5 and 1:10.

A textured surface can have a plurality of profile features having a mixture of size dimensions within the nanometer to micrometer range (e.g., a portion of the profile features are on the nanometer scale and a portion of the profile features are on the micrometer scale). A textured surface can have a plurality of profile features having a mixture of dimensional ratios. The textured surface can have a profile feature having one or more nanometer-scale projections or depressions on a micrometer-scale projection or depression.

The profile feature can have height and width dimensions that are within a factor of three of each other ($0.33w \leq h \leq 3w$ where w is the width and h is the height of the profile feature) and/or height and length dimensions that are within a factor of three of each other ($0.33l \leq h \leq 3l$ where l is the length and h is the height of the profile feature). The profile feature can have a ratio of length:width that is from about 1:3 to about 3:1, or about 1:2 to about 2:1, or about 1:1.5 to about 1.5:1, or about 1:1.2 to about 1.2:1, or about 1:1. The width and length of the profile features can be substantially the same or different.

In another aspect, the textured surface can have a profile feature and/or flat area with at least one dimension in the mid-micrometer range and higher (e.g., greater than 500 micrometers). The profile feature can have at least one dimension (e.g., the largest dimension such as length, width, height, diameter, and the like depending upon the geometry or shape of the profile feature) of greater than 500 micrometers, greater than 600 micrometers, greater than 700 micrometers, greater than 800 micrometers, greater than 900 micrometers, greater than 1000 micrometers, greater than 2 millimeters, greater than 10 millimeters, or more. For example, the largest dimension of the profile feature can range from about 600 micrometers to about 2000 micrometers, or about 650 micrometers to about 1500 micrometers, or about 700 micrometers to about 1000 micrometers. At least one or more of the dimensions of the profile feature (e.g., length, width, height, diameter, depending on the geometry) can be in the micrometer range, while one or more of the other dimensions can be in the nanometer to micrometer range (e.g., less than 500 micrometers, less than 100 micrometers, less than 10 micrometers, or less than 1 micrometer). The textured surface can have a plurality of profile features having at least one dimension that is in the mid-micrometer or more range (e.g., 500 micrometers or more). In this context, the phrase "plurality of the profile features" is meant to mean that about 50 percent or more, about 60 percent or more, about 70 percent or more, about 80 percent or more, about 90 percent or more, or about 99 percent or more of the profile features have at least one dimension that is greater than 500 micrometers. In particular, at least one of the length and width of the profile feature is greater than 500 micrometers or both the length and the width of the profile feature is greater than 500 micrometers. In another example, the diameter of the profile feature is greater than 500 micrometers. In another example, when the profile feature is an irregular shape, the longest dimension is greater than 500 micrometers.

In aspects, the height of the profile features can be greater than 50 micrometers. In this context, the phrase "plurality of the profile features" is meant to mean that about 50 percent or more, about 60 percent or more, about 70 percent or more, about 80 percent or more, about 90 percent or more, or about 99 percent or more of the profile features have at height that is greater than 50 micrometers. The height of the profile feature can be 50 micrometers, about 60 micrometers, about 70 micrometers, about 80 micrometers, about 90 micrometers, or about 100 micrometers to about 60 micrometers, about 70 micrometers, about 80 micrometers, about 90 micrometers, about 100 micrometers, about 150 micrometers, about 250 micrometers, about 500 micrometers or more. For example, the ranges can include 50 micrometers to 500 micrometers, about 60 micrometers to 250 micrometers, about 60 micrometers to about 150 micrometers, and the like. One or more of the other dimensions (e.g., length, width, diameter, or the like) can be in the nanometer to micrometer range (e.g., less than 500 micrometers, less than 100 micrometers, less than 10 micrometers, or less than 1 micrometer). In particular, at least one of the length and width of the profile feature is less than 500 micrometers or both the length and the width of the profile feature is less than 500 micrometers, while the height is greater than 50 micrometers. One or more of the other dimensions (e.g., length, width, diameter, or the like) can be in the micrometer to millimeter range (e.g., greater than 500 micrometers to 10 millimeters).

The dimension (e.g., length, width, height, diameter, depending upon the shape of the profile feature) of each profile feature can be within the nanometer to micrometer range. The textured surface can have a profile feature and/or flat area with a dimension of about 10 nanometers to about 500 micrometers or higher (e.g., about 1 millimeter, about 2 millimeters, about 5 millimeters, or about 10 millimeters). At least one of the dimensions of the profile feature (e.g., length, width, height, diameter, depending on the geometry) can be in the nanometer range (e.g., from about 10 nanometers to about 1000 nanometers), while at least one other dimension (e.g., length, width, height, diameter, depending on the geometry) can be in the micrometer range (e.g., 5 micrometers to 500 micrometers or more (e.g., about 1 to 10 millimeters)). The textured surface can have a plurality of profile features having at least one dimension in the nanometer range (e.g., about 10 to 1000 nanometers) and the other in the micrometer range (e.g., 5 micrometers to 500 micrometers or more). In this context, the phrase "plurality of the profile features" is meant to mean that about 50 percent or more, about 60 percent or more, about 70 percent or more, about 80 percent or more, about 90 percent or more, or about 99 percent or more of the profile features have at least one dimension in the nanometer range and at least one dimension in the micrometer range. In particular, at least one of the length and width of the profile feature is in the nanometer range, while the other of the length and the width of the profile feature is in the micrometer range.

In aspects, the height of the profile features can be greater than 250 nanometers. In this context, the phrase "plurality of the profile features" is meant to mean that about 50 percent or more, about 60 percent or more, about 70 percent or more, about 80 percent or more, about 90 percent or more, or about 99 percent or more of the profile features have at height that is greater than 250 nanometers. The height of the profile feature can be 250 nanometers, about 300 nanometers, about 400 nanometers, or about 500 nanometers, to about 300 nanometers, about 400 nanometers, about 500 nanometers, or about 1000 nanometers or more. For example, the range can be 250 nanometers to about 1000 nanometers, about 300 nanometers to 500 nanometers, about 400 nanometers to about 1000 nanometers, and the like. One or more of the other dimensions (e.g., length, width, diameter, or the like) can be in the micrometer to millimeter range (e.g., greater than 500 micrometers to 10 millimeters). In particular, at least one of the length and width of the profile feature is in the nanometer range (e.g., about 10 to 1000 nanometers) and the other in the micrometer range (e.g., 5 micrometers to 500 micrometers or more), while the height is greater than 250 nanometers.

The profile features can have a certain spatial arrangement. The spatial arrangement of the profile features may be uniform, such as spaced evenly apart or forming a pattern. The spatial arrangement can be random. Adjacent profile features can be about 10 to 500 nanometers apart, about 100 to 1000 nanometers apart, about 1 to 100 micrometers apart or about 5 to 100 micrometers apart. Adjacent profile features can overlap one another or be adjacent one another so little or no flat regions are positioned there between. The desired spacing can depend, at least in part, on the size and/or shape of the profile structures and the desired structural color and/or color shift.

The profile features can have a certain cross-sectional shape (with respect to a plane parallel the first plane). The textured surface can have a plurality of profile features having the same or similar cross-sectional shape. The textured surface has a plurality of profile features having a mixture of different cross-sectional shapes. The cross-sectional shapes of the profile features can include polygonal (e.g., square or triangle or rectangle cross section), circular, semi-circular, tubular, oval, random, high and low aspect ratios, overlapping profile features, and the like.

The profile feature (e.g., about 10 nanometers to 500 micrometers) can include an upper, flat surface. The profile feature (e.g., about 10 nanometers to 500 micrometers) can include an upper, concavely curved surface. The concave curved surface may extend symmetrically either side of an uppermost point. The concave curved surface may extend symmetrically across only 50 percent of the uppermost point. The profile feature (e.g., about 10 nanometers to 500 micrometers) can include an upper, convexly curved surface. The curved surface may extend symmetrically either side of an uppermost point. The curved surface may extend symmetrically across only 50 percent of the uppermost point.

The profile feature can include protrusions from the textured surface. The profile feature can include indents (hollow areas) formed in the textured surface. The profile feature can have a smooth, curved shape (e.g., a polygonal cross-section with curved corners).

The profile features (whether protrusions or depressions) can be approximately conical or frusto-conical (i.e. the projections or indents may have horizontally or diagonally flattened tops) or have an approximately part-spherical surface (e.g., a convex or concave surface respectively having a substantially even radius of curvature).

The profile features may have one or more sides or edges that extend in a direction that forms an angle to the first plane of the textured surface. The angle between the first plane and a side or edge of the profile feature is about 45 degrees or less, about 30 degrees or less, about 25 degrees or less, or about 20 degrees or less. The one or more sides or edges may extend in a linear or planar orientation, or may be curved so that the angle changes as a function of distance from the first plane. The profile features may have one or more sides that include step(s) and/or flat side(s). The profile feature can have one or more sides (or portions thereof) that can be orthogonal or perpendicular to the first plane of the textured surface, or extend at an angle of about 10 degrees to 89 degrees to the first plane (90 degrees being perpendicular or orthogonal to the first plane)). The profile feature can have a side with a stepped configuration, where portions of the side can be parallel to the first plane of the textured surface or have an angle of about 1 degrees to 179 degrees (0 degrees being parallel to the first plane)).

The textured surface can have profile features with varying shapes (e.g., the profile features can vary in shape, height, width and length among the profile features) or profile features with substantially uniform shapes and/or dimensions. The structural color and/or color shift produced by the textured surface can be determined, at least in part, by the shape, dimensions, spacing, and the like, of the profile features.

The profile features can be shaped so as to result in a portion of the surface (e.g., about 25 to 50 percent or more) being about normal to the incoming light when the light is incident at the normal to the first plane of the textured surface. The profile features can be shaped so as to result in a portion of the surface (e.g., about 25 to 50 percent or more) being about normal to the incoming light when the light is incident at an angle of up to 45 degrees to the first plane of the textured surface.

The spatial orientation of the profile features on the textured surface can be used to produce the structural color or to effect the degree to which the structural color shifts at different viewing angles. The spatial orientation of the profile features on the textured surface can be random, a semi-random pattern, or in a set pattern. A set pattern of profile features is a known set up or configuration of profile features in a certain area (e.g., about 50 nanometers squared to about 10 millimeters squared depending upon the dimensions of the profile features (e.g., any increment between about 50 nanometers and about 10 millimeters is included)). A semi-random pattern of profile features is a known set up of profile features in a certain area (e.g., about 50 nanometers squared to 10 millimeters squared) with some deviation (e.g., 1 to 15% deviation from the set pattern), while random profile features are present in the area but the pattern of profile features is discernable. A random spatial orientation of the profile features in an area produces no discernable pattern in a certain area, (e.g., about 50 nanometers squared to 10 millimeters squared).

The spatial orientation of the profile features can be periodic (e.g., full or partial) or non-periodic. A periodic spatial orientation of the profile features is a recurring pattern at intervals. The periodicity of the periodic spatial orientation of the profile features can depend upon the dimensions of the profile features but generally are periodic from about 50 nanometers to 100 micrometers. For example, when the dimensions of the profile features are submicron (e.g., less than about 1 micron, about 0.9 microns, about 0.8 microns, or about 0.75 microns), the periodicity of the periodic spatial orientation of the profile features can be in the 50 to 500 nanometer range or 100 to 1000 nanometer range. In another example, when the dimensions of the profile features are at the micron level (e.g., greater than about 1 micron, about 0.9 microns, about 0.8 microns, or about 0.75 microns), the periodicity of the periodic spatial orientation of the profile features can be in the 10 to 500 micrometer range or 10 to 1000 micrometer range. Full periodic pattern of profile features indicates that the entire pattern exhibits periodicity, whereas partial periodicity indicates that less than all of the pattern exhibits periodicity (e.g., about 70-99 percent of the periodicity is retained). A non-periodic spatial orientation of profile features is not periodic and does not show periodicity based on the dimensions of the profile features, in particular, no periodicity in the 50 to 500 nanometer range or 100 to 1000 nanometer range where the dimensions are of the profile features are submicron or no periodicity in the 10 to 500 micrometer range or 10 to 1000 micrometer range where the dimensions are of the profile features are in the micron range.

In an aspect, the spatial orientation of the profile features on the textured surface can be set to reduce distortion effects, e.g., caused by the interference of one profile feature with another in regard to the structural color and/or color shift of the article. Since the shape, dimension, relative orientation of the profile features can vary considerably across the textured surface, the desired spacing and/or relative positioning for a particular area (e.g., in the micrometer range or about 1 to 10 square micrometers) having profile features can be appropriately determined. As discussed herein, the shape, dimension, relative orientation of the profile features affect the contours of the reflective layer(s) and/or constituent layer(s), as well as the dimensions (e.g., thickness), index of refraction, the one or more layers in the optical element (e.g., reflective layer(s) and constituent layer(s)) can be considered when designing the textured side of the texture layer.

The profile features are located in nearly random positions relative to one another across a specific area of the textured surface (e.g., in the micrometer range or about 1 to 10 square micrometers to centimeter range or about 0.5 to 5 square centimeters, and all range increments therein), where the randomness does not defeat the purpose of producing the structural color and/or color shift. In other words, the randomness is consistent with the spacing, shape, dimension, and relative orientation of the profile features, the dimensions (e.g., thickness), index of refraction, and number of layers (e.g., the reflective layer(s), the constituent layer(s), and the like, with the goal to achieve the structural color and/or color shift.

The profile features are positioned in a set manner relative to one another across a specific area of the textured surface to achieve the purpose of producing the structural color and/or color shift. The relative positions of the profile features do not necessarily follow a pattern, but can follow a pattern consistent with the desired structural color and/or color shift. As mentioned above and herein, various parameters related to the profile features, flat areas, and reflective layer(s) and/or the constituent layer can be used to position the profile features in a set manner relative to one another.

The textured surface can include micro and/or nanoscale profile features that can form gratings (e.g., a diffractive grating), photonic crystal structure, a selective mirror structure, crystal fiber structures, deformed matrix structures, spiraled coiled structures, surface grating structures, and combinations thereof. The textured surface can include micro and/or nanoscale profile features that form a grating having a periodic or non-periodic design structure to impart the structural color and/or color shift. The micro and/or nanoscale profile features can have a peak-valley pattern of profile features and/or flat areas to produce the desired structural color and/or color shift. The grading can be an Echelette grating.

Figure 2A:
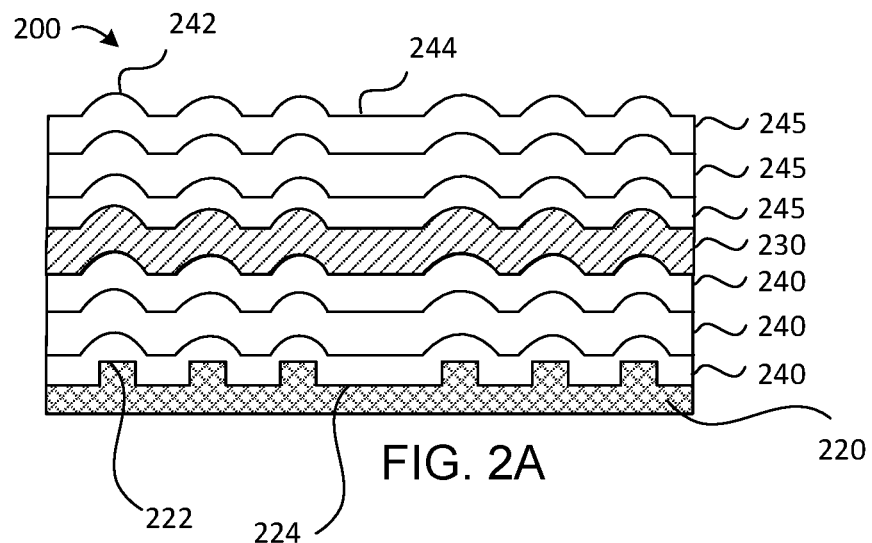
FIG. 2A illustrates a side view of exemplary optical element of the present disclosure.

The profile features and the flat areas of the textured surface in the optical element can appear as topographical undulations in each layer (e.g., reflective layer(s) and/or the constituent layer(s)). For example, referring to FIG. 2A, an optical element 200 includes a textured structure 220 having a plurality of profile features 222 and flat areas 224. As described herein, one or more of the profile features 222 can be projections from a surface of the textured structure 220, and/or one or more of the profile features can be depressions in a surface of the textured structure 220 (not shown). One or more constituent layers 240 are disposed on the textured structure 220 and then a reflective layer 230 and one or more constituent layers 245 are disposed on the preceding layers. In some embodiments, the resulting topography of the textured structure 220 and the one or more constituent layers 240 and 245 and the reflective layer 230 are not identical, but rather, the one or more constituent layers 240 and 245 and the reflective layer 230 can have elevated or depressed regions 242 which are either elevated or depressed relative to the height of the planar regions 244 and which roughly correspond to the location of the profile features 222 of the textured structure 220. The one or more constituent layers 240 and 245 and the reflective layer 230 have planar regions 244 that roughly correspond to the location of the flat areas 224 of the textured structure 220. Due to the presence of the elevated or depressed regions 242 and the planar regions 244, the resultant overall topography of the one or more constituent layers 240 and 245 and the reflective layer 230 can be that of an undulating or wave-like structure. The dimension, shape, and spacing of the profile features along with the number of layers of the constituent layer, the reflective layer, the thickness of each of the layers, refractive index of each layer, and the type of material, can be used to produce an optical element which results in a particular structural color and/or color shift.

While the textured surface can produce the structural color in some embodiments, or can affect the degree to which the structural color shifts at different viewing angles, in other embodiments, a "textured surface" or surface with texture may not produce the structural color, or may not affect the degree to which the structural color shifts at different viewing angles. The structural color can be produced by the design of the optical element with or without the textured surface. As a result, the optical element can include the textured surface having profile elements of dimensions in the nanometer to millimeter range, but the structural color or the shifting of the structural color is not attributable to the presence or absence of the textured surface. In other words, the optical element imparts the same structural color where or not the textured surface is present. The design of the textured surface can be configured to not affect the structural color imparted by the optical element, or not affect the shifting of the structural color imparted by the optical element. The shape of the profile features, dimensions of the shapes, the spatial orientation of the profile features relative to one another, and the like can be selected so that the textured surface does not affect the structural color attributable to the optical element.

The structural color (e.g., achromatic structural color or chromatic structural color) imparted by a first optical element and a second optical element, where the only difference between the first and second optical element is that the first optical element includes the textured surface, can be compared. A color measurement can be performed for each of the first and second optical element at the same relative angle, where a comparison of the color measurements can determine what, if any, change is correlated to the presence of the textured surface. For example, at a first observation angle the structural color is a first structural color for the first optical element and at first observation angle and the structural color is a second structural color for the second optical element. The first color measurement can be obtained and has coordinates $L_1^*$ and $a_1^*$ and $b_{1*}$, while a second color measurement can be obtained and has coordinates $L_2^*$ and $a_2^*$ and $b_2^*$ can be obtained, according to the CIE 1976 color space under a given illumination condition.

When $\Delta E^*_{ab}$ between the first color measurement and the second color measurement is less than or equal to about 2.2 or is less than or equal to about 3, the first structural color associated with the first color measurement and the second structural color associated with the second color measurement are the same or not perceptibly different to an average observer (e.g., the textured surface does not cause or change the structural color by more than 20 percent, 10 percent, or 5 percent). When $\Delta E^*_{ab}$ between the first color measurement and the second color measurement is greater than 3 or optionally greater than about 4 or 5, the first structural color associated with the first color measurement and the second structural color associated with the second color measurement are different or perceptibly different to an average observer (e.g., the textured surface does cause or change the structural color by more than 20 percent, 10 percent, or 5 percent).

In another approach, when the percent difference between one or more of values $L_1^*$ and $L_{2*}$, $a_1^*$ and $a_2^*$, and $b_1^*$ and $b_2^*$ is less than 20 percent, the first structural color associated with the first color measurement and the second structural color associated with the second color measurement are the same or not perceptibly different to an average observer (e.g., the textured surface does not cause or change the structural color by less than 20 percent, 10 percent, or 5 percent). When the percent difference between one or more of values $L_1^*$ and $L_2^*$, $a_1^*$ and $a_2^*$, and $b_1^*$ and $b_2^*$ is greater than 20 percent, the first structural color associated with the first color measurement and the second structural color associated with the second color measurement are different or perceptibly different to an average observer (e.g., the textured surface does cause or change the structural color by more than 20 percent, 10 percent, or 5 percent).

In another case, the structural color imparted by a first optical element and a second optical element, where the only difference between the first and second optical element is that the first optical element includes the textured surface, can be compared at different angles of incident light upon the optical element or different observation angles. A color measurement can be performed for each of the first and second optical element at different angles (e.g., angle between −15 degrees and +180 degrees or between −15 degrees and +60 degrees and which are at least 15 degrees apart from each other), where a comparison of the color measurements can determine what, if any, change is correlated to the presence of the textured surface at different angles. For example, at a first observation angle the structural color is a first structural color for the first optical element and at second observation angle the structural color is a second structural color for the second optical element. The first color measurement can be obtained and has coordinates $L_1^*$ and $a_1^*$ and $b_{1*}$, while a second color measurement can be obtained and has coordinates $L_2^*$ and $a_2^*$ and $b_2^*$ can be obtained, according to the CIE 1976 color space under a given illumination condition.

When $\Delta E^*_{ab}$ between the first color measurement and the second color measurement is less than or equal to about 2.2 or is less than or equal to about 3, the first structural color associated with the first color measurement and the second structural color associated with the second color measurement are the same or not perceptibly different to an average observer (e.g., the textured surface does not cause or change the structural color based on different angles of incident light upon the optical element or different observation angles). When $\Delta E^*_{ab}$ between the first color measurement and the second color measurement is greater than 3 or optionally greater than about 4 or 5, the first structural color associated with the first color measurement and the second structural color associated with the second color measurement are different or perceptibly different to an average observer (e.g., the textured surface does cause or change the structural color at different angles of incident light upon the optical element or different observation angles).

In another approach, when the percent difference between one or more of values $L_1^*$ and $L_2^*$ $a_1^*$ and $a_2^*$, and $b_1^*$ and $b_2^*$ is less than 20 percent, the first structural color associated with the first color measurement and the second structural color associated with the second color measurement are the same or not perceptibly different to an average observer (e.g., the textured surface does not cause or change the structural color by more than 20 percent, 10 percent, or 5 percent at different angles of incident light upon the optical element or different observation angles). When the percent difference between one or more of values $L_1^*$ and $L_2^*$ $a_1^*$ and $a_{2*}$, and $b_1^*$ and $b_2^*$ is greater than 20 percent, the first structural color associated with the first color measurement and the second structural color associated with the second color measurement are different or perceptibly different to an average observer (e.g., the textured surface does cause or change the structural color by more than 20 percent, 10 percent, or 5 percent at different angles of incident light upon the optical element or different observation angles).

In another embodiment, the structural color can be imparted by the optical element without the textured surface. The surface of the layers of the optical element are substantially flat (or substantially three dimensional flat planar surface) or flat (or three dimensional flat planar surface) at the microscale (e.g., about 1 to 500 micrometers) and/or nanoscale (e.g., about 50 to 500 nanometers). In regard to substantially flat (or substantially three dimensional flat planar surface) can include some minor topographical features (e.g., nanoscale and/or microscale) such as those that might be caused due to unintentional imperfections, slight undulations that are unintentional, other topographical features (e.g., extensions above the plane of the layer or depressions below or into the plane of the layer) caused by the equipment and/or process used and the like that are unintentionally introduced. The topographical features do not resemble profile features of the textured surface. In addition, the substantially flat (or substantially three dimensional flat planar surface) or flat (or three dimensional flat planar surface) may include curvature as the dimensions of the optical element increase, for example about 500 micrometers or more, about 10 millimeter or more, about 10 centimeters or more, depending upon the dimensions of the optical element, as long as the surface is flat or substantially flat and the surface only includes some minor topographical features at the microscale (e.g., about 1 to 500 micrometers) and/or nanoscale (e.g., about 50 to 500 nanometers) dimensions.

In an aspect, the profile features of the textured surface described herein are excluded from is referred to as substantially flat (or substantially three dimensional flat planar surface) or flat (or three dimensional flat planar surface). The area of the substantially three dimensional flat planar surface or a three dimensional flat planar surface can be about 1 centimeter squared to about 5 centimeter squared, about 1 centimeter squared to about 10 centimeter squared, about 1 centimeter squared to about 15 centimeter squared, about 1 centimeter squared to about 20 centimeter squared, about 1 centimeter squared to about 50 centimeter squared, about 1 centimeter squared to about 100 centimeter squared, about 3 centimeter squared to about 10 centimeter squared, about 3 centimeter squared to about 30 centimeter squared, about 3 centimeter squared to about 50 centimeter squared, about 5 centimeter squared to about 20 centimeter squared, about 5 centimeter squared to about 50 centimeter squared, or about 5 centimeter squared to about 100 centimeter squared.

Figure 2B:
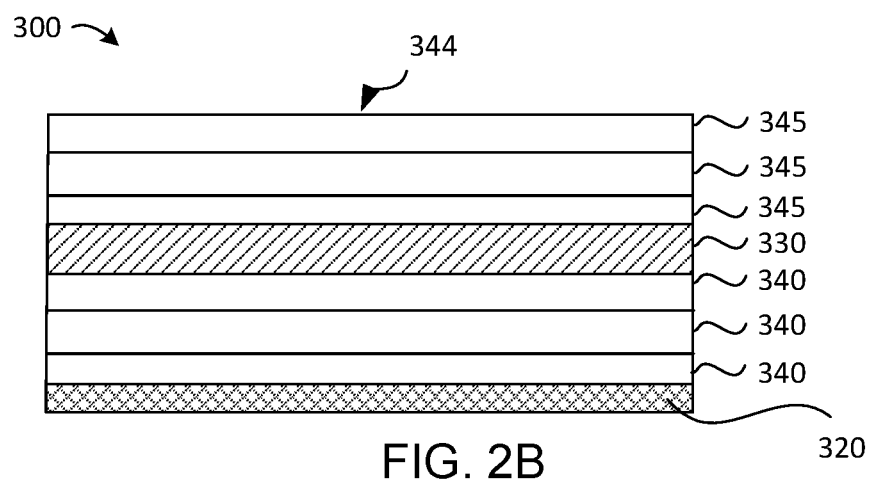
FIG. 2B illustrates a side view of exemplary optical element of the present disclosure.

FIG. 2B is a cross-section illustration of a substantially flat (or substantially three dimensional flat planar surface) or flat (or three dimensional flat planar surface) optical element 300. The optical element 300 includes one or more constituent layers 340 are disposed on the flat or three dimensional flat planar surface structure 320 and then a reflective layer 330 and one or more constituent layers 345 are disposed on the preceding layers. The material that makes up the constituent layers and the reflective layer, number of layers of the constituent layer, the reflective layer, the thickness of each of the layers, refractive index of each layer, and the like, can produce an optical element which results in a particular structural color.

In an aspect, the surface of the article is a textured surface and the optical element is on the textured surface. In the following paragraphs and within the application, reference to "structural color" includes reference to one or both of "achromatic structural color" and/or "chromatic structural color." A hue of the structural color, an intensity of the structural color, a viewing angle at which the structural color is visible, the lightness (e.g., L* of CIE 1976 color space or CIELAB), or any combination thereof, can be altered by the textured surface (or optionally the textured surface does not alter any one or a combination of these), as determined by comparing the optical element comprising the textured surface of a substantially identical optical element (e.g., material used, thickness, and the like) on a surface of a substantially identical article (e.g., material used, design, and the like) which is free of the textured surface.

In an aspect, the surface of the article is a textured surface and the optical element is on the textured surface. The textured surface reduces (e.g., by about 80% to 99%, about 85 to 99%, about 90 to 99%, about 95 to 99%, or about 98 to 99%) or eliminates shift of the structural color as a viewing angle is varied from a first viewing angle to a second viewing angle, as compared to a substantially identical optical element (e.g., material used, thickness, and the like) on a surface of a substantially identical article (e.g., material used, design, and the like) which is free of the texture.

In an aspect, the surface of the article is a textured surface and the optical element is on the textured surface. A hue of the structural color, an intensity of the structural color, a viewing angle at which the structural color is visible, or any combination thereof, is unaffected by or substantially unaffected (e.g., affected by about 1% or less, about 0.1 to 2%, about 0.1 to 3%, about 0.1 to 5%, or about 0.1 to 7.5%) by the textured surface, as determined by comparing the optical element comprising the textured surface to a substantially identical optical element (e.g., material used, thickness, and the like) on a surface of a substantially identical article (e.g., material used, design, and the like) which is free of the textured surface.

In an aspect, the surface of the article is a textured surface and the optical element is on the textured surface. The shift of the structural color is unaltered by or substantially the same (e.g., by about 80% to 99%, about 85 to 99%, about 90 to 99%, about 95 to 99%, or about 98 to 99% the same) as a viewing angle is varied from a first viewing angle to a second viewing angle, as compared to a substantially identical optical element (e.g., material used, thickness, and the like) on a surface of a substantially identical article (e.g., material used, design, and the like) which is free of the textured surface.

In an aspect, the textured surface includes a plurality of profile features and flat planar areas, where the profile features extend above the flat areas of the textured surface. The dimensions of the profile features, a shape of the profile features, a spacing among the plurality of the profile features, or any combination thereof, in combination with the optical element, affect a hue of the structural color, an intensity of the structural color, a viewing angle at which the structural color is visible, shift of the structural color as a viewing angle is varied from a first viewing angle to a second viewing angle, or any combination thereof.

In an aspect, a hue of the structural color, an intensity of the structural color, a viewing angle at which the structural color is visible, shift of the structural color as a viewing angle is varied from a first viewing angle to a second viewing angle, or any combination thereof, are unaffected or substantially unaffected (e.g., affected by about 1% or less, about 0.1 to 2%, about 0.1 to 3%, about 0.1 to 5%, or about 0.1 to 7.5%) by dimensions of the profile features, a shape of the profile features, a spacing among the plurality of the profile features, or any combination thereof, of the textured surface.

In an aspect, the profile features of the textured surface are in random positions relative to one another within a specific area. The spacing between the profile features, in combination with the optical element, affects a hue of the structural color, an intensity of the structural color, a viewing angle at which the structural color is visible, shift of the structural color as a viewing angle is varied from a first viewing angle to a second viewing angle, or any combination thereof.

In an aspect, a hue of the structural color, an intensity of the structural color, a viewing angle at which the structural color is visible, shift of the structural color as a viewing angle is varied from a first viewing angle to a second viewing angle, or any combination thereof, is unaffected by, or substantially unaffected (e.g., affected by about 1% or less, about 0.1 to 2%, about 0.1 to 3%, about 0.1 to 5%, or about 0.1 to 7.5%) by, spacing between the profile features in combination with the optical element.

In an aspect, the profile features and the flat areas result in at least one layer of the optical element having an undulating topography across the textured surface and where there is a planar region between neighboring profile features that is planar with the flat planar areas of the textured surface.

In an aspect, the dimensions of the planar region relative to the profile features affect a hue of the structural color, an intensity of the structural color, a viewing angle at which the structural color is visible, shift of the structural color as a viewing angle is varied from a first viewing angle to a second viewing angle, or any combination thereof.

In an aspect, a hue of the structural color, an intensity of the structural color, a viewing angle at which the structural color is visible, shift of the structural color as a viewing angle is varied from a first viewing angle to a second viewing angle, or any combination thereof, is unaffected by or substantially unaffected (e.g., affected by about 1% or less, about 0.1 to 2%, about 0.1 to 3%, about 0.1 to 5%, or about 0.1 to 7.5%) by dimensions of the planar region relative to the profile features.

In an aspect, the profile features and the flat areas result in each layer of the optical element having an undulating topography across the textured surface. The undulating topography of the optical element affects a hue of the structural color, an intensity of the structural color, a viewing angle at which the structural color is visible, shift of the structural color as a viewing angle is varied from a first viewing angle to a second viewing angle, or any combination thereof. A hue of the structural color, an intensity of the structural color, a viewing angle at which the structural color is visible, shift of the structural color as a viewing angle is varied from a first viewing angle to a second viewing angle, or any combination thereof, is unaffected by or substantially unaffected (e.g., affected by about 1% or less, about 0.1 to 2%, about 0.1 to 3%, about 0.1 to 5%, or about 0.1 to 7.5%) by the undulating topography of the optical element.

In an aspect, the surface of the article is a textured surface and the optical element is on the textured surface. A hue of the chromatic structural color, an intensity of the chromatic structural color, a viewing angle at which the chromatic structural color is visible, or any combination thereof, is unaffected by or substantially unaffected (e.g., affected by about 1% or less, about 0.1 to 2%, about 0.1 to 3%, about 0.1 to 5%, or about 0.1 to 7.5%) by the textured surface, as determined by comparing the optical element comprising the textured surface to a substantially identical optical element (e.g., material used, thickness, and the like) on a surface of a substantially identical article (e.g., material used, design, and the like) which is free of the textured surface.

In an aspect, the surface of the article is a textured surface and the optical element is on the textured surface. The shift of the structural color (e.g., chromatic structural to achromatic structural color and/or between chromatic structural colors or between achromatic structural colors) is unaltered by or substantially the same (e.g., by about 80% to 99%, about 85 to 99%, about 90 to 99%, about 95 to 99%, or about 98 to 99% the same) as a viewing angle is varied from a first viewing angle to a second viewing angle, as compared to a substantially identical optical element (e.g., material used, thickness, and the like) on a surface of a substantially identical article (e.g., material used, design, and the like) which is free of the textured surface.

In an aspect, the textured surface includes a plurality of profile features and flat planar areas, where the profile features extend above the flat areas of the textured surface. The dimensions of the profile features, a shape of the profile features, a spacing among the plurality of the profile features, or any combination thereof, in combination with the optical element, affect a hue of the chromatic structural color, an intensity of the chromatic structural color, a viewing angle at which the chromatic structural color is visible, shift of the chromatic structural color as a viewing angle is varied from a first viewing angle to a second viewing angle, or any combination thereof.

In an aspect, a hue of the chromatic structural color, an intensity of the chromatic structural color, a viewing angle at which the chromatic structural color is visible, shift of the chromatic structural color as a viewing angle is varied from a first viewing angle to a second viewing angle, or any combination thereof, are unaffected or substantially unaffected (e.g., affected by about 1% or less, about 0.1 to 2%, about 0.1 to 3%, about 0.1 to 5%, or about 0.1 to 7.5%) by dimensions of the profile features, a shape of the profile features, a spacing among the plurality of the profile features, or any combination thereof, of the textured surface.

In an aspect, the profile features of the textured surface are in random positions relative to one another within a specific area. The spacing between the profile features, in combination with the optical element, affects a hue of the chromatic structural color, an intensity of the chromatic structural color, a viewing angle at which the chromatic structural color is visible, shift of the chromatic structural color as a viewing angle is varied from a first viewing angle to a second viewing angle, or any combination thereof.

In an aspect, a hue of the chromatic structural color, an intensity of the chromatic structural color, a viewing angle at which the chromatic structural color is visible, shift of the chromatic structural color as a viewing angle is varied from a first viewing angle to a second viewing angle, or any combination thereof, is unaffected by, or substantially unaffected (e.g., affected by about 1% or less, about 0.1 to 2%, about 0.1 to 3%, about 0.1 to 5%, or about 0.1 to 7.5%) by, spacing between the profile features in combination with the optical element.

In an aspect, the profile features and the flat areas result in at least one layer of the optical element having an undulating topography across the textured surface and where there is a planar region between neighboring profile features that is planar with the flat planar areas of the textured surface.

In an aspect, the dimensions of the planar region relative to the profile features affect a hue of the chromatic structural color, an intensity of the chromatic structural color, a viewing angle at which the chromatic structural color is visible, shift of the chromatic structural color as a viewing angle is varied from a first viewing angle to a second viewing angle, or any combination thereof.

In an aspect, a hue of the chromatic structural color, an intensity of the chromatic structural color, a viewing angle at which the chromatic structural color is visible, shift of the chromatic structural color as a viewing angle is varied from a first viewing angle to a second viewing angle, or any combination thereof, is unaffected by or substantially unaffected (e.g., affected by about 1% or less, about 0.1 to 2%, about 0.1 to 3%, about 0.1 to 5%, or about 0.1 to 7.5%) by dimensions of the planar region relative to the profile features.

In an aspect, the profile features and the flat areas result in each layer of the optical element having an undulating topography across the textured surface. The undulating topography of the optical element affects a hue of the chromatic structural color, an intensity of the chromatic structural color, a viewing angle at which the chromatic structural color is visible, shift of the chromatic structural color as a viewing angle is varied from a first viewing angle to a second viewing angle, or any combination thereof. A hue of the chromatic structural color, an intensity of the chromatic structural color, a viewing angle at which the chromatic structural color is visible, shift of the chromatic structural color as a viewing angle is varied from a first viewing angle to a second viewing angle, or any combination thereof, is unaffected by or substantially unaffected (e.g., affected by about 1% or less, about 0.1 to 2%, about 0.1 to 3%, about 0.1 to 5%, or about 0.1 to 7.5%) by the undulating topography of the optical element.

A layer of the optical element further includes a textured surface and the optical element is on the textured surface. The textured surface reduces or eliminates shift of the achromatic structural color as a viewing angle is varied from a first viewing angle to a second viewing angle, as compared to a substantially identical optical element (e.g., material used, thickness, and the like) which is free of the textured surface.

A layer of the optical element further includes a textured surface and the optical element is on the textured surface. Lightness (e.g., L* of CIE 1976 color space or CIELAB) (optionally a hue and/or a chroma), is unaffected by or substantially unaffected (e.g., affected by about 1% or less, about 0.1 to 2%, about 0.1 to 3%, about 0.1 to 5%, or about 0.1 to 7.5%) by the textured surface, as determined by comparing the optical element comprising the textured surface to a substantially identical optical element (e.g., material used, thickness, and the like) which is free of the textured surface.

A layer of the optical element further includes a textured surface and the optical element is on the textured surface. A shift of the achromatic structural color is unaltered by or substantially the same as a viewing angle is varied from a first viewing angle to a second viewing angle, as compared to a substantially identical optical element (e.g., material used, thickness, and the like) which is free of the textured surface.

The surface of the article is a textured surface and the optical element is on the textured surface. Lightness (e.g., L* of CIE 1976 color space or CIELAB) (optionally a hue and/or a chroma) is altered by the textured surface, as determined by comparing the optical element comprising the textured surface of a substantially identical optical element (e.g., material used, thickness, and the like) on a surface of a substantially identical article (e.g., material used, design, and the like) which is free of the textured surface.

The surface of the article is a textured surface and the optical element is on the textured surface. The textured surface reduces (e.g., by about 80% to 99%, about 85 to 99%, about 90 to 99%, about 95 to 99%, or about 98 to 99%) or eliminates shift of the achromatic structural color as a viewing angle is varied from a first viewing angle to a second viewing angle, as compared to a substantially identical optical element (e.g., material used, thickness, and the like) on a surface of a substantially identical article (e.g., material used, design, and the like) which is free of the texture.

The surface of the article is a textured surface and the optical element is on the textured surface. Lightness (e.g., L* of CIE 1976 color space or CIELAB) (optionally a hue and/or a chroma) is unaffected by or substantially unaffected (e.g., affected by about 1% or less, about 0.1 to 2%, about 0.1 to 3%, about 0.1 to 5%, or about 0.1 to 7.5%) by the textured surface, as determined by comparing the optical element comprising the textured surface to a substantially identical optical element (e.g., material used, thickness, and the like) on a surface of a substantially identical article (e.g., material used, design, and the like) which is free of the textured surface.

The surface of the article is a textured surface and the optical element is on the textured surface. The shift of the achromatic structural color is unaltered by or substantially the same (e.g., by about 80% to 99%, about 85 to 99%, about 90 to 99%, about 95 to 99%, or about 98 to 99% the same) as a viewing angle is varied from a first viewing angle to a second viewing angle, as compared to a substantially identical optical element (e.g., material used, thickness, and the like) on a surface of a substantially identical article (e.g., material used, design, and the like) which is free of the textured surface.

The textured surface includes a plurality of profile features and flat planar areas, where the profile features extend above the flat areas of the textured surface. The dimensions of the profile features, a shape of the profile features, a spacing among the plurality of the profile features, or any combination thereof, in combination with the optical element, affect lightness (e.g., L* of CIE 1976 color space or CIELAB) (optionally a hue and/or a chroma) or a shift of the achromatic structural color as a viewing angle is varied from a first viewing angle to a second viewing angle, or any combination thereof.

Lightness (e.g., L* of CIE 1976 color space or CIELAB) (optionally a hue and/or a chroma) or a shift of the structural color as a viewing angle is varied from a first viewing angle to a second viewing angle, or any combination thereof, are unaffected or substantially unaffected (e.g., affected by about 1% or less, about 0.1 to 2%, about 0.1 to 3%, about 0.1 to 5%, or about 0.1 to 7.5%) by dimensions of the profile features, a shape of the profile features, a spacing among the plurality of the profile features, or any combination thereof, of the textured surface.

The profile features of the textured surface are in random positions relative to one another within a specific area. The spacing between the profile features, in combination with the optical element, affects lightness (e.g., L* of CIE 1976 color space or CIELAB) (optionally a hue and/or a chroma) or a shift of the structural color as a viewing angle is varied from a first viewing angle to a second viewing angle, or any combination thereof.

Lightness (e.g., L* of CIE 1976 color space or CIELAB) (optionally a hue and/or a chroma) or a shift of the achromatic structural color as a viewing angle is varied from a first viewing angle to a second viewing angle, or any combination thereof, is unaffected by, or substantially unaffected (e.g., affected by about 1% or less, about 0.1 to 2%, about 0.1 to 3%, about 0.1 to 5%, or about 0.1 to 7.5%) by, spacing between the profile features in combination with the optical element.

The profile features and the flat areas result in at least one layer of the optical element having an undulating topography across the textured surface and where there is a planar region between neighboring profile features that is planar with the flat planar areas of the textured surface.

The dimensions of the planar region relative to the profile features affect lightness (e.g., L* of CIE 1976 color space or CIELAB) (optionally a hue and/or a chroma) or a shift of the structural color as a viewing angle is varied from a first viewing angle to a second viewing angle, or any combination thereof.

Lightness (e.g., L* of CIE 1976 color space or CIELAB) (optionally a hue and/or a chroma) or a shift of the achromatic structural color as a viewing angle is varied from a first viewing angle to a second viewing angle, or any combination thereof, is unaffected by or substantially unaffected (e.g., affected by about 1% or less, about 0.1 to 2%, about 0.1 to 3%, about 0.1 to 5%, or about 0.1 to 7.5%) by dimensions of the planar region relative to the profile features.

The profile features and the flat areas result in each layer of the optical element having an undulating topography across the textured surface. The undulating topography of the optical element affects lightness (e.g., L* of CIE 1976 color space or CIELAB) (optionally a hue and/or a chroma) or a shift of the achromatic structural color as a viewing angle is varied from a first viewing angle to a second viewing angle, or any combination thereof. Lightness (e.g., L* of CIE 1976 color space or CIELAB) (optionally a hue and/or a chroma) or a shift of the achromatic structural color as a viewing angle is varied from a first viewing angle to a second viewing angle, or any combination thereof, is unaffected by or substantially unaffected (e.g., affected by about 1% or less, about 0.1 to 2%, about 0.1 to 3%, about 0.1 to 5%, or about 0.1 to 7.5%) by the undulating topography of the optical element.

Additional details are provided regarding the polymeric materials referenced herein for example, the polymers described in reference to the article, components of the article, structures, layers, films, bladders, foams, primer layer, coating, and like the. The polymeric material includes at least one polymer. The polymer can be a thermoset polymer or a thermoplastic polymer. The polymer can be an elastomeric polymer, including an elastomeric thermoset polymer or an elastomeric thermoplastic polymer. The polymer can be selected from: polyurethanes (including elastomeric polyurethanes, thermoplastic polyurethanes (TPUs), and elastomeric TPUs), polyesters, polyethers, polyamides, vinyl polymers (e.g., copolymers of vinyl alcohol, vinyl esters, ethylene, acrylates, methacrylates, styrene, and so on), polyacrylonitriles, polyphenylene ethers, polycarbonates, polyureas, polystyrenes, co-polymers thereof (including polyester-polyurethanes, polyether-polyurethanes, polycarbonate-polyurethanes, polyether block polyamides (PEBAs), and styrene block copolymers), and any combination thereof, as described herein. The polymer can include one or more polymers selected from the group consisting of polyesters, polyethers, polyamides, polyurethanes, polyolefins copolymers of each, and combinations thereof.

The term "polymer" refers to a chemical compound formed of a plurality of repeating structural units referred to as monomers. Polymers often are formed by a polymerization reaction in which the plurality of structural units become covalently bonded together. When the monomer units forming the polymer all have the same chemical structure, the polymer is a homopolymer. When the polymer includes two or more monomer units having different chemical structures, the polymer is a copolymer. One example of a type of copolymer is a terpolymer, which includes three different types of monomer units. The co-polymer can include two or more different monomers randomly distributed in the polymer (e.g., a random co-polymer). Alternatively, one or more blocks containing a plurality of a first type of monomer can be bonded to one or more blocks containing a plurality of a second type of monomer, forming a block copolymer. A single monomer unit can include one or more different chemical functional groups.

Polymers having repeating units which include two or more types of chemical functional groups can be referred to as having two or more segments. For example, a polymer having repeating units of the same chemical structure can be referred to as having repeating segments. Segments are commonly described as being relatively harder or softer based on their chemical structures, and it is common for polymers to include relatively harder segments and relatively softer segments bonded to each other in a single monomeric unit or in different monomeric units. When the polymer includes repeating segments, physical interactions or chemical bonds can be present within the segments or between the segments or both within and between the segments. Examples of segments often referred to as hard segments include segments including a urethane linkage, which can be formed from reacting an isocyanate with a polyol to form a polyurethane. Examples of segments often referred to as soft segments include segments including an alkoxy functional group, such as segments including ether or ester functional groups, and polyester segments. Segments can be referred to based on the name of the functional group present in the segment (e.g., a polyether segment, a polyester segment), as well as based on the name of the chemical structure which was reacted in order to form the segment (e.g., a polyol-derived segment, an isocyanate-derived segment). When referring to segments of a particular functional group or of a particular chemical structure from which the segment was derived, it is understood that the polymer can contain up to 10 mole percent of segments of other functional groups or derived from other chemical structures. For example, as used herein, a polyether segment is understood to include up to 10 mole percent of non-polyether segments.

As previously described, the polymer can be a thermoplastic polymer. In general, a thermoplastic polymer softens or melts when heated and returns to a solid state when cooled. The thermoplastic polymer transitions from a solid state to a softened state when its temperature is increased to a temperature at or above its softening temperature, and a liquid state when its temperature is increased to a temperature at or above its melting temperature. When sufficiently cooled, the thermoplastic polymer transitions from the softened or liquid state to the solid state. As such, the thermoplastic polymer may be softened or melted, molded, cooled, re-softened or re-melted, re-molded, and cooled again through multiple cycles. For amorphous thermoplastic polymers, the solid state is understood to be the "rubbery" state above the glass transition temperature of the polymer. The thermoplastic polymer can have a melting temperature from about 90 degrees C. to about 190 degrees C. when determined in accordance with ASTM D3418-97 as described herein below, and includes all subranges therein in increments of 1 degree. The thermoplastic polymer can have a melting temperature from about 93 degrees C. to about 99 degrees C. when determined in accordance with ASTM D3418-97 as described herein below. The thermoplastic polymer can have a melting temperature from about 112 degrees C. to about 118 degrees C. when determined in accordance with ASTM D3418-97 as described herein below.

The glass transition temperature is the temperature at which an amorphous polymer transitions from a relatively brittle "glassy" state to a relatively more flexible "rubbery" state. The thermoplastic polymer can have a glass transition temperature from about −20 degrees C. to about 30 degrees C. when determined in accordance with ASTM D3418-97 as described herein below. The thermoplastic polymer can have a glass transition temperature (from about −13 degree C. to about −7 degrees C. when determined in accordance with ASTM D3418-97 as described herein below. The thermoplastic polymer can have a glass transition temperature from about 17 degrees C. to about 23 degrees C. when determined in accordance with ASTM D3418-97 as described herein below.

The thermoplastic polymer can have a melt flow index from about 10 to about 30 cubic centimeters per 10 minutes (cm3/10 min) when tested in accordance with ASTM D1238-13 as described herein below at 160 degrees C. using a weight of 2.16 kilograms (kg). The thermoplastic polymer can have a melt flow index from about 22 cm3/10 min to about 28 cm3/10 min when tested in accordance with ASTM D1238-13 as described herein below at 160 degrees C. using a weight of 2.16 kg.

The thermoplastic polymer can have a cold Ross flex test result of about 120,000 to about 180,000 cycles without cracking or whitening when tested on a thermoformed plaque of the thermoplastic polymer in accordance with the cold Ross flex test as described herein below. The thermoplastic polymer can have a cold Ross flex test result of about 140,000 to about 160,000 cycles without cracking or whitening when tested on a thermoformed plaque of the thermoplastic polymer in accordance with the cold Ross flex test as described herein below.

The thermoplastic polymer can have a modulus from about 5 megaPascals (MPa) to about 100 MPa when determined on a thermoformed plaque in accordance with ASTM D412-98 Standard Test Methods for Vulcanized Rubber and Thermoplastic Rubbers and Thermoplastic Elastomers-Tension with modifications described herein below. The thermoplastic polymer can have a modulus from about 20 MPa to about 80 MPa when determined on a thermoformed plaque in accordance with ASTM D412-98 Standard Test Methods for Vulcanized Rubber and Thermoplastic Rubbers and Thermoplastic Elastomers-Tension with modifications described herein below.

The polymer can be a thermoset polymer. As used herein, a "thermoset polymer" is understood to refer to a polymer which cannot be heated and melted, as its melting temperature is at or above its decomposition temperature. A "thermoset material" refers to a material which comprises at least one thermoset polymer. The thermoset polymer and/or thermoset material can be prepared from a precursor (e.g., an uncured or partially cured polymer or material) using thermal energy and/or actinic radiation (e.g., ultraviolet radiation, visible radiation, high energy radiation, infrared radiation) to form a partially cured or fully cured polymer or material which no longer remains fully thermoplastic. In some cases, the cured or partially cured polymer or material may remain thermoelastic properties, in that it is possible to partially soften and mold the polymer or material at elevated temperatures and/or pressures, but it is not possible to melt the polymer or material. The curing can be promoted, for example, with the use of high pressure and/or a catalyst. In many examples, the curing process is irreversible since it results in cross-linking and/or polymerization reactions of the precursors. The uncured or partially cured polymers or materials can be malleable or liquid prior to curing. In some cases, the uncured or partially cured polymers or materials can be molded into their final shape, or used as adhesives. Once hardened, a thermoset polymer or material cannot be re-melted in order to be reshaped. The textured surface can be formed by partially or fully curing an uncured precursor material to lock in the textured surface.

Polyurethane

The polymer can be a polyurethane, such as a thermoplastic polyurethane (also referred to as "TPU"). Alternatively, the polymer can be a thermoset polyurethane. Additionally, polyurethane can be an elastomeric polyurethane, including an elastomeric TPU or an elastomeric thermoset polyurethane. The elastomeric polyurethane can include hard and soft segments. The hard segments can comprise or consist of urethane segments (e.g., isocyanate-derived segments). The soft segments can comprise or consist of alkoxy segments (e.g., polyol-derived segments including polyether segments, or polyester segments, or a combination of polyether segments and polyester segments). The polyurethane can comprise or consist essentially of an elastomeric polyurethane having repeating hard segments and repeating soft segments.

One or more of the polyurethanes can be produced by polymerizing one or more isocyanates with one or more polyols to produce polymer chains having carbamate linkages (—N(CO)O—), where the isocyanate(s) each preferably include two or more isocyanate (—NCO) groups per molecule, such as 2, 3, or 4 isocyanate groups per molecule (although, mono-functional isocyanates can also be optionally included, e.g., as chain terminating units).

Additionally, the isocyanates can also be chain extended with one or more chain extenders to bridge two or more isocyanates, increasing the length of the hard segment.

The term "aliphatic" refers to a saturated or unsaturated organic molecule or portion of a molecule that does not include a cyclically conjugated ring system having delocalized pi electrons. In comparison, the term "aromatic" refers to an organic molecule or portion of a molecule having a cyclically conjugated ring system with delocalized pi electrons, which exhibits greater stability than a hypothetical ring system having localized pi electrons.

Examples of suitable aliphatic diisocyanates for producing the polyurethane polymer chains include hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate (TMDI), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MDI), diisocyanatododecane, lysine diisocyanate, and combinations thereof.

The isocyanate-derived segments can include segments derived from aliphatic diisocyanate. A majority of the isocyanate-derived segments can comprise segments derived from aliphatic diisocyanates. At least 90% of the isocyanate-derived segments are derived from aliphatic diisocyanates. The isocyanate-derived segments can consist essentially of segments derived from aliphatic diisocyanates. The aliphatic diisocyanate-derived segments can be derived substantially (e.g., about 50 percent or more, about 60 percent or more, about 70 percent or more, about 80 percent or more, about 90 percent or more) from linear aliphatic diisocyanates. At least 80% of the aliphatic diisocyanate-derived segments can be derived from aliphatic diisocyanates that are free of side chains. The segments derived from aliphatic diisocyanates can include linear aliphatic diisocyanates having from 2 to 10 carbon atoms.

Examples of suitable aromatic diisocyanates for producing the polyurethane polymer chains include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4, 4'-diisocyanate (DDDI), 4,4'-dibenzyl diisocyanate (DBDI), 4-chloro-1,3-phenylene diisocyanate, and combinations thereof. The polymer chains can be substantially free of aromatic groups.

The polyurethane polymer chains can be produced from diisocyanates including HMDI, TDI, MDI, H12 aliphatics, and combinations thereof. For example, the polyurethane can comprise one or more polyurethane polymer chains produced from diisocyanates including HMDI, TDI, MDI, H12 aliphatics, and combinations thereof.

Polyurethane chains which are at least partially crosslinked or which can be crosslinked, can be used in accordance with the present disclosure. It is possible to produce crosslinked or crosslinkable polyurethane chains by reacting multi-functional isocyanates to form the polyurethane. Examples of suitable triisocyanates for producing the polyurethane chains include TDI, HDI, and IPDI adducts with trimethyloylpropane (TMP), uretdiones (i.e., dimerized isocyanates), polymeric MDI, and combinations thereof.

Examples of suitable chain extender polyols for producing the polyurethane include ethylene glycol, lower oligomers of ethylene glycol (e.g., diethylene glycol, triethylene glycol, and tetraethylene glycol), 1,2-propylene glycol, 1,3-propylene glycol, lower oligomers of propylene glycol (e.g., dipropylene glycol, tripropylene glycol, and tetrapropylene glycol), 1,4-butylene glycol, 2,3-butylene glycol, 1,6-hexanediol, 1,8-octanediol, neopentyl glycol, 1,4-cyclohexanedimethanol, 2-ethyl-1,6-hexanediol, 1-methyl-1,3-propanediol, 2-methyl-1,3-propanediol, dihydroxyalkylated aromatic compounds (e.g., bis(2-hydroxyethyl) ethers of hydroquinone and resorcinol, xylene-a,a-diols, bis(2-hydroxyethyl) ethers of xylene-a,a-diols, and combinations thereof.

In some examples of the polyurethane, the polyurethane includes a polyester group. The polyester group can be derived from the polyesterification of one or more dihydric alcohols (e.g., ethylene glycol, 1,3-propylene glycol, 1,2-propylene glycol, 1,4-butanediol, 1,3-butanediol, 2-methylpentanediol 1,5-diethylene glycol, 1,5-pentanediol, 1,5-hexanediol, 1,2-dodecanediol, cyclohexanedimethanol, and combinations thereof) with one or more dicarboxylic acids (e.g., adipic acid, succinic acid, sebacic acid, suberic acid, methyladipic acid, glutaric acid, pimelic acid, azelaic acid, thiodipropionic acid and citraconic acid and combinations thereof). The polyester group also can be derived from polycarbonate prepolymers, such as poly(hexamethylene carbonate) glycol, poly(propylene carbonate) glycol, poly(tetramethylene carbonate)glycol, and poly(nonanemethylene carbonate) glycol. Suitable polyesters can include, for example, polyethylene adipate (PEA), poly(1,4-butylene adipate), poly(tetramethylene adipate), poly(hexamethylene adipate), polycaprolactone, polyhexamethylene carbonate, poly(propylene carbonate), poly(tetramethylene carbonate), poly(nonanemethylene carbonate), and combinations thereof.

The polyurethane can include a polyether (e.g., a polyethylene oxide (PEO) group, a polyethylene glycol (PEG) group), a polyvinylpyrrolidone group, a polyacrylic acid group, or combinations thereof.

Optionally, the polyurethane can include an at least partially crosslinked polymeric network that includes polymer chains that are derivatives of polyurethane. The level of crosslinking can be such that the polyurethane retains thermoplastic properties (i.e., the crosslinked thermoplastic polyurethane can be melted and re-solidified under the processing conditions described herein). The crosslinked polyurethane can be a thermoset polymer. This crosslinked polymeric network can be produced by polymerizing one or more isocyanates with one or more polyamino compounds, polysulfhydryl compounds, or combinations thereof.

The polyurethane chain can be physically crosslinked to another polyurethane chain through e.g., nonpolar or polar interactions between the urethane or carbamate groups of the polymers (the hard segments The polyurethane can be a thermoplastic polyurethane composed of MDI, PTMO, and 1,4-butylene glycol, as described in U.S. Pat. No. 4,523,005. Commercially available polyurethanes suitable for the present use include, but are not limited to those under the tradename "SANCURE" (e.g., the "SANCURE" series of polymer such as "SAN-CURE" 20025F) or "TECOPHILIC" (e.g., TG-500, TG-2000, SP-80A-150, SP-93A-100, SP-60D-60) (Lubrizol, Countryside, Ill., USA), "PELLETHANE" 2355-85ATP and 2355-95AE (Dow Chemical Company of Midland, Mich., USA.), "ESTANE" (e.g., ALR G 500, or 58213; Lubrizol, Countryside, Ill., USA).

Polyamides

The polymer can comprise a polyamide, such as a thermoplastic polyamide, or a thermoset polyamide. The polyamide can be an elastomeric polyamide, including an elastomeric thermoplastic polyamide or an elastomeric thermoset polyamide. The polyamide can be a polyamide homopolymer having repeating polyamide segments of the same chemical structure. Alternatively, the polyamide can comprise a number of polyamide segments having different polyamide chemical structures (e.g., polyamide 6 segments, polyamide 11 segments, polyamide 12 segments, polyamide 66 segments, etc.). The polyamide segments having different chemical structure can be arranged randomly, or can be arranged as repeating blocks.

The polyamide can be a co-polyamide (i.e., a co-polymer including polyamide segments and non-polyamide segments). The polyamide segments of the co-polyamide can comprise or consist of polyamide 6 segments, polyamide 11 segments, polyamide 12 segments, polyamide 66 segments, or any combination thereof. The polyamide segments of the co-polyamide can be arranged randomly, or can be arranged as repeating segments. The polyamide segments can comprise or consist of polyamide 6 segments, or polyamide 12 segments, or both polyamide 6 segment and polyamide 12 segments. In the example where the polyamide segments of the co-polyamide include of polyamide 6 segments and polyamide 12 segments, the segments can be arranged randomly. The non-polyamide segments of the co-polyamide can comprise or consist of polyether segments, polyester segments, or both polyether segments and polyester segments. The co-polyamide can be a block co-polyamide, or can be a random co-polyamide. The copolyamide can be formed from the polycondensation of a polyamide oligomer or prepolymer with a second oligomer prepolymer to form a copolyamide (i.e., a co-polymer including polyamide segments. Optionally, the second prepolymer can be a hydrophilic prepolymer.

The polyamide can be a polyamide-containing block co-polymer. For example, the block co-polymer can have repeating hard segments, and repeating soft segments. The hard segments can comprise polyamide segments, and the soft segments can comprise non-polyamide segments. The polyamide-containing block co-polymer can be an elastomeric co-polyamide comprising or consisting of polyamide-containing block co-polymers having repeating hard segments and repeating soft segments. In block co-polymers, including block co-polymers having repeating hard segments and soft segments, physical crosslinks can be present within the segments or between the segments or both within and between the segments.

The polyamide itself, or the polyamide segment of the polyamide-containing block co-polymer can be derived from the condensation of polyamide prepolymers, such as lactams, amino acids, and/or diamino compounds with dicarboxylic acids, or activated forms thereof. The resulting polyamide segments include amide linkages (—(CO)NH—). The term "amino acid" refers to a molecule having at least one amino group and at least one carboxyl group. Each polyamide segment of the polyamide can be the same or different.

The polyamide or the polyamide segment of the polyamide-containing block co-polymer can be derived from the polycondensation of lactams and/or amino acids.

Optionally, in order to increase the relative degree of hydrophilicity of the polyamide-containing block co-polymer, the polyamide can include a polyamide-polyether block copolymer segment.

The polyamide can comprise or consist essentially of a poly(ether-block-amide). The poly(ether-block-amide) can be formed from the polycondensation of a carboxylic acid terminated polyamide prepolymer and a hydroxyl terminated polyether prepolymer to form a poly(ether-block-amide).

Exemplary commercially available copolymers include, but are not limited to, those available under the tradenames of "VESTAMID" (Evonik Industries, Essen, Germany); "PLATAMID" (Arkema, Colombes, France), e.g., product code H2694; "PEBAX" (Arkema), e.g., product code "PEBAX MH1657" and "PEBAX MV1074"; "PEBAX RNEW" (Arkema); "GRILAMID" (EMS-Chemie AG, Domat-Ems, Switzerland), or also to other similar materials produced by various other suppliers.

The polyamide can be physically crosslinked through, e.g., nonpolar or polar interactions between the polyamide groups of the polymers. In examples where the polyamide is a copolyamide, the copolyamide can be physically crosslinked through interactions between the polyamide groups, and optionally by interactions between the copolymer groups. When the co-polyamide is physically crosslinked through interactions between the polyamide groups, the polyamide segments can form the portion of the polymer referred to as the hard segment, and copolymer segments can form the portion of the polymer referred to as the soft segment. For example, when the copolyamide is a poly(ether-block-amide), the polyamide segments form the hard segments of the polymer, and polyether segments form the soft segments of the polymer. Therefore, in some examples, the polymer can include a physically crosslinked polymeric network having one or more polymer chains with amide linkages.

The polyamide segment of the co-polyamide can include polyamide-11 or polyamide-12 and the polyether segment can be a segment selected from the group consisting of polyethylene oxide, polypropylene oxide, and polytetramethylene oxide segments, and combinations thereof.

The polyamide can be partially or fully covalently crosslinked, as previously described herein. In some cases, the degree of crosslinking present in the polyamide is such that, when it is thermally processed, e.g., in the form of a yarn or fiber to form the articles of the present disclosure, the partially covalently crosslinked thermoplastic polyamide retains sufficient thermoplastic character that the partially covalently crosslinked thermoplastic polyamide is melted during the processing and re-solidifies. In other cases, the crosslinked polyamide is a thermoset polymer.

Polyesters

The polymers can comprise a polyester. The polyester can comprise a thermoplastic polyester, or a thermoset polyester. Additionally, the polyester can be an elastomeric polyester, including a thermoplastic polyester or a thermoset elastomeric polyester. The polyester can be formed by reaction of one or more carboxylic acids, or its ester-forming derivatives, with one or more bivalent or multivalent aliphatic, alicyclic, aromatic or araliphatic alcohols or a bisphenol. The polyester can be a polyester homopolymer having repeating polyester segments of the same chemical structure. Alternatively, the polyester can comprise a number of polyester segments having different polyester chemical structures (e.g., polyglycolic acid segments, polylactic acid segments, polycaprolactone segments, polyhydroxyalkanoate segments, polyhydroxybutyrate segments, etc.). The polyester segments having different chemical structure can be arranged randomly, or can be arranged as repeating blocks.

Exemplary carboxylic acids that can be used to prepare a polyester include, but are not limited to, adipic acid, pimelic acid, suberic acid, azelaic acid, sebacic acid, nonane dicarboxylic acid, decane dicarboxylic acid, undecane dicarboxylic acid, terephthalic acid, isophthalic acid, alkyl-substituted or halogenated terephthalic acid, alkyl-substituted or halogenated isophthalic acid, nitro-terephthalic acid, 4,4'-diphenyl ether dicarboxylic acid, 4,4'-diphenyl thioether dicarboxylic acid, 4,4'-diphenyl sulfone-dicarboxylic acid, 4,4'-diphenyl alkylenedicarboxylic acid, naphthalene-2,6-dicarboxylic acid, cyclohexane-1,4-dicarboxylic acid and cyclohexane-1,3-dicarboxylic acid. Exemplary diols or phenols suitable for the preparation of the polyester include, but are not limited to, ethylene glycol, diethylene glycol, 1,3-propanediol, 1,4-butanediol, 1,6-hexanediol, 1,8-octanediol, 1,10-decanediol, 1,2-propanediol, 2,2-dimethyl-1,3-propanediol, 2,2,4-trimethylhexanediol, p-xylenediol, 1,4-cyclohexanediol, 1,4-cyclohexane dimethanol, and bis-phenol A.

The polyester can be a polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), a liquid crystal polyester, or a blend or mixture of two or more of the foregoing.

The polyester can be a co-polyester (i.e., a co-polymer including polyester segments and non-polyester segments). The co-polyester can be an aliphatic co-polyester (i.e., a co-polyester in which both the polyester segments and the non-polyester segments are aliphatic). Alternatively, the co-polyester can include aromatic segments. The polyester segments of the co-polyester can comprise or consist essentially of polyglycolic acid segments, polylactic acid segments, polycaprolactone segments, polyhydroxyalkanoate segments, polyhydroxybutyrate segments, or any combination thereof. The polyester segments of the co-polyester can be arranged randomly, or can be arranged as repeating blocks.

For example, the polyester can be a block co-polyester having repeating blocks of polymeric units of the same chemical structure which are relatively harder (hard segments), and repeating blocks of the same chemical structure which are relatively softer (soft segments). In block co-polyesters, including block co-polyesters having repeating hard segments and soft segments, physical crosslinks can be present within the blocks or between the blocks or both within and between the blocks. The polymer can comprise or consist essentially of an elastomeric co-polyester having repeating blocks of hard segments and repeating blocks of soft segments.

The non-polyester segments of the co-polyester can comprise or consist essentially of polyether segments, polyamide segments, or both polyether segments and polyamide segments. The co-polyester can be a block co-polyester, or can be a random co-polyester. The co-polyester can be formed from the polycondensation of a polyester oligomer or prepolymer with a second oligomer prepolymer to form a block copolyester. Optionally, the second prepolymer can be a hydrophilic prepolymer. For example, the co-polyester can be formed from the polycondensation of terephthalic acid or naphthalene dicarboxylic acid with ethylene glycol, 1,4-butanediol, or 1,3-propanediol. Examples of co-polyesters include polyethylene adipate, polybutylene succinate, poly(3-hydroxybutyrate-co-3-hydroxyvalerate), polyethylene terephthalate, polybutylene terephthalate, polytrimethylene terephthalate, polyethylene napthalate, and combinations thereof. The co-polyamide can comprise or consist of polyethylene terephthalate.

The polyester can be a block copolymer comprising segments of one or more of polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), and a liquid crystal polyester. For example, a suitable polyester that is a block copolymer can be a PET/PEI copolymer, a polybutylene terephthalate/tetraethylene glycol copolymer, a polyoxyalkylenediimide diacid/polybutylene terephthalate copolymer, or a blend or mixture of any of the foregoing.

The disclosed polyesters can be prepared by a variety of polycondensation methods known to the skilled artisan, such as a solvent polymerization or a melt polymerization process.

Polyolefins

The polymers can comprise or consist essentially of a polyolefin. The polyolefin can be a thermoplastic polyolefin or a thermoset polyolefin. Additionally, the polyolefin can be an elastomeric polyolefin, including a thermoplastic elastomeric polyolefin or a thermoset elastomeric polyolefin. Exemplary polyolefins can include polyethylene, polypropylene, and olefin elastomers (e.g., metallocene-catalyzed block copolymers of ethylene and α-olefins having 4 to about 8 carbon atoms). The polyolefin can be a polymer comprising a polyethylene, an ethylene-α-olefin copolymer, an ethylene-propylene rubber (EPDM), a polybutene, a polyisobutylene, a poly-4-methylpent-1-ene, a polyisoprene, a polybutadiene, a ethylene-methacrylic acid copolymer, and an olefin elastomer such as a dynamically crosslinked polymer obtained from polypropylene (PP) and an ethylene-propylene rubber (EPDM), and blends or mixtures of the foregoing. Further exemplary polyolefins include polymers of cycloolefins such as cyclopentene or norbornene.

It is to be understood that polyethylene, which optionally can be crosslinked, is inclusive a variety of polyethylenes, including low density polyethylene (LDPE), linear low density polyethylene (LLDPE), (VLDPE) and (ULDPE), medium density polyethylene (MDPE), high density polyethylene (HDPE), high density and high molecular weight polyethylene (HDPE-HMW), high density and ultrahigh molecular weight polyethylene (HDPE-UHMVV), and blends or mixtures of any the foregoing polyethylenes. A polyethylene can also be a polyethylene copolymer derived from monomers of monolefins and diolefins copolymerized with a vinyl, acrylic acid, methacrylic acid, ethyl acrylate, vinyl alcohol, and/or vinyl acetate. Polyolefin copolymers comprising vinyl acetate-derived units can be a high vinyl acetate content copolymer, e.g., greater than about 50 weight percent vinyl acetate-derived composition.

The polyolefin can be formed through free radical, cationic, and/or anionic polymerization by methods well known to those skilled in the art (e.g., using a peroxide initiator, heat, and/or light).

Suitable polyolefins can be prepared by polymerization of monomers of monolefins and diolefins as described herein. Exemplary monomers that can be used to prepare the polyolefin include, but are not limited to, ethylene, propylene, 1-butene, 1-pentene, 1-hexene, 2-methyl-1-propene, 3-methyl-1-pentene, 4-methyl-1-pentene, 5-methyl-1-hexene and mixtures thereof.

Suitable ethylene-α-olefin copolymers can be obtained by copolymerization of ethylene with an α-olefin such as propylene, butene-1, hexene-1, octene-1,4-methyl-1-pentene or the like having carbon numbers of 3 to 12.

The polyolefin can be a mixture of polyolefins, such as a mixture of two or more polyolefins disclosed herein above. For example, a suitable mixture of polyolefins can be a mixture of polypropylene with polyisobutylene, polypropylene with polyethylene (for example PP/HDPE, PP/LDPE) or mixtures of different types of polyethylene (for example LDPE/HDPE).

The polyolefin can be a copolymer of suitable monolefin monomers or a copolymer of a suitable monolefin monomer and a vinyl monomer. Exemplary polyolefin copolymers include ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

The polyolefin can be a polypropylene homopolymer, a polypropylene copolymers, a polypropylene random copolymer, a polypropylene block copolymer, a polyethylene homopolymer, a polyethylene random copolymer, a polyethylene block copolymer, a low density polyethylene (LDPE), a linear low density polyethylene (LLDPE), a medium density polyethylene, a high density polyethylene (HDPE), or blends or mixtures of one or more of the preceding polymers.

The polyolefin can be a polypropylene. The term "polypropylene," as used herein, is intended to encompass any polymeric composition comprising propylene monomers, either alone or in mixture or copolymer with other randomly selected and oriented polyolefins, dienes, or other monomers (such as ethylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polypropylene can be of any standard melt flow (by testing); however, standard fiber grade polypropylene resins possess ranges of Melt Flow Indices between about 1 and 1000.

The polyolefin can be a polyethylene. The term "polyethylene," as used herein, is intended to encompass any polymeric composition comprising ethylene monomers, either alone or in mixture or copolymer with other randomly selected and oriented polyolefins, dienes, or other monomers (such as propylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polyethylene can be of any standard melt flow (by testing); however, standard fiber grade polyethylene resins possess ranges of Melt Flow Indices between about 1 and 1000.

The thermoplastic and/or thermosetting material can further comprise one or more processing aids. The processing aid can be a non-polymeric material. These processing aids can be independently selected from the group including, but not limited to, curing agents, initiators, plasticizers, mold release agents, lubricants, antioxidants, flame retardants, dyes, pigments, reinforcing and non-reinforcing fillers, fiber reinforcements, and light stabilizers.

In articles that include a textile, the optical element can be disposed onto the textile. The textile or at least an outer layer of the textile can includes a thermoplastic material that the optical element can disposed onto. The textile can be a nonwoven textile, a synthetic leather, a knit textile, or a woven textile. The textile can comprise a first fiber or a first yarn, where the first fiber or the first yarn can include at least an outer layer comprising the first thermoplastic material. A region of the first or second side of the structure onto which the optical element is disposed can include the first fiber or the first yarn in a non-filamentous conformation. The optical element can be disposed onto the textile or the textile can be processed so that the optical element can be disposed onto the textile. The textured surface can be made of or formed from the textile surface. The optical element can be disposed onto the primer layer. The textile surface can be used to form the textured surface, and either before or after this, the optical element can be applied to the textile.

A "textile" may be defined as any material manufactured from fibers, filaments, or yarns characterized by flexibility, fineness, and a high ratio of length to thickness. Textiles generally fall into two categories. The first category includes textiles produced directly from webs of filaments or fibers by randomly interlocking to construct non-woven fabrics and felts. The second category includes textiles formed through a mechanical manipulation of yarn, thereby producing a woven fabric, a knitted fabric, a braided fabric, a crocheted fabric, and the like.

The terms "filament," "fiber," or "fibers" as used herein refer to materials that are in the form of discrete elongated pieces that are significantly longer than they are wide. The fiber can include natural, manmade or synthetic fibers. The fibers may be produced by conventional techniques, such as extrusion, electrospinning, interfacial polymerization, pulling, and the like. The fibers can include carbon fibers, boron fibers, silicon carbide fibers, titania fibers, alumina fibers, quartz fibers, glass fibers, such as E, A, C, ECR, R, S, D, and NE glasses and quartz, or the like. The fibers can be fibers formed using polymeric materials comprising polymers capable of forming fibers such as poly(ether ketone), polyimide, polybenzoxazole, poly(phenylene sulfide), polyesters, polyolefins (e.g., polyethylene, polypropylene), aromatic polyamides (e.g., an aramid polymer such as para-aramid fibers and meta-aramid fibers), aromatic polyimides, polybenzimidazoles, polyetherimides, polytetrafluoroethylene, acrylic, modacrylic, poly(vinyl alcohol), polyamides, polyurethanes, and copolymers such as polyether-polyurea copolymers, polyester-polyurethanes, polyether block amide copolymers, or the like. The fibers can be natural fibers (e.g., silk, wool, cashmere, vicuna, cotton, flax, hemp, jute, sisal). The fibers can be man-made fibers from regenerated natural polymers, such as rayon, lyocell, acetate, triacetate, rubber, and poly(lactic acid).

The fibers can have an indefinite length. For example, man-made and synthetic fibers are generally extruded in substantially continuous strands. Alternatively, the fibers can be staple fibers, such as, for example, cotton fibers or extruded synthetic polymer fibers can be cut to form staple fibers of relatively uniform length. The staple fiber can have a have a length of about 1 millimeter to 100 centimeters or more as well as any increment therein (e.g., 1 millimeter increments).

The fiber can have any of a variety of cross-sectional shapes. Natural fibers can have a natural cross-section, or can have a modified cross-sectional shape (e.g., with processes such as mercerization). Man-made or synthetic fibers can be extruded to provide a strand having a predetermined cross-sectional shape. The cross-sectional shape of a fiber can affect its properties, such as its softness, luster, and wicking ability. The fibers can have round or essentially round cross sections. Alternatively, the fibers can have non-round cross sections, such as flat, oval, octagonal, rectangular, wedge-shaped, triangular, dog-bone, multi-lobal, multi-channel, hollow, core-shell, or other shapes.

The fiber can be processed. For example, the properties of fibers can be affected, at least in part, by processes such as drawing (stretching) the fibers, annealing (hardening) the fibers, and/or crimping or texturizing the fibers.

In some cases a fiber can be a multi-component fiber, such as one comprising two or more co-extruded polymeric materials. The two or more co-extruded polymeric materials can be extruded in a core-sheath, islands-in-the-sea, segmented-pie, striped, or side-by-side configuration. A multi-component fiber can be processed in order to form a plurality of smaller fibers (e.g., microfibers) from a single fiber, for example, by remove a sacrificial material.

The fiber can be a carbon fiber such as TARIFYL produced by Formosa Plastics Corp. of Kaohsiung City, Taiwan, (e.g., 12,000, 24,000, and 48,000 fiber tows, specifically fiber types TC-35 and TC-35R), carbon fiber produced by SGL Group of Wiesbaden, Germany (e.g., 50,000 fiber tow), carbon fiber produced by Hyosung of Seoul, South Korea, carbon fiber produced by Toho Tenax of Tokyo, Japan, fiberglass produced by Jushi Group Co., LTD of Zhejiang, China (e.g., E6, 318, silane-based sizing, filament diameters 14, 15, 17, 21, and 24 micrometers), and polyester fibers produced by Amann Group of Bonningheim, Germany (e.g., SERAFILE 200/2 non-lubricated polyester filament and SERAFILE COM PHIL 200/2 lubricated polyester filament).

A plurality of fibers includes 2 to hundreds or thousands or more fibers. The plurality of fibers can be in the form of bundles of strands of fibers, referred to as tows, or in the form of relatively aligned staple fibers referred to as sliver and roving. A single type fiber can be used either alone or in combination with one or more different types of fibers by co-mingling two or more types of fibers. Examples of co-mingled fibers include polyester fibers with cotton fibers, glass fibers with carbon fibers, carbon fibers with aromatic polyimide (aramid) fibers, and aromatic polyimide fibers with glass fibers.

As used herein, the term "yarn" refers to an assembly including one or more fibers, wherein the strand has a substantial length and a relatively small cross-section, and is suitable for use in the production of textiles by hand or by machine, including textiles made using weaving, knitting, crocheting, braiding, sewing, embroidery, or ropemaking techniques. Thread is a type of yarn commonly used for sewing.

Yarns can be made using fibers comprising natural, man-made and synthetic materials. Synthetic fibers are most commonly used to make spun yarns from staple fibers, and filament yarns. Spun yarn is made by arranging and twisting staple fibers together to make a cohesive strand. The process of forming a yarn from staple fibers typically includes carding and drawing the fibers to form sliver, drawing out and twisting the sliver to form roving, and spinning the roving to form a strand. Multiple strands can be plied (twisted together) to make a thicker yarn. The twist direction of the staple fibers and of the plies can affect the final properties of the yarn. A filament yarn refer to a single long, substantially continuous filament, which is conventionally referred to as a "monofilament yarn," or a plurality of individual filaments grouped together. A filament yarn can also refer to two or more long, substantially continuous filaments which are grouped together by grouping the filaments together by twisting them or entangling them or both. As with staple yarns, multiple strands can be plied together to form a thicker yarn.

Once formed, the yarn can undergo further treatment such as texturizing, thermal or mechanical treating, or coating with a material such as a synthetic polymer. The fibers, yarns, or textiles, or any combination thereof, used in the disclosed articles can be sized. Sized fibers, yarns, and/or textiles are coated on at least part of their surface with a sizing composition selected to change the absorption or wear characteristics, or for compatibility with other materials. The sizing composition facilitates wet-out and wet-through of the coating or resin upon the surface and assists in attaining desired physical properties in the final article. An exemplary sizing composition can comprise, for example, epoxy polymers, urethane-modified epoxy polymers, polyester polymers, phenol polymers, polyamide polymers, polyurethane polymers, polycarbonate polymers, polyetherimide polymers, polyamideimide polymers, polystylylpyridine polymers, polyimide polymers bismaleimide polymers, polysulfone polymers, polyethersulfone polymers, epoxy-modified urethane polymers, polyvinyl alcohol polymers, polyvinyl pyrrolidone polymers, and mixtures thereof.

Two or more yarns can be combined, for example, to form composite yarns such as single- or double-covered yarns, and corespun yarns. Accordingly, yarns may have a variety of configurations that generally conform to the descriptions provided herein.

The yarn can comprise at least one thermoplastic material (e.g., one or more of the fibers can be made using a thermoplastic material). The yarn can be made of a thermoplastic material. The yarn can be coated with a layer of a material such as a thermoplastic material.

Various techniques exist for mechanically manipulating yarns to form a textile. Such techniques include, for example, interweaving, intertwining and twisting, and interlooping. Interweaving is the intersection of two yarns that cross and interweave at right angles to each other. The yarns utilized in interweaving are conventionally referred to as "warp" and "weft." A woven textile includes include a warp yarn and a weft yarn. The warp yarn extends in a first direction, and the weft strand extends in a second direction that is substantially perpendicular to the first direction. Intertwining and twisting encompasses various procedures, such as braiding and knotting, where yarns intertwine with each other to form a textile. Interlooping involves the formation of a plurality of columns of intermeshed loops, with knitting being the most common method of interlooping. The textile may be primarily formed from one or more yarns that are mechanically-manipulated, for example, through interweaving, intertwining and twisting, and/or interlooping processes, as mentioned above.

The textile can be a nonwoven textile. Generally, a nonwoven textile or fabric is a sheet or web structure made from fibers and/or yarns that are bonded together. The bond can be a chemical and/or mechanical bond, and can be formed using heat, solvent, adhesive or a combination thereof. Exemplary nonwoven fabrics are flat or tufted porous sheets that are made directly from separate fibers, molten plastic and/or plastic film. They are not made by weaving or knitting and do not necessarily require converting the fibers to yarn, although yarns can be used as a source of the fibers. Nonwoven textiles are typically manufactured by putting small fibers together in the form of a sheet or web (similar to paper on a paper machine), and then binding them either mechanically (as in the case of felt, by interlocking them with serrated or barbed needles, or hydro-entanglement such that the inter-fiber friction results in a stronger fabric), with an adhesive, or thermally (by applying binder (in the form of powder, paste, or polymer melt) and melting the binder onto the web by increasing temperature). A nonwoven textile can be made from staple fibers (e.g., from wetlaid, airlaid, carding/crosslapping processes), or extruded fibers (e.g., from meltblown or spunbond processes, or a combination thereof), or a combination thereof. Bonding of the fibers in the nonwoven textile can be achieved with thermal bonding (with or without calendering), hydro-entanglement, ultrasonic bonding, needlepunching (needlefelting), chemical bonding (e.g., using binders such as latex emulsions or solution polymers or binder fibers or powders), meltblown bonding (e.g., fiber is bonded as air attenuated fibers intertangle during simultaneous fiber and web formation).

Now having described various aspects of the present disclosure, additional discussion is provided regarding when the optical element is used in conjunction with a bladder. The bladder can be unfilled, partially inflated, or fully inflated when the structural design (e.g., optical element) is disposed onto the bladder. The bladder is a bladder capable of including a volume of a fluid. An unfilled bladder is a fluid-fillable bladder and a filled bladder that has been at least partially inflated with a fluid at a pressure equal to or greater than atmospheric pressure. When disposed onto or incorporated into an article of footwear, apparel, or sports equipment, the bladder is generally, at that point, a fluid-filled bladder. The fluid be a gas or a liquid. The gas can include air, nitrogen gas ($N_2$), or other appropriate gas.

The bladder can have a gas transmission rate for nitrogen gas, for example, where a bladder wall of a given thickness has a gas transmission rate for nitrogen that is at least about ten times lower than the gas transmission rate for nitrogen of a butyl rubber layer of substantially the same thickness as the thickness of the bladder described herein. The bladder can have a first bladder wall having a first bladder wall thickness (e.g., about 0.1 to 40 mils). The bladder can have a first bladder wall that can have a gas transmission rate (GTR) for nitrogen gas of less than about 15 $cm^3/m^2 \cdot atm \cdot day$, less than about 10 $m^3/m^2 \cdot atm \cdot day$, less than about 5 $cm^3/m^2 \cdot atm \cdot day$, less than about 1 $cm^3/m^2 \cdot atm \cdot day$ (e.g., from about 0.001 $cm^3/m^2 \cdot atm \cdot day$ to about 1 $cm^3/m^2 \cdot atm \cdot day$, about 0.01 $cm^3/m^2 \cdot atm \cdot day$ to about 1 $cm^3/m^2 \cdot atm \cdot day$ or about 0.1 $cm^3/m^2 \cdot atm \cdot day$ to about 1 $cm^3/m^2 \cdot atm \cdot day$) for an average wall thickness of 20 mils. The bladder can have a first bladder wall having a first bladder wall thickness, where the first bladder wall has a gas transmission rate of 15 $cm^3/m^2 \cdot atm \cdot day$ or less for nitrogen for an average wall thickness of 20 mils.

In an aspect, the bladder has a bladder wall having an interior-facing side and an exterior (or externally)-facing side, where the interior (or internally)-facing side defines at least a portion of an interior region of the bladder. The single layer or multi-layer optical film (or optical element) having a first side and a second opposing side can be disposed on the exterior-facing side of the bladder, the interior-facing side of the bladder, or both. The exterior-facing side of the bladder, the interior-facing side of the bladder, or both can include a plurality of topographical structures (or profile features) extending from the exterior-facing side of the bladder wall, the interior-facing side of the bladder, or both, where the first side or the second side of the multi-layer optical film is disposed on the exterior-facing side of the bladder wall and covering the plurality of topographical structures, the interior-facing side of the bladder wall and covering the plurality of topographical structures, or both, and wherein the multi-layer optical film imparts a structural color to the bladder wall.

In a particular aspect, the bladder can include a top wall operably secured to the footwear upper, a bottom wall opposite the top wall, and one or more sidewalls extending between the top wall and the bottom wall of the inflated bladder. The top wall, the bottom wall, and the one or more sidewalls collectively define an interior region of the inflated bladder, and wherein the one or more sidewalls each comprise an exterior-facing side. The multi-layer optical film having a first side and a second opposing side can be disposed on the exterior-facing side of the bladder, the interior-facing side of the bladder, or both. The exterior-facing side of the bladder, the interior-facing side of the bladder, or both can include a plurality of topographical structures extending from the exterior-facing side of the bladder wall, the interior-facing side of the bladder, or both, where the first side or the second side of the multi-layer optical film is disposed on the exterior-facing side of the bladder wall and covering the plurality of topographical structures, the interior-facing side of the bladder wall and covering the plurality of topographical structures, or both, and wherein the multi-layer optical film imparts a structural color to the bladder wall.

An accepted method for measuring the relative permeance, permeability, and diffusion of inflated bladders is ASTM D-1434-82-V. See, e.g., U.S. Pat. No. 6,127,026, which is incorporated by reference as if fully set forth herein. According to ASTM D-1434-82-V, permeance, permeability and diffusion are measured by the following formulae:

(quantity of gas)/[(area)×(time)×(pressure difference)]=permeance (GTR)/(pressure difference)= $cm^3/m^2 \cdot atm \cdot day$ (i.e., 24 hours)     Permeance $$[(\text{quantity of gas}) \times (\text{film thickness})] [(\text{area}) \times (\text{time}) \times (\text{pressure difference})] = \text{permeability } [(\text{GTR}) \times (\text{film thickness})] / (\text{pressure difference}) = [(\text{cm}^3)(\text{mil})] / \text{m}^2 \cdot \text{atm} \cdot \text{day (i.e., 24 hours)} \quad \text{Permeability}$$

$$(\text{quantity of gas}) / [(\text{area}) \times (\text{time})] = \text{GTR} = \text{cm}^3/\text{m}^2 \cdot \text{day (i.e., 24 hours) Diffusion at one atmosphere}$$

The bladder can include a bladder wall that includes a film including at least one polymeric layer or at least two or more polymeric layers. Each of the polymeric layers can be about 0.1 to 40 mils in thickness.

The polymeric layer can include a polymeric material such as a thermoplastic material as described above and herein and can be the thermoplastic layer upon which the primer layer, the optical element can be disposed, upon which the textured layer can be disposed, can be used to form the textured layer, and the like. The thermoplastic material can include an elastomeric material, such as a thermoplastic elastomeric material. The thermoplastic materials can include thermoplastic polyurethane (TPU), such as those described above and herein. The thermoplastic materials can include polyester-based TPU, polyether-based TPU, polycaprolactone-based TPU, polycarbonate-based TPU, polysiloxane-based TPU, or combinations thereof. Non-limiting examples of thermoplastic material that can be used include: "PELLETHANE" 2355-85ATP and 2355-95AE (Dow Chemical Company of Midland, Mich., USA), "ELASTOLLAN" (BASF Corporation, Wyandotte, Mich., USA) and "ESTANE" (Lubrizol, Brecksville, Ohio, USA), all of which are either ester or ether based. Additional thermoplastic material can include those described in U.S. Pat. Nos. 5,713,141; 5,952,065; 6,082,025; 6,127,026; 6,013,340; 6,203,868; and 6,321,465, which are incorporated herein by reference.

The polymeric layer can include a polymeric material including one or more of the following polymers: ethylene-vinyl alcohol copolymers (EVOH), poly(vinyl chloride), polyvinylidene polymers and copolymers (e.g., polyvinylidene chloride), polyamides (e.g., amorphous polyamides), acrylonitrile polymers (e.g., acrylonitrile-methyl acrylate copolymers), polyurethane engineering plastics, polymethylpentene resins, ethylene-carbon monoxide copolymers, liquid crystal polymers, polyethylene terephthalate, polyether imides, polyacrylic imides, and other polymeric materials known to have relatively low gas transmission rates. Blends and alloys of these materials as well as with the TPUs described herein and optionally including combinations of polyimides and crystalline polymers, are also suitable. For instance, blends of polyimides and liquid crystal polymers, blends of polyamides and polyethylene terephthalate, and blends of polyamides with styrenics are suitable.

Specific examples of polymeric materials of the polymeric layer can include acrylonitrile copolymers such as "BAREX" resins, available from Ineos (Rolle, Switzerland); polyurethane engineering plastics such as "ISPLAST" ETPU available from Lubrizol (Brecksville, Ohio, USA); ethylene-vinyl alcohol copolymers marketed under the tradenames "EVAL" by Kuraray (Houston, Tex., USA), "SOARNOL" by Nippon Gohsei (Hull, England), and "SELAR OH" by DuPont (Wilmington, Del., USA); poly-vinylidiene chloride available from S. C. Johnson (Racine, Wis., USA) under the tradename "SARAN", and from Solvay (Brussels, Belgium) under the tradename "IXAN"; liquid crystal polymers such as "VECTRA" from Celanese (Irving, Tex., USA) and "XYDAR" from Solvay; "MDX6" nylon, and amorphous nylons such as "NOVAMID" X21 from Koninklijke DSM N.V (Heerlen, Netherlands), "SELAR PA" from DuPont; polyetherimides sold under the tradename "ULTEM" by SABIC (Riyadh, Saudi Arabia); poly(vinyl alcohol)s; and polymethylpentene resins available from Mitsui Chemicals (Tokyo, Japan) under the tradename "TPX".

Each polymeric layer of the film can include a thermoplastic material which can include a combination of thermoplastic polymers. In addition to one or more thermoplastic polymers, the thermoplastic material can optionally include a colorant, a filler, a processing aid, a free radical scavenger, an ultraviolet light absorber, and the like. Each polymeric layer of the film can be made of a different of thermoplastic material including a different type of thermoplastic polymer.

The bladder can be made by applying heat, pressure and/or vacuum to a film. In this regard, the primer layer, the optical element, the textured layer, and the like can be disposed, formed from, or the like prior to, during, and/or after these steps. The bladder (e.g., one or more polymeric layers) can be formed using one or more polymeric materials, and forming the bladder using one or more processing techniques including, for example, extrusion, blow molding, injection molding, vacuum molding, rotary molding, transfer molding, pressure forming, heat sealing, casting, low-pressure casting, spin casting, reaction injection molding, radio frequency (RF) welding, and the like. The bladder can be made by co-extrusion followed by heat sealing or welding to give an inflatable bladder, which can optionally include one or more valves (e.g., one way valves) that allows the bladder to be filled with the fluid (e.g., gas).

Now having described the optical element, the optional textured surface, and methods of making the article are now described. In an aspect, the method includes forming the reflective layer (base reflective layer) of the optical element. In an aspect, the method includes forming the reflective layer on a surface of an article such as a textile, film, fiber, or monofilament yarn, where the surface can optionally be the textured surface. The reflective layer can be formed using one or more techniques described herein.

The method provides for the reflective layer being formed on the surface (e.g., three dimensional flat planar surfaces or substantially three dimensional flat planar surfaces or textured surface). Subsequently, the constituent layers can be disposed on the reflective layer. Alternatively, the textured surface can be formed in/on the reflective layer, and then the constituent layers are disposed on the reflective layer. As described herein, the optical element can be formed in a layer-by-layer manner, where each constituent layer has a different index of refraction. As each layer is formed the undulations and flat regions are altered. The combination of the optional textured surface (e.g., dimensions, shape, and/or spacing of the profile elements) and the layers of the optical element (e.g., number of layers, thickness of layers, material of the layers) and the resultant undulations and planar areas impart the structural color when exposed to visible light. The method includes optionally forming a protective layer over the optical element to protect the optical element.

Another embodiment of the present disclosure includes providing reflective layer and the textured surface on the substrate, where the reflective layer (base reflective layer) can be disposed on the textured surface. Each constituent layer of the optical element can be formed in turn, where each layer can be formed then after an appropriate amount of time, additional processing, cooling, or the like, the next layer of the optical element can be formed. Optionally, non-base reflective layer(s) can be formed between constituent layers. Optionally, the optical element does not include a reflective layer. Optionally, the top layer, by itself or in combinations with one or more reflective layers, can be formed on the last constituent layer (one on the side opposite the base reflective layer).

It should be emphasized that the above-described aspects of the present disclosure are merely possible examples of implementations, and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure.

The word "disposing" can be replaced with "operably disposing" in each of the claims.

Measurements for visible light transmittance and visible light reflectance were performed using a Shimadzu UV-2600 Spectrophotometer (Shimadzu Corporation, Japan). The spectrometer was calibrated using a standard prior to the measurements. The incident angle for all measurements was zero, unless the incident angle is intentionally altered. The wavelength resolution can be measured at 0.1 nm.

The visible light transmittance was the measurement of visible light (or light energy) that was transmitted through a sample material when visible light within the spectral range of 400 nanometers to 800 nanometers was directed through the material. The results of all transmittance over the range of 400 nanometers to 800 nanometers was collected and recorded. For each sample, a minimum value for the visible light transmittance was determined for this range.

The visible light reflectance was a measurement of the visible light (or light energy) that was reflected by a sample material when visible light within the spectral range of 400 nanometers to 800 nanometers was directed through the material. The results of all reflectance over the range of 400 nanometers to 800 nanometers was collected and recorded. For each sample, a minimum value for the visible light reflectance was determined for this range.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1 percent to about 5 percent" should be interpreted to include not only the explicitly recited concentration of about 0.1 weight percent to about 5 weight percent but also include individual concentrations (e.g., 1 percent, 2 percent, 3 percent, and 4 percent) and the sub-ranges (e.g., 0.5 percent, 1.1 percent, 2.2 percent, 3.3 percent, and 4.4 percent) within the indicated range. The term "about" can include traditional rounding according to significant figures of the numerical value. In addition, the phrase "about 'x' to 'y'" includes "about 'x' to about y".

The term "providing", such as for "providing an article" and the like, when recited in the claims, is not intended to require any particular delivery or receipt of the provided item. Rather, the term "providing" is merely used to recite items that will be referred to in subsequent elements of the claim(s), for purposes of clarity and ease of readability.

Many variations and modifications may be made to the above-described aspects. All such modifications and variations are intended to be included herein within the scope of this disclosure and protected by the following claims.

We claim:

1. An article comprising:
an optical element on a surface of the article, wherein the optical element imparts an achromatic structural color and a chromatic structural color to the article, wherein a layer of the optical element further comprises a textured surface, wherein the achromatic structural color and the chromatic structural color are not affected by the presence of the textured surface.

2. The article of claim 1, wherein the achromatic color has no hue or chroma and has a value of 0 to 10 according to the Munsell color system, wherein the chromatic color has hue, chroma, or both hue and chroma.

3. The article of claim 1, wherein the achromatic color is selected from black, white, or neutral gray and wherein the chromatic color is a red/yellow/blue (RYB) primary color, a RYB secondary color, a RYB tertiary color, a RYB quaternary color, a RYB quinary color, or a chromatic color that is a combination thereof.

4. The article of claim 1, wherein the optical element, as disposed onto the article, as measured according to the CIE 1976 color space under a given illumination condition has a color measurement that corresponds with the achromatic color, wherein the first color measurement has coordinates L* and a* and b*, wherein both of a* and b* are equal to 0.

5. The article of claim 1, wherein the optical element, as disposed onto the article, as measured according to the CIE 1976 color space under a given illumination condition, has a first color measurement that corresponds with the achromatic color, wherein the first color measurement has coordinates L* and a* and b*, wherein one or both of a* and b* are equal to about 0 or wherein when a* or b* or both a* and b* are not equal to 0 but a* and b* are close enough to 0 that to an observer having 20/20 visual acuity and normal color vision from a distance of about 1 meter from the article considers the first color measurement achromatic color.

6. The article of claim 1, wherein the optical element includes a textured surface having a plurality of profile features and flat planar areas, wherein the profile features extend above the flat areas of the textured surface, wherein the profile features and the flat areas result in at least one layer of the optical element having an undulating topography across the textured surface, wherein the achromatic color, the chromatic color, or both are unaffected or substantially unaffected by the undulating topography across the textured surface as compared to a substantially identical optical element which is free of the textured surface.

7. An article comprising: an optical element on a surface of the article, wherein the optical element imparts a first structural color and a second structural color at different angles of observation, at different angles of incident light, or at both different angles of observation and different angles of incident light, wherein the first structural color is an achromatic color and the second structural color is a chromatic color.

8. The article of claim 7, wherein the achromatic color is selected from black, white, or neutral gray.

9. The article of claim 7, wherein the optical element imparts the first structural color to the article from a first angle of observation or a first angle of incident light and imparts the second structural color to the article from a second angle of observation or a second angle of incident light, wherein the first angle and the second angle are different by at least 15 degrees.

10. The article of claim 8, wherein the achromatic color is black at the first angle of observation, wherein the optical element reflects all wavelengths within the range of about 380 to about 740 nanometers to substantially the same degree at the first angle of observation, wherein the observation angle is an observation angle at which the achromatic color is visible to an observer having 20/20 visual acuity and normal color vision from a distance of about 1 meter from the article.

11. The article of claim 10, wherein the percent reflectance of the optical element is about 2 percent or less at the first angle of observation for all of the wavelengths within the range of about 380 to about 740 nanometers or wherein the percent absorbance of the optical element is about 98 percent or more at the first angle of observation for all wavelengths within the range of about 380 to about 740 nanometers, wherein the observation angle is an observation angle at which the achromatic color is visible to an observer having 20/20 visual acuity and normal color vision from a distance of about 1 meter from the article.

12. The article of claim 8, wherein the achromatic color is white, wherein the optical element absorbs all wavelengths within the range of about 380 to about 740 nanometers to substantially the same degree the first angle of observation, wherein the observation angle is an observation angle at which the achromatic color is visible to an observer having 20/20 visual acuity and normal color vision from a distance of about 1 meter from the article.

13. The article of claim 12, wherein the percent absorbance of the optical element is about 2 percent or less at the first angle of observation for all wavelengths within the range of about 380 to about 740 nanometers or wherein the percent reflectance of the optical element is about 98 percent or more at the first angle of observation for all wavelengths within the range of about 380 to about 740 nanometers, wherein the observation angle is an observation angle at which the achromatic color is visible to an observer having 20/20 visual acuity and normal color vision from a distance of about 1 meter from the article.

14. The article of claim 8, wherein the achromatic color is neutral gray, wherein the percent absorbance of the optical element is about 2 to 98 percent at the first angle of observation for all wavelengths within the range of about 380 to about 740 nanometers or wherein the percent reflectance of the optical element is about 2 to 98 percent at the first angle of observation for all wavelengths within the range of about 380 to about 740 nanometers, wherein the observation angle is an observation angle at which the achromatic color is visible to an observer having 20/20 visual acuity and normal color vision from a distance of about 1 meter from the article.

15. The article of claim 9, wherein the optical element, as disposed onto the article, when measured according to the CIE 1976 color space under a given illumination condition at angle of observation, has a color measurement that corresponds with the first structural color, wherein the first color measurement has coordinates $L_1^*$ and $a_1^*$ and $b_1^*$, wherein both of $a_1^*$ and $b_1^*$ are equal to about 0 or wherein when $a^*$ or $b^*$ or both $a^*$ and $b^*$ are not equal to 0 but $a^*$ and $b^*$ are close enough to 0 that to an observer having 20/20 visual acuity and normal color vision from a distance of about 1 meter from the article considers the first structural color achromatic;

wherein the optical element, as disposed onto the article, when measured according to the CIE 1976 color space under a given illumination condition at angle of observation, has a color measurement that corresponds with the second structural color, wherein the second color measurement has coordinates $L_2^*$ and $a_2^*$ and $b_2^*$, wherein at least one of $a_2^*$ or $b_2^*$ is greater than 0 or less than 0 or optionally wherein when $a^*$ or $b^*$ or both $a^*$ and $b^*$ are not equal to 0 but $a^*$ and $b^*$ are far enough from 0 that to an observer having 20/20 visual acuity and normal color vision from a distance of about 1 meter from the article considers the second structural color chromatic.

16. The article claim 9, wherein the optical element includes a textured surface having a plurality of profile features and flat planar areas, wherein the profile features extend above the flat areas of the textured surface, wherein the profile features and the flat areas result in at least one layer of the optical element having an undulating topography across the textured surface, wherein the achromatic color at the first angle of observation is unaffected or substantially unaffected by the undulating topography across the textured surface as compared to a substantially identical optical element which is free of the textured surface and wherein the chromatic color at the second angle of observation is unaffected or substantially unaffected by the undulating topography across the textured surface as compared to a substantially identical optical element which is free of the textured surface.

17. The article of claim 7, wherein the optical element includes at least one layer, wherein at least layer is made of a material selected from metal, metal oxide, or stainless steel.

18. The article of claim 7, wherein the article is a non-woven synthetic leather upper for an article of footwear.

19. An article comprising:
an optical element on a surface of the article, wherein the optical element imparts an achromatic structural color and a chromatic structural color to the article, wherein the achromatic structural color and the chromatic structural color are due solely to the optical element consisting of the one or more constituent layers, one or more reflective layers, or both one or more constituent layers and one or more reflective layers, wherein each layer is flat or substantially flat.

20. An article comprising:
an optical element on a surface of the article, wherein the optical element imparts an achromatic structural color and a chromatic structural color to the article, wherein the optical element includes a textured surface having a plurality of profile features and flat planar areas, wherein the profile features extend above the flat areas of the textured surface, wherein the profile features and the flat areas result in at least one layer of the optical element having an undulating topography across the textured surface, wherein the achromatic structural color, the chromatic structural color, or both are unaffected or substantially unaffected by the undulating topography across the textured surface as compared to a substantially identical optical element which is free of the textured surface.

* * * * *

UNITED STATES PATENT AND TRADEMARK OFFICE
CERTIFICATE OF CORRECTION

PATENT NO. : 11,986,042 B2
APPLICATION NO. : 17/074153
DATED : May 21, 2024
INVENTOR(S) : Jeremy Gantz and Yuanmin Wang It is certified that error appears in the above-identified patent and that said Letters Patent is hereby corrected as shown below:

On the Title Page

At Item (56), OTHER PUBLICATIONS please amend:

"Iohara Ket al: "Structurally Colored Fibers", Chemical Fibers"
To:
-- Iohara K et al: "Structurally Colored Fibers", Chemical Fibers --.

"Zheng et al., "Reflective low-sideband plasmonic structural colors",
Optival Materials Express, vol. 6, No. 2, Jan. 7, 2016, pp. 381-387."
To:
-- Zheng et al., "Reflective low-sideband plasmonic structural colors",
Optical Materials Express, vol. 6, No. 2, Jan. 7, 2016, pp. 381-387. --.

"International Preliminary Report on Patentability for PCT/US2002/071922, mailed Apr. 4, 2024,"
To:
-- International Preliminary Report on Patentability for PCT/US2022/071922, mailed Apr. 4, 2024, --.

In the Specification

Column No. 3, Line No. 47:
The line reading "nates $L_1^*$, and $a_1^*$ and $b_{1*}$, and a second color measurement" should read -- nates $L^1{}_*$, and $a_1^*$ and $b_1^{*,}$ and a second color measurement --.

Column 3, Line 62:
The line reading "nates $L_1^*$ and $a_1^*$ and $b_{1*}$, while a second color measure-" should read -- nates $L_1^*$ and $a_1^*$ and $b_1^*$, while a second color measure- --.

Signed and Sealed this
Nineteenth Day of November, 2024

Katherine Kelly Vidal
*Director of the United States Patent and Trademark Office*

Column 4, Line 50:
The line reading "$L_1^*$ and $L_{2^*}$, $a_1^{*\ \text{and}}\ a_{2^*}$, and $b_1^*$ and $b_2^*$ is less than 2" should read -- $L_1^*$ and $L_2^*$, $a_1^*$ and $a_2^*$, and $b_1^*$ and $b_2^*$ is less than 2 --.

Column 7, Line 6:
The line reading "$L_1^*$ and $a_1^*$ and $b_{1*}$, wherein both of $a_1^*$, and $b_1^*$ are equal" should read -- $L_1^*$ and $a_1^*$ and $b_1^*$, wherein both of $a_1^*$, and $b_1^*$ are equal --.

Column 9, Line 45:
The line reading "vision from a distance of about 1 meter from the article" should read -- vision from a distance of about 1 meter from the article. --.

Column 10, Line 27:
The line reading "measurement has coordinates $L_1^*$ and $a_1^*$ and $b_{1*}$, wherein" should read
-- measurement has coordinates $L_1^*$ and $a_1^*$ and $b_1^*$, wherein --.

Column 23, Line 50:
The line reading "$a_1^*$ and $b_{1*}$, wherein both of $a_1^*$ and $b_1^*$ are equal to about" should read -- $a_1^*$ and $b_1^*$, wherein both of $a_1^*$ and $b_1^*$ are equal to about --.

Column 25, Line 60:
The line reading "$a_1^*$ and $b_{1*}$, wherein both of $a_1^*$ and $b_1^*$ are equal to about" should read -- $a_1^*$ and $b_1^*$, wherein both of $a_1^*$ and $b_1^*$ are equal to about --.

Column 26, Line 32:
The line reading "thereof, Feature 16B. The article of feature 10B, wherein the" should read -- thereof. Feature 16B. The article of feature 10B, wherein the --.

Column 26, Line 60:
The line reading "Feature 10. An article comprising:" should read -- Feature 1C. An article comprising: --.

Column 26, Line 64:
The line reading "Feature 2C. The article of feature 10, wherein the achromatic" should read
-- Feature 2C. The article of feature 1C, wherein the achromatic --.

Column 27, Line 1:
The line reading "Feature 3C. The article of feature 10, wherein the achromatic" should read
-- Feature 3C. The article of feature 1C, wherein the achromatic --.

Column 27, Line 7:
The line reading "Feature 4C. The article of feature 10, wherein the optical" should read -- Feature 4C. The article of feature 1C, wherein the optical --.

CERTIFICATE OF CORRECTION (continued)
U.S. Pat. No. 11,986,042 B2

Column 27, Line 14:
The line reading "Feature 5C. The article of feature 10, wherein the optical" should read -- Feature 5C. The article of feature 1C, wherein the optical --.

Column 27, Line 57:
The line reading "Feature 110. The article of feature 8C, wherein the achro-" should read -- Feature 11C. The article of feature 8C, wherein the achro- --.

Column 27, Line 66:
The line reading "Feature 12C. The article of feature 110, wherein the percent" should read -- Feature 12C. The article of feature 11C, wherein the percent --.

Column 28, Line 41:
The line reading "Feature 16C. The article of feature 100, wherein the optical" should read -- Feature 16C. The article of feature 10C, wherein the optical --.

Column 28, Line 47:
The line reading "$a_1^*$ and $b_{1*}$, wherein both of $a_1^*$ and $b_1^*$ are equal to about" should read -- $a_1^*$ and $b_1^*$, wherein both of $a_1^*$ and $b_1^*$ are equal to about --.

Column 28, Line 65:
The line reading "Feature 17C. The article feature 100, wherein the optical" should read -- Feature 17C. The article feature 10C, wherein the optical --.

Column 32, Line 29:
The line reading "and has coordinates $L_1^*$ and $a_1^*$ and $b_{1*}$, while a second" should read -- and has coordinates $L_1^*$ and $a_1^*$ and $b_1^*$, while a second --.

Column 32, Line 54:
The line reading "one or more of values $L_1^*$ and $L_{2*}$, $a_1^*$ and $a_2^*$, and $b_1^*$ and" should read -- one or more of values $L_1^*$ and $L_2^*$, $a_1^*$ and $a_2^*$, and $b_1^*$ and --.

Column 32, Line 63:
The line reading "between one or more of values $L_1^*$ and $L_2^*$ $a_1^*$ and $a_{2*}$, and" should read -- between one or more of values $L_1^*$ and $L_2^*$ $a_1^*$ and $a_2^*$, and --.

Column 33, Line 16:
The line reading "than 0.5. 0.2, or 0.1, and are within about 10 percent or about" should read -- than 0.5, 0.2, or 0.1, and are within about 10 percent or about --.

Column 33, Line 25:
The line reading "where $a^*$ or $b^*$ or both of $a^*$ and $b^*$ are less than 0.5. 0.2," should read -- where $a^*$ or $b^*$ or both of $a^*$ and $b^*$ are less than 0.5, 0.2, --.

Column 34, Line 30:
The line reading "mium, magnesium, silicon, gold, platinum, nobium, and a" should read -- mium, magnesium, silicon, gold, platinum, niobium, and a --.

Column 34, Line 35:
The line reading "vanadium oxide, molybdenum oxide, lead oxide, nobium" should read -- vanadium oxide, molybdenum oxide, lead oxide, niobium --.

Column 36, Line 10:
The line reading "are a midsole 114 and an outsole 112, the midsole 114 is" should read -- are a midsole 114 and an outsole 112. The midsole 114 is --.

Column 36, Line 27:
The line reading "over the in step and toe areas of the foot, along the medial" should read -- over the instep and toe areas of the foot, along the medial --.

Column 36, Line 54:
The line reading "extend over the in step and toe areas of the foot, along the" should read -- extend over the instep and toe areas of the foot, along the --.

Column 37, Line 1:
The line reading "between the foot and the ground; thereby attenuating ground" should read -- between the foot and the ground, thereby attenuating ground --.

Column 37, Line 13:
The line reading "144 can be made of one or more polymers (e.g.; layers of one" should read -- 144 can be made of one or more polymers (e.g., layers of one --.

Column 37, Line 34:
The line reading "FIG. 10(c) is a cross-sectional view of A-A that depicts" should read -- FIG. 1O(c) is a cross-sectional view of A-A that depicts --.

Column 37, Line 60:
The line reading "formed from various elements (e.g., lace; tongue, collar) that" should read -- formed from various elements (e.g., lace, tongue, collar) that --.

Column 37, Line 67:
The line reading "extend over the in step and toe areas of the foot, along the" should read -- extend over the instep and toe areas of the foot, along the --.

Column 38, Line 28:
The line reading "collar is configured to be positioned around a wearers ankle" should read -- collar is configured to be positioned around a wearer's ankle --.

Column 38, Line 37:
The line reading "counter 190, a decorative element such as a logo 191 and/or" should read -- counter 190, a decorative element such as a logo 191, and/or --.

Column 39, Line 57:
The line reading "square centimeter in size to 10s of centimeters in size" should read -- square centimeter in size to 10 s of centimeters in size --.

Column 42, Line 62:
The line reading "or spectrophotometer" should read -- or spectrophotometer. --.

Column 52, Line 28:
The line reading "in this range. The height of the profile features (or depth if" should read -- in this range. The height of the profile features (or depth of --.

Column 54, Line 49:
The line reading "shape (with respect to a plane parallel the first plane). The" should read -- shape (with respect to a plane parallel to the first plane). The --.

Column 55, Line 29:
The line reading "orthogonal to the first plane)). The profile feature can have" should read -- orthogonal to the first plane). The profile feature can have --.

Column 55, Line 33:
The line reading "degrees being parallel to the first plane))." should read -- degrees being parallel to the first plane). --.

Column 58, Line 2:
The line reading "structural color where or not the textured surface is present" should read -- structural color where or not the textured surface is present. --.

Column 58, Line 25:
The line reading "has coordinates $L_1^*$ and $a_1^*$ and $b_{1*}$, while a second color" should read -- has coordinates $L_1^*$ and $a_1^*$ and $b_1^*$, while a second color --.

Column 58, Line 47:
The line reading "one or more of values $L_1^*$ and $L_{2*}$, $a_1^*$ and $a_2^*$, and $b_1^*$ and" should read -- one or more of values $L_1^*$ and $L_2^*$, $a_1^*$ and $a_2^*$, and $b_1^*$ and --.

Column 59, Line 13:
The line reading "dinates $L_1^*$ and $a_1^*$ and $b_{1*}$, while a second color measure-" should read -- dinates $L_1^*$ and $a_1^*$ and $b_1^*$, while a second color measure- --.

Column 59, Line 46:
The line reading "and $a_{2*}$, and $b_{1*}$ and $b_2^*$ is greater then 20 percent, the first" should read -- and $a_2^*$, and $b_1^*$ and $b_2^*$ is greater then 20 percent, the first --.

CERTIFICATE OF CORRECTION (continued)
U.S. Pat. No. 11,986,042 B2

Column 66, Line 31:
The line reading "layer, coating, and like the. The polymeric material includes" should read -- layer, coating, and the like. The polymeric material includes --.

Column 69, Line Nos. 38-39:
The lines reading "diisocyanate (HDI), isophorone diisocyanate (IPDI), buty-lenediisocyanate (BDI), bisisocyanatocyclohexylmethane" should read -- diisocyanate (HDI), isophorone diisocyanate (IPDI), butylene diisocyanate (BDI), bisisocyanatocyclohexylmethane --.

Column 69, Line 64:
The line reading "cynate (TDI), TDI adducts with trimethyloylpropane" should read -- cynate (TDI), TDI adducts with trimethylolpropane --.

Column 70, Line 20:
The line reading "trimethyloylpropane (TMP), uretdiones (i.e., dimerized iso-" should read -- trimethylolpropane (TMP), uretdiones (i.e., dimerized iso- --.

Column 74, Line 18:
The line reading "(3-hydroxbutyrate-co-3-hydroxyvalerate, polyethylene" should read -- (3-hydroxybutyrate -co-3-hydroxyvalerate, polyethylene --.

Column 74, Line 20:
The line reading "terephthalate, polyethylene napthalate, and combinations" should read -- terephthalate, polyethylene naphthalate, and combinations --.

Column 74, Line 65:
The line reading "molecular weight polyethylene (HDPE-UHMVV), and" should read -- molecular weight polyethylene (HDPE-UHMW), and --.

Column 77, Line 49:
The line reading "example, by remove a sacrificial material" should read -- example, by removing a sacrificial material --.

Column 77, Line 50:
The line reading "The fiber can be a carbon fiber such as TARIFYL pro-" should read -- The fiber can be a carbon fiber such as TAIRYFIL pro- --.

Column 77, Line 60:
The line reading "fibers produced by Amann Group of Bonningheim, Ger-" should read -- fibers produced by Amann Group of Bönnigheim, Ger- --.

Column 77, Line 61:
The line reading "many (e.g., SERAFILE 200/2 non-lubricated polyester fil-" should read -- many (e.g., SERAFIL 200/2 non-lubricated polyester fil- --.

CERTIFICATE OF CORRECTION (continued)
U.S. Pat. No. 11,986,042 B2

Column 77, Line 62:
The line reading "ment and SERAFILE COM PHIL 200/2 lubricated polyester" should read -- ment and SERAFIL COMPHIL 200/2 lubricated polyester --.

Column 79, Line Nos. 43-44:
The line reading "ing), hydro-entanglement, ultrasonic bonding, needlepunching (needlefelting), chemical bonding (e.g., using binders" should read -- ing), hydro-entanglement, ultrasonic bonding, needle punching (needle felting), chemical bonding (e.g., using binders --.

Column 81, Line 55:
The line reading "polyurethane engineering plastics such as ISPLAST" should read -- polyurethane engineering plastics such as ISOPLAST --.

Column 81, Line Nos. 60-61:
The line reading ""SELAR OH" by DuPont (Wilmington, Del., USA); polyvinylidiene chloride available from S. C. Johnson (Racine," should read -- "SELAR OH" by DuPont (Wilmington, Del., USA); polyvinylidene chloride available from S. C. Johnson (Racine, --.

Column 83, Line 57:
The line reading "phrase "about 'x' to 'y'" includes "about 'x' to about y"""." should read -- phrase "about 'x' to 'y'" includes "about 'x' to about y'". --.

In the Claims

Claim 16, Column 86, Line 13:
The line reading "The article claim 9, wherein the optical element" should read -- The article of claim 9, wherein the optical element --.